US012697720B2

(12) United States Patent
Lynch et al.

(10) Patent No.: US 12,697,720 B2
(45) Date of Patent: Aug. 4, 2026

(54) DYNAMIC TASK ASSIGNMENT AMONGST COMMUNICATING HUMANOID ROBOTS

(71) Applicant: Figure AI Inc., San Jose, CA (US)

(72) Inventors: Corey Lynch, San Jose, CA (US); Toki Migimatsu, San Jose, CA (US); Yevgen Chebotar, San Jose, CA (US); Michael Ahn, San Jose, CA (US); Ivan Babushkin, San Jose, CA (US)

(73) Assignee: FIGURE AI INC., San Jose, CA (US)

( * ) Notice: Subject to any disclaimer, the term of this patent is extended or adjusted under 35 U.S.C. 154(b) by 0 days.

(21) Appl. No.: 19/355,531

(22) Filed: Oct. 10, 2025

(65) Prior Publication Data

US 2026/0102909 A1      Apr. 16, 2026

Related U.S. Application Data

(63) Continuation-in-part of application No. 19/319,712, filed on Sep. 4, 2025, now Pat. No. 12,578,733.

(60) Provisional application No. 63/883,647, filed on Sep. 17, 2025, provisional application No. 63/819,533, filed on Jun. 6, 2025, provisional application No. 63/776,429, filed on Mar. 24, 2025, provisional
(Continued)

(51) Int. Cl.
*G05D 1/02*      (2020.01)
*B25J 9/16*      (2006.01)

(52) U.S. Cl.
CPC ............. *B25J 9/163* (2013.01); *B25J 9/1661* (2013.01)

(58) Field of Classification Search
CPC ............................... B25J 9/163; B25J 9/1661
See application file for complete search history.

(56) References Cited

U.S. PATENT DOCUMENTS 5,280,431 A * 1/1994 Summerville ....... G05D 1/0282
                                                      700/255
5,673,367 A       9/1997 Buckley
                   (Continued)

FOREIGN PATENT DOCUMENTS

CN        102357889       2/2012
CN        209615545      11/2019
                   (Continued)

OTHER PUBLICATIONS

Online Hierarchical Optimization for Humanoid Control (Year: 2016).*
(Continued)

*Primary Examiner* — Masud Ahmed

(57) ABSTRACT

The present disclosure provides a method for coordinating task execution among multiple humanoid robots, comprising receiving a high-level task command, decomposing it into sub-tasks, determining a cost-optimized assignment using a cost-optimized bipedal action model (CoBAM) based on energy consumption, time to completion, and robot capabilities, and transmitting the assignment to assigned robots. The CoBAM comprises a hierarchical architecture including an L2 beta model operating at 1-20 Hz for high-level planning and an L1 alpha model operating at 100-10,000 Hz for continuous control commands. The cost function considers battery levels, physical distances between robot and sub-task locations, and mechanical wear factors associated with specific joint movements.

9 Claims, 31 Drawing Sheets

Related U.S. Application Data application No. 63/760,617, filed on Feb. 19, 2025, provisional application No. 63/725,279, filed on Nov. 26, 2024, provisional application No. 63/722,057, filed on Nov. 18, 2024, provisional application No. 63/715,270, filed on Nov. 1, 2024, provisional application No. 63/705,791, filed on Oct. 10, 2024.

(56) References Cited

U.S. PATENT DOCUMENTS

| | | | |
|---|---|---|---|
| 7,024,276 | B2 | 4/2006 | Ito |
| 7,072,741 | B2 | 7/2006 | Nagashima |
| 7,308,336 | B2 | 12/2007 | Takenaka |
| 7,319,918 | B2 | 1/2008 | Takenaka |
| 7,386,364 | B2 | 6/2008 | Mikami |
| 7,664,569 | B2 | 2/2010 | Shimizu |
| 7,912,574 | B2 * | 3/2011 | Wurman .............. G06Q 10/087 |
| | | | 705/28 |
| D641,808 | S | 7/2011 | Matsuda |
| 8,224,652 | B2 | 7/2012 | Wang |
| D677,743 | S | 3/2013 | Koshiishi |
| D687,908 | S | 8/2013 | Hoang |
| D689,566 | S | 9/2013 | Wong |
| 8,676,381 | B2 * | 3/2014 | Kwon .................. B62D 57/032 |
| | | | 700/261 |
| 8,942,848 | B2 * | 1/2015 | Pratt .................... B62D 57/032 |
| | | | 700/250 |
| 8,942,849 | B2 | 1/2015 | Maisonnier |
| 9,205,560 | B1 | 12/2015 | Edsinger |
| 9,302,393 | B1 | 4/2016 | Rosen |
| 9,448,560 | B2 * | 9/2016 | D'Andrea ............ G05D 1/0291 |
| 9,494,415 | B2 | 11/2016 | Sweetser |
| 9,569,976 | B2 | 2/2017 | Krauss |
| D794,692 | S | 8/2017 | Haranaka |
| D795,320 | S | 8/2017 | Liu |
| D795,321 | S | 8/2017 | Liu |
| 9,789,607 | B1 | 10/2017 | Whitman |
| 9,842,585 | B2 | 12/2017 | Huang |
| 9,868,210 | B1 | 1/2018 | Whitman |
| D835,214 | S | 12/2018 | Xiong |
| D838,759 | S | 1/2019 | Kowalski |
| D841,708 | S | 2/2019 | Koshiishi |
| 10,203,209 | B2 | 2/2019 | Roumeliotis |
| 10,349,245 | B2 | 7/2019 | Tokuchi |
| D866,684 | S | 11/2019 | Früh |
| D868,866 | S | 12/2019 | Gable |
| D872,152 | S | 1/2020 | Xiong |
| D873,320 | S | 1/2020 | Clerc |
| 10,545,497 | B1 | 1/2020 | Cui |
| 10,571,896 | B2 | 2/2020 | Benaim |
| D885,451 | S | 5/2020 | Chen |
| D888,120 | S | 6/2020 | Hurst |
| D892,886 | S | 8/2020 | Klassen |
| D892,887 | S | 8/2020 | Klassen |
| D893,573 | S | 8/2020 | Yan |
| D898,789 | S | 10/2020 | Nazarikhorram |
| D911,459 | S | 2/2021 | Xiong |
| 10,946,528 | B2 | 3/2021 | Gupta |
| 10,960,539 | B1 | 3/2021 | Kalakrishnan |
| D932,531 | S | 10/2021 | Xu |
| 11,188,821 | B1 | 11/2021 | Kalakrishnan |
| 11,247,738 | B2 | 2/2022 | Lavalley |
| 11,416,003 | B2 | 8/2022 | Whitman |
| 11,498,223 | B2 | 11/2022 | Williams |
| 11,546,504 | B2 | 1/2023 | Kim |
| 11,600,010 | B2 | 3/2023 | Doutre |
| D985,643 | S | 5/2023 | Li |
| 11,645,444 | B2 | 5/2023 | Scheutz |
| 11,736,677 | B2 | 8/2023 | Grunnet-Jepsen |
| 11,833,680 | B2 | 12/2023 | Deits |
| 11,851,120 | B2 | 12/2023 | Fay |
| 11,999,423 | B2 | 6/2024 | Whitman |
| 12,054,208 | B2 | 8/2024 | Swilling |
| 12,070,863 | B2 | 8/2024 | Whitman |
| 12,077,229 | B2 | 9/2024 | Whitman |
| 12,097,626 | B2 | 9/2024 | Ikeda |
| D1,051,193 | S | 11/2024 | Mahoor |
| 12,134,181 | B2 | 11/2024 | Klingensmith |
| 12,172,537 | B2 | 12/2024 | Gonano |
| 12,205,214 | B2 | 1/2025 | Starke |
| 12,214,497 | B2 | 2/2025 | Whitman |
| 12,235,652 | B2 | 2/2025 | Whitman |
| 12,240,117 | B2 | 3/2025 | Chebotar |
| D1,069,875 | S | 4/2025 | Belon |
| 12,290,940 | B1 | 5/2025 | Abate |
| D1,082,881 | S | 7/2025 | Wang |
| 12,365,094 | B2 | 7/2025 | Mccall |
| 12,403,611 | B2 | 9/2025 | Mccall |
| 12,482,243 | B1 | 11/2025 | Cass |
| 12,515,706 | B2 | 1/2026 | Li |
| 2002/0103576 | A1 | 8/2002 | Takamura |
| 2003/0060930 | A1 | 3/2003 | Fujita |
| 2004/0015265 | A1 | 1/2004 | Asano |
| 2004/0019485 | A1 | 1/2004 | Kobayashi |
| 2004/0039483 | A1 | 2/2004 | Kemp |
| 2004/0230340 | A1 | 11/2004 | Fukuchi |
| 2006/0217838 | A1 | 9/2006 | Sugino |
| 2009/0059033 | A1 | 3/2009 | Shimada |
| 2010/0280662 | A1 | 11/2010 | Abdallah |
| 2011/0058800 | A1 | 3/2011 | Lee |
| 2011/0071671 | A1 | 3/2011 | Ihrke |
| 2012/0072215 | A1 | 3/2012 | Yu |
| 2012/0078419 | A1 | 3/2012 | Kim |
| 2012/0155775 | A1 | 6/2012 | Ahn |
| 2012/0215539 | A1 | 8/2012 | Juneja |
| 2012/0310412 | A1 | 12/2012 | Seo |
| 2013/0175816 | A1 | 7/2013 | Kawasaki |
| 2013/0345863 | A1 | 12/2013 | Linder |
| 2014/0039675 | A1 | 2/2014 | Ead |
| 2014/0316566 | A1 * | 10/2014 | Mazel .................... G06N 3/008 |
| | | | 700/250 |
| 2015/0192399 | A1 | 7/2015 | Raab |
| 2015/0290795 | A1 | 10/2015 | Oleynik |
| 2016/0008988 | A1 | 1/2016 | Kennedy |
| 2016/0064263 | A1 | 3/2016 | Hosek |
| 2017/0028551 | A1 | 2/2017 | Hemken |
| 2017/0028563 | A1 | 2/2017 | Hemken |
| 2017/0080582 | A1 | 3/2017 | Mugnier |
| 2017/0125008 | A1 | 5/2017 | Maisonnier |
| 2017/0326736 | A1 | 11/2017 | Nagatsuka |
| 2018/0136912 | A1 | 5/2018 | Venkataramani |
| 2018/0182260 | A1 | 6/2018 | Ciniello |
| 2018/0232201 | A1 | 8/2018 | Holtmann |
| 2018/0357552 | A1 | 12/2018 | Campos |
| 2019/0005374 | A1 | 1/2019 | Shankar |
| 2019/0079924 | A1 | 3/2019 | Sugiura |
| 2019/0100263 | A1 | 4/2019 | Amino |
| 2019/0130896 | A1 | 5/2019 | Zhou |
| 2019/0163985 | A1 | 5/2019 | Wang |
| 2019/0329413 | A1 | 10/2019 | Johnson |
| 2019/0371307 | A1 | 12/2019 | Zhao |
| 2020/0009739 | A1 | 1/2020 | Moon |
| 2020/0086479 | A1 | 3/2020 | Messier |
| 2020/0114506 | A1 | 4/2020 | Toshev |
| 2020/0117214 | A1 | 4/2020 | Jonak |
| 2020/0117336 | A1 | 4/2020 | Mani |
| 2021/0181716 | A1 | 6/2021 | Quinlan |
| 2021/0331313 | A1 | 10/2021 | Klingensmith |
| 2021/0387346 | A1 * | 12/2021 | Gillett .................. B25J 19/0075 |
| 2021/0390420 | A1 | 12/2021 | Barnett |
| 2022/0226996 | A1 | 7/2022 | Ishizuka |
| 2022/0294062 | A1 | 9/2022 | Kamon |
| 2022/0388174 | A1 | 12/2022 | Stathis |
| 2022/0390952 | A1 | 12/2022 | Yu |
| 2022/0410380 | A1 | 12/2022 | Lu |
| 2023/0048725 | A1 | 2/2023 | Barbour |
| 2023/0126906 | A1 | 4/2023 | Kranski |
| 2023/0143315 | A1 | 5/2023 | Whitman |
| 2023/0168921 | A1 | 6/2023 | Kim |
| 2023/0173683 | A1 | 6/2023 | Gomez |
| 2023/0182296 | A1 | 6/2023 | Sermanet |
| 2023/0222454 | A1 | 7/2023 | Cella |
| 2023/0306302 | A1 | 9/2023 | Mori |
| 2023/0347514 | A1 | 11/2023 | Xiao |

(56) References Cited

U.S. PATENT DOCUMENTS

| | | | |
|---|---|---|---|
| 2023/0390948 | A1 | 12/2023 | Hsu |
| 2024/0091964 | A1 | 3/2024 | Smith |
| 2024/0095077 | A1 | 3/2024 | Singh |
| 2024/0181637 | A1 | 6/2024 | Gillett |
| 2024/0193848 | A1 | 6/2024 | Wang |
| 2024/0199068 | A1 | 6/2024 | Pavone |
| 2024/0217104 | A1 | 7/2024 | Neville |
| 2024/0228191 | A1 | 7/2024 | Kumar |
| 2024/0289973 | A1 | 8/2024 | Liu |
| 2025/0018583 | A1 | 1/2025 | Monti |
| 2025/0050507 | A1 | 2/2025 | Camasmie |
| 2025/0103064 | A1* | 3/2025 | Shan ..................... G05D 1/692 |
| 2025/0147517 | A1 | 5/2025 | Swilling |
| 2025/0196326 | A1 | 6/2025 | Katz |
| 2025/0196327 | A1 | 6/2025 | Geating |
| 2025/0218160 | A1 | 7/2025 | Wang |
| 2026/0016809 | A1* | 1/2026 | Shu-Xing Cheng ... B25J 9/1671 |

FOREIGN PATENT DOCUMENTS

| | | |
|---|---|---|
| CN | 210998685 | 7/2020 |
| CN | 115649316 | 1/2023 |
| CN | 218802294 | 4/2023 |
| CN | 117301022 | 12/2023 |
| CN | 117462367 | 1/2024 |
| CN | 118809620 A | 10/2024 |
| KR | 3020240036125 | 9/2024 |
| SU | 1734994 | 5/1992 |
| WO | 2023107501 | 6/2023 |
| WO | 2023110778 | 6/2023 |
| WO | 2023246994 | 12/2023 |
| WO | 2023246995 | 12/2023 |
| WO | 2024058844 | 3/2024 |
| WO | 2024085904 | 4/2024 |
| WO | 2024112350 | 5/2024 |
| WO | 2024112351 | 5/2024 |
| WO | 2024123766 | 6/2024 |
| WO | 2024163992 | 8/2024 |
| WO | D243074010 | 10/2024 |
| WO | 2025019583 | 1/2025 |
| WO | 2025042802 | 2/2025 |
| WO | 2025072321 | 4/2025 |

OTHER PUBLICATIONS

A Resilient and Energy-Aware Task Allocation Framework for Heterogeneous Multi-Robot Systems (Year: 2021).*

Jin et al., "Unified Language-Vision Pretraining in LLM With Dynamic Discrete Visual Tokenization," arXiv:2309.04669v3 [cs. CV] Mar. 22, 2024.

Kim et al., "Parallel Feature Pyramid Network for Object Detection," ECCV 2018.

Kim et al., "Giving Robots a Hand: Learning Generalizable Manipulation with Eye-in-Hand Human Video Demonstrations," arXiv:2307. 05959v1 (Jul. 12, 2023).

Kirillov et al., "Panoptic Feature Pyramid Networks," IEEE Xplore (2019).

Lee et al., "Learning Robot Activities from First-Person Human Videos Using Convolutional Future Regression," IEEE Xplore (2017).

Li et al., "Supervision Exists Everywhere: a Data Efficient Contrastive Language-Image Pre-Training Paradigm," arXiv:2110. 05208v2 (Mar. 14, 2022).

Li et al., BLIP: Bootstrapping Language-Image Pre-training for Unified Vision-Language Understanding and Generation, Proceedings of the 39 th International Conference on Machine Learning, Baltimore, Maryland, USA, PMLR 162, 2022.

Lin et al., "Feature Pyramid Networks for Object Detection," IEEE Xplore (2017).

Lin et al., "Feature Pyramid Networks for Object Detection," IEEE Xplore (2024).

Liu et al., "A Survey of Attacks on Large Vision-Language Models: Resources, Advances, and Future Trends," Journal of Latex Class Files, vol. 14, No. (Aug. 8, 2021).

Liu et al., "Imitation from Observation: Learning to Imitate Behaviors from Raw Video via Context Translation," arXiv:1707.03374v2 (Jun. 18, 2018).

Liu et al., "ROBERTa: A Robustly Optimized BERT Pretraining Approach," arXiv:1907.11692v1 (Jul. 26, 2019).

Liu et al., "Improved Baselines with Visual Instruction Tuning," IEEE Xplore (2024).

Liu et al., "Visual Instruction Tuning," 37th Conference on Neural Information Processing Systems (NeurIPS 2023).

Lin et al., "VILA: On Pre-training for Visual Language Models," https://github.com/Efficient-Large-Model/VILA (2024).

Mandi et al., "Towards More Generalizable One-shot Visual Imitation Learning," bencharXiv:2110.13423v2 [cs.RO] Feb. 8, 2022.

Maniparambil et al., "Do Vision and Language Encoders Represent the World Similarly?" IEEE Xplore (2024).

Peng et al., "DeepMimic: Example-Guided Deep Reinforcement Learning of Physics-Based Character Skills," ACM Trans. Graph., vol. 37, No. 4, Article 143. Publication date: Aug. 2018.

Radford et al., "Improving Language Understanding by Generative Pre-Training," 2018.

Radford et al., "Language Models are Unsupervised Multitask Learners," 2019.

Radford et al., "Learning Transferable Visual Models From Natural Language Supervision," Proceedings of the 38 th International Conference on Machine Learning, PMLR 139, 2021.

Raffel et al., "Exploring the Limits of Transfer Learning with a Unified Text-to-Text Transformer," Journal of Machine Learning Research 21 (2020) 1-67.

Ramachandruni et al., "Attentive Task-Net: Self Supervised Task-Attention Network for Imitation Learning using Video Demonstration," 2020 IEEE International Conference on Robotics and Automation (ICRA) May 31—Paris, France. (Aug. 31, 2020).

Rombach et al., "High-Resolution Image Synthesis with Latent Diffusion Models," IEEE Xplore (2022).

Sanh et al., "DistilBERT, a distilled version of BERT: smaller, faster, cheaper and lighter," arXiv:1910.01108v4 (Mar. 1, 2020).

Schulman et al., "Proximal Policy Optimization Algorithms," arXiv:1707.06347v2 (Aug. 28, 2017).

Sharma et al., "Third-Person Visual Imitation Learning via Decoupled Hierarchical Controller," 33rd Conference on Neural Information Processing Systems (NeurIPS 2019), Vancouver, Canada.

Sieb et al., "Graph-Structured Visual Imitation," 3rd Conference on Robot Learning (CoRL 2019), Osaka, Japan. (May 12, 2020).

Smith et al., "AVID: Learning Multi-Stage Tasks via Pixel-Level Translation of Human Videos,"arXiv:1912.04443v3 (Jun. 21, 2020).

Stadie et al., "Third-Person Imitation Learning," arXiv:1703. 01703v2 (Sep. 22, 2019).

Touvron et al., "Llama 2: Open Foundation and Fine-Tuned Chat Models," arXiv:2307.09288v2 (Jul. 19, 2023).

Vaswani et al., "Attention is All You Need," 31st Conference on Neural Information Processing Systems (NIPS 2017), Long Beach, CA, USA. (Jun. 12, 2017).

Wang et al., "Structbert: Incorporating Language Structures Into Pre-Training for Deep Language Understanding,," arXiv:1908. 04577v3 (Sep. 27, 2019).

Xiong et al., "Learning by Watching: Physical Imitation of Manipulation Skills from Human Videos," arXiv:2101.07241v2 (Nov. 14, 2021).

Yao et al., "Filip: Fine-Grained Interactive Language-Image Pre-Training," arXiv:2111.07783v1 (Nov. 9, 2021).

Yin et al., "A Survey on Multimodal Large Language Models," arXiv:2306.13549v2 (Apr. 1, 2024).

Sun et al., "Learning by Watching via Keypoint Extraction and Imitation Learning," Machines 2022, 10, 1049. https://doi.org/10. 3390/machines10111049 (Nov. 9, 2022).

Zhang et al., "An Object Attribute Guided Framework for Robot Learning Manipulations from Human Demonstration Videos," 2019 IEEE/RSJ International Conference on Intelligent Robots and Systems (IROS) Macau, China, (Nov. 4, 2019).

(56) References Cited

OTHER PUBLICATIONS

Zhang et al., "MM-LLMs: Recent Advances in MultiModal Large Language Models," arXiv:2401.13601v5 (May 28, 2024).

Zhang et al., "Llama-Adapter: Efficient Fine-Tuning of Large Language Models With Zero-Initialized Attention," arXiv:2303.16199v3 (Sep. 18, 2024).

Zhou et al., "Watch, Try, Learn: Meta-Learning From Demonstrations and Rewards," arXiv:1906.03352v4 (Jan. 30, 2020).

Nakada et al., Deep Learning of Neuromuscular and Visuomotor Control of a Biomimetic Simulated Humanoid, 2020, IEEE, p. 3952-3959 (Year: 2020).

Lim et al., Basic emotional walking using a biped humanoid robot, 1999, IEEE, p. 954-959 (Year: 1999).

Albers et al., Upper Body of a new Humanoid Robot—the Design of ARMAR III, 2006, IEEE, p. 308-309 (Year: 2006).

Englsberger et al., "Overview of the Torque-Controlled Humanoid Robot TORO," 2014 14th IEEE-RAS International Conference on Humanoid Robots (Humanoids), Nov. 18-20, 2014. Madrid, Spain.

Mike Oitzman, (date posted Aug. 6, 2024), Figure 02 humanoid robot is ready to get to work, therobotreport.com, URL: (https://www.therobotreport.com/figure-02-humanoid-robot-is-ready-to-get-to-work/), (Year: 2024).

Cheng et al., "Human Posture Estimation Using Voxel Data for "Smart" Airbag Systems: Issues and Framework," IEEE, p. 84-89 (2004).

Droeschel et al., "Learning to Interpret Pointing Gestures with a Time-of-Flight Camera," IEEE, p. 481-488 (2011).

Frohlich et al., "Design and Impementation of a Spherical Joint for Mobile Manipulators," IEEE, p. 251-258 (2016).

Netzev et al., "Many Faced Robot—Design and Manufacturing of a parametric, Modular and Open Source Robot Head," IEEE, p. 342-348 (2019).

Netzev et al., Design and implementation of a spherical joint for mobile manipulators, 2019, IEEE, p. 342-348 (Year: 2019).

Haddadin et al., The "DLR crash report": Towards a standard crash-testing protocol for robot safety—Part II: Discussions, 2009, IEEE, p. 280-287 (Year: 2009).

Yaghoubi et al., Region-Based CNNs for Pedestrian Gender Recognition in Visual Surveillance Environments, 2019, IEEE, p. 1-5 (Year: 2019).

Pateromichelakis et al., Head-eyes system and gaze analysis of the humanoid robot Romeo, 2014, IEEE, p. 1374-131379 (Year: 2014).

Mokhtari et al., Taban:A Retro-Projected Social Robotic—Head for Human-Robot Interaction, 2019, IEEE, p. 46-51 (Year: 2019).

Kim, Moo Jin, et al. "Openvla: An open-source vision-language-action model." arXiv preprint arXiv:2406.09246 (Jun. 13, 2024).

Brohan, Anthony, et al. "RT-1: Robotics transformer for real-world control at scale." arXiv preprint arXiv:2212.06817 (Dec. 13, 2022).

Zitkovich, Brianna, et al. "Rt-2: Vision-language-action models transfer web knowledge to robotic control." Conference on Robot Learning. PMLR, (Jul. 28, 2023).

Lynch, Corey, et al. "Interactive language: Talking to robots in real time." IEEE Robotics and Automation Letters (Oct. 12, 2023).

Team, Octo Model, et al. "Octo: An open-source generalist robot policy." arXiv preprint arXiv:2405.12213 (May 20, 2024).

Lynch, Corey, Kamelia Aryafar, and Josh Attenberg. "Images don't lie: Transferring deep visual semantic features to large-scale multimodal learning to rank." Proceedings of the 22nd ACM SIGKDD international conference on knowledge discovery and data mining. (Nov. 20, 2015).

Sermanet, Pierre, et al. "Time-contrastive networks: Self-supervised learning from video." 2018 IEEE international conference on robotics and automation (ICRA). IEEE, (Mar. 20, 2018).

Dwibedi, Debidatta, et al. "Learning actionable representations from visual observations." 2018 IEEE/RSJ international conference on intelligent robots and systems (IROS). IEEE, Feb. 2, 2018).

Lynch, Corey, et al. "Learning latent plans from play." Conference on robot learning. Pmlr, (Dec. 20, 2020).

Pirk, Sören, et al. "Online object representations with contrastive learning." arXiv preprint arXiv:1906.04312 (Jun. 10, 2019).

Gupta, Abhishek, et al. "Relay policy learning: Solving long-horizon tasks via imitation and reinforcement learning." arXiv preprint arXiv:1910.11956 (Oct. 25, 2019).

Lynch, Corey, and Pierre Sermanet. "Language conditioned imitation learning over unstructured data." arXiv preprint arXiv:2005.07648 (Jul. 7, 2020).

Jang, Eric, et al. "Bc-z: Zero-shot task generalization with robotic imitation learning." Conference on Robot Learning. PMLR, (Feb. 4, 2022).

Gupta, Abhishek, et al. "Bootstrapped autonomous practicing via multi-task reinforcement learning." arXiv preprint arXiv:2203.15755 (Mar. 29, 2022).

Heravi, Negin, et al. "Visuomotor control in multi-object scenes using object-aware representations." arXiv preprint arXiv:2205.06333 (May 12, 2022).

Ding, Tianli, et al. "Goalseye: Learning high speed precision table tennis on a physical robot." arXiv preprint arXiv:2210.03662 (Oct. 13, 2022).

Driess, Danny, et al. "Palm-e: An embodied multimodal language model." (Mar. 6, 2023).

Wiedebach, Georg, et al. "Walking on partial footholds including line contacts with the humanoid robot atlas." 2016 IEEE-RAS 16th International Conference on Humanoid Robots (Humanoids). IEEE, 2016.

Griffin, Robert J., et al. "Walking stabilization using step timing and location adjustment on the humanoid robot, atlas." 2017 IEEE/RSJ International Conference on Intelligent Robots and Systems (IROS). IEEE, 2017.

Griffin, Robert J., et al. "Straight-leg walking through underconstrained whole-body control." 2018 IEEE International Conference on Robotics and Automation (ICRA). IEEE, 2018.

Griffin, Robert J., et al. "Capture point trajectories for reduced knee bend using step time optimization." 2017 IEEE-RAS 17th International Conference on Humanoid Robotics (Humanoids). IEEE, 2017.

Griffin, Robert J., et al. "Footstep planning for autonomous walking over rough terrain." 2019 IEEE-RAS 19th international conference on humanoid robots (humanoids). IEEE, 2019.

Garcia, Gabriel, Robert Griffin, and Jerry Pratt. "0-step capturability, motion decomposition and global feedback control of the 3D variable height-inverted pendulum." arXiv preprint arXiv:1912.06078 (2019).

Dafarra, Stefano, et al. "Non-linear trajectory optimization for large step-ups: Application to the humanoid robot atlas." 2020 IEEE/RSJ International Conference on Intelligent Robots and Systems (IROS). IEEE, 2020.

Calvert, Duncan, et al. "A fast, autonomous, bipedal walking behavior over rapid regions." 2022 IEEE-RAS 21st International Conference on Humanoid Robots (Humanoids). IEEE, 2022.

Hebi Robotics, "T-Series Actuator," Jan. 29, 2024.

Available online at https://www.youtube.com/watch?v=q8ldbodRG14, at least as early as May 22, 2019.

Available online at https://youtu.be/GtPs_ygfaEA?si=7lv6MEFvFoaacKfa, at least as early as Aug. 15, 2023.

Available online at https://www.youtube.com/watch?v=FuNFr7V7KFQ, at least as early as Aug. 19, 2024.

Available online at https://www.youtube.com/watch?v=GzX1qOlO1bE, at least as early as May 13, 2024.

Available online at https://youtu.be/_MBd_XfXy9M?si=PbEHUJpRUFqaxS3J, at least as early as Jun. 26, 2023.

Available online at https://youtu.be/SHPxcRBIXN0?si=VbJqbK7jzUqtZGmn, at least as early as Sep. 26, 2023.

Available online at https://youtu.be/BvFxD-8AhJA?si=Vx1F4a76tbQDUX48, at least as early as Nov. 16, 2023.

Available online at https://www.youtube.com/watch?v=jWTWWuzB6Cg, at least as early as Aug. 27, 2024.

Available online at https://www.youtube.com/watch?v=B-ebMigAHzQ, at least as early as Sep. 30, 2024.

Available online at https://youtu.be/XiQkeWOFwmk?si=1qOPC8gXgmmGvXRT, at least as early as May 16, 2023.

Available online at https://youtu.be/cpraXaw7dyc?si=JvPaT6eMA18psrmU, at least as early as Dec. 13, 2023.

(56)　　　　　　References Cited

OTHER PUBLICATIONS

Available online at https://youtu.be/BNSZ8Fwcd20?si
=_YnVgjYblVuhASk1, at least as early as Oct. 27, 2023.
Available online at https://youtu.be/SS3Ga2HQQ0s?si=
Dwr3sJuCsOeUoSLj, at least as early as Nov. 20, 2023.
Available online at https://youtu.be/sih1DeJ4Hmk?si=
fJsKpvRFPzFejmS6, at least as early as Dec. 27, 2023.
Available online at https://www.youtube.com/watch?v=
zkBnFPBV3f0, at least as early as Jul. 11, 2013.
Available online at https://www.youtube.com/watch?v=oXBYZxa25vc
&t=1s, at least as early as Apr. 3, 2013.
Available online at https://www.youtube.com/watch?v=
LBeml9AmTT4, at least as early as Apr. 7, 2015.
Available online at https://www.youtube.com/watch?v=IE-
YBaYjbqY, at least as early as Dec. 10, 2013.
Available online at https://www.youtube.com/watch?v=y-j4dixQQml
&t=222s, at least as early as May 22, 2012.
Available online at https://www.youtube.com/watch?v=Bmglbk_
Op64&t=1s, at least as early as Nov. 10, 2011.
Available online at https://www.youtube.com/watch?v=20GHG-
R9eFI, at least as early as Mar. 6, 2023.
Available online at https://www.youtube.com/watch?v=
bUrLuUxv9gE, at least as early as Aug. 30, 2024.
Available online at https://www.youtube.com/watch?v =-9EM5_
VFIt8, at least as early as Apr. 16, 2024.
Available online at https://www.youtube.com/watch?v=29ECwExc-_
M&t=2s, at least as early as Apr. 17, 2024.
Available online at https://www.youtube.com/watch?v=
67CUudkjEG4, at least as early as Oct. 26, 2009.
Available online at https://www.youtube.com/watch?v=yBmatGQ0giY
&t=1s, at least as early as Aug. 11, 2022.
Available online at https://www.youtube.com/watch?v=
bdVrWxjK2vo, at least as early as Sep. 17, 2024.
Available online at https://www.youtube.com/watch?v=B_
I2k7MZEKg, at least as early as Jun. 30, 2024.
Available online at https://www.youtube.com/watch?v=
CbA9wA9etGA, at least as early as Sep. 19, 2024.
Available online at https://www.youtube.com/watch?v=zLhA-
RWBBYU, at least as early as Jul. 5, 2024.
Available online at https://www.youtube.com/watch?v=_mQJw8VhZ7w
&t=111s, as least as early as Oct. 5, 2022.
Available online at https://www.youtube.com/watch?v=
1fC7b2LjVW4, at least as early as Jul. 12, 2016.
Available online at https://www.youtube.com/watch?v=
UPOLcE1vwA0, at least as early as Apr. 28, 2016.
Available online at https://www.youtube.com/watch?v=MCbGeC-
kuBM, at least as early as Aug. 5, 2024.
Available online at https://www.youtube.com/watch?v=
ujdK3yd2gHY, at least as early as Jul. 2, 2024.

Available online at https://www.youtube.com/watch?v=-
HizP4UQvug, at least as early as Apr. 25, 2024.
Available online at https://www.youtube.com/watch?v=
ioOkbUQqmZ0, at least as early as Nov. 9, 2022.
Available online at https://www.youtube.com/watch?v=
q8ldbodRG14, at least as early as Feb. 26, 2024.
Available online at https://www.youtube.com/watch?v=
CUhuhleQNos, at least as early as May 22, 2019.
Available online at https://www.youtube.com/watch?v=dY57qnD_
O7U, at least as early as Jul. 27, 2021.
Pateromichelakis et al., Head-eyes system and gaze analysis of the
humanoid robot Romeo, 2014, IEEE, p. 1374-1379 (Year: 2014).
Jeung et al., Realization of human neck motion with novel robotic
mechanism, 2016, IEEE, p. 482-486 (Year: 2016).
Barker et al., Natural head movement for HRI with a muscular-
skeletal head and neck robot, 2017, IEEE, p. 587-592 (Year: 2017).
Gao et al., Development of a low motion-noise humanoid neck:
Statics analysis and experimental validation, 2010, IEEE, p. 1203-
1208 (Year: 2010).
Keselman et al., "Intel RealSense stereoscopic depth cameras," in
Proceedings of the IEEE Conference on Computer Vision and
Pattern Recognition Workshops, pp. 1-10, 2017.
Brown et al., "Language Models are Few-Shot Learners," arXiv:2005.
14165v4 (Jul. 22, 2020).
Chang et al., "A Survey on Evaluation of Large Language Models,"
ACM Trans. Intell. Syst. Technol., vol. 15, No. 3, Article 39. (Mar.
2024).
Chen et al., "InternVL: Scaling up Vision Foundation Models and
Aligning for Generic Visual-Linguistic Tasks," https://github.com/
OpenGVLab/InternVL (2024).
Gia et al., "Densely Connected Feature Pyramid Network for Image
Segmentation," 2020 8th International Conference on Digital Home
(ICDH).
Ding, M., Yang, Z., Hong, W., Zheng, W., Zhou, C., Yin, D., & Tang,
J. (2021). Cogview: Mastering text-to-image generation via trans-
formers. arXiv:2105.13290v3. (Year: 2021).
English Translation of CN-118809620-A (Year: 2024).
N. Vahrenkamp, S. Wieland, p. Azad, D. Gonzalez, T. Asfour and R.
Dillmann, "Visual servoing for humanoid grasping and manipula-
tion tasks," Humanoids 2008—8th IEEE-RAS International Con-
ference on Humanoid Robots, Daejeon, Korea (South), 2008, pp.
406-412, doi: 10.1109/ICHR.2008.4755985. (Year: 2008).
Jiang et al. "Active Retrieval Augmented Generation," Dec. 6-10,
2023, Proceedings of the 2023 Conference on Empirical Methods in
Natural Language Processing, pp. 7969-7992. (Year: 2023).
Tian et al. "Design of a Flexible Articulated Robotic Hand for a
Humanoid Robot," Oct. 15-17, 2019, 2019 IEEE-RAS 19th Inter-
national Conference on Humanoid Robots (Humanoids), pp. 572-
577. (Year: 2019).

* cited by examiner 1.2.8

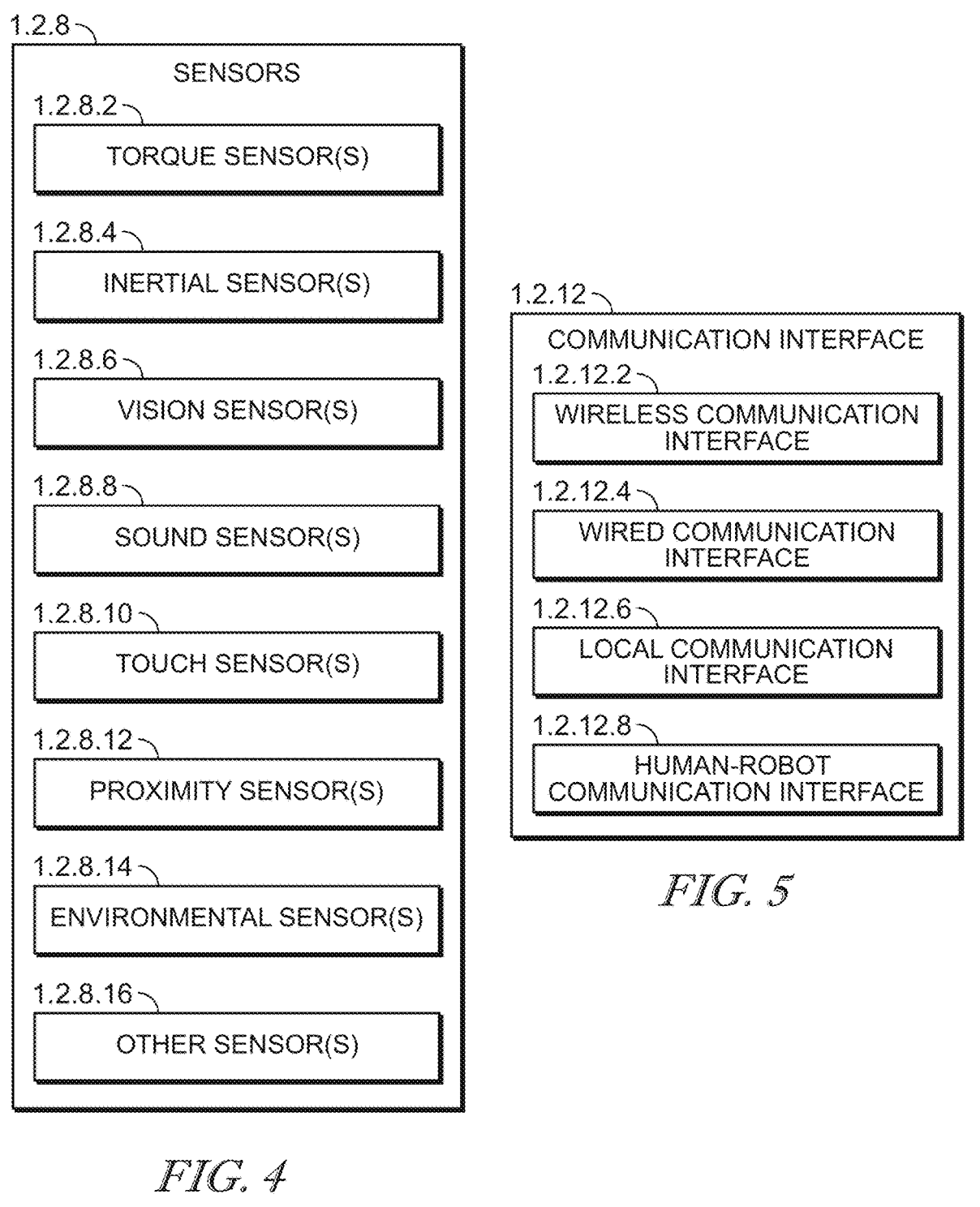

SENSORS

1.2.8.2

TORQUE SENSOR(S)

1.2.8.4

INERTIAL SENSOR(S)

1.2.8.6

VISION SENSOR(S)

1.2.8.8

SOUND SENSOR(S)

1.2.8.10

TOUCH SENSOR(S)

1.2.8.12

PROXIMITY SENSOR(S)

1.2.8.14

ENVIRONMENTAL SENSOR(S)

1.2.8.16

OTHER SENSOR(S)

COMMUNICATION INTERFACE

1.2.12.2

WIRELESS COMMUNICATION INTERFACE 1.2.12.4

WIRED COMMUNICATION INTERFACE 1.2.12.6

LOCAL COMMUNICATION INTERFACE 1.2.12.8

HUMAN-ROBOT COMMUNICATION INTERFACE

*FIG. 5*

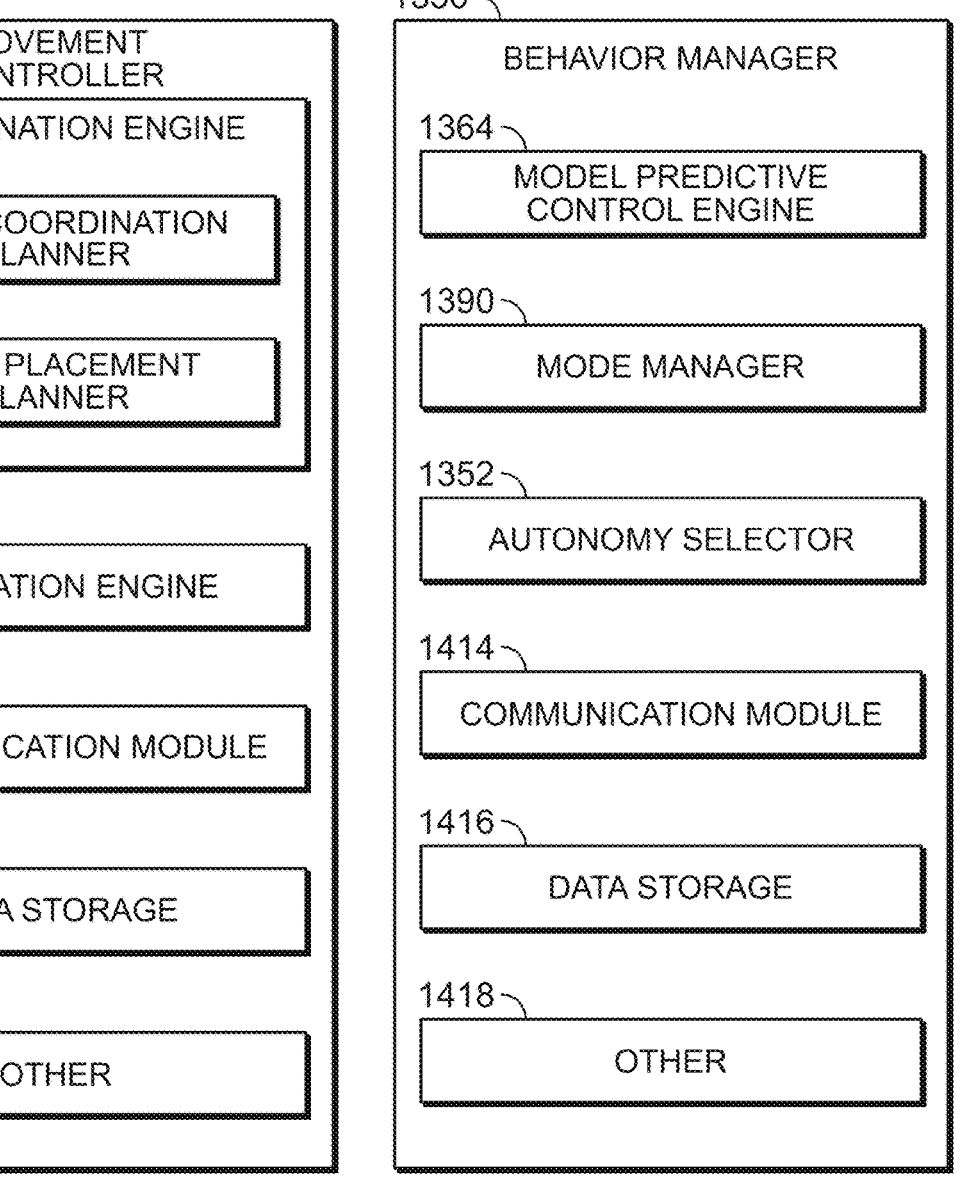
*FIG. 6*                   *FIG. 7*

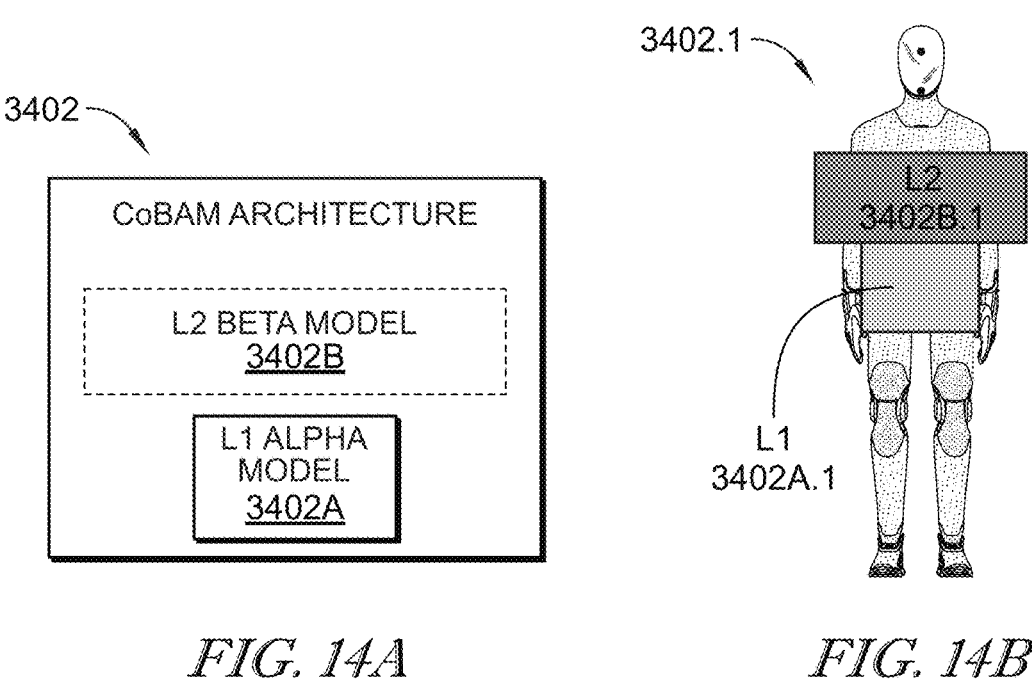
*FIG. 14A*           *FIG. 14B*
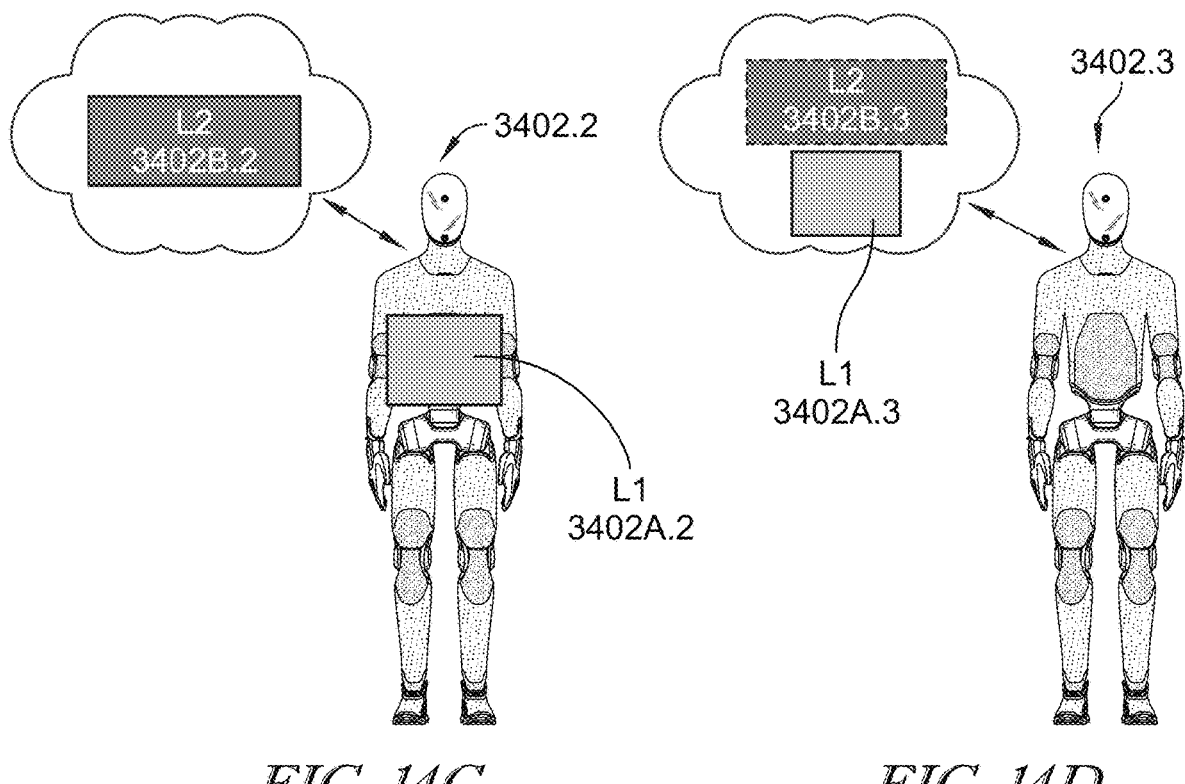
*FIG. 14C*           *FIG. 14D*

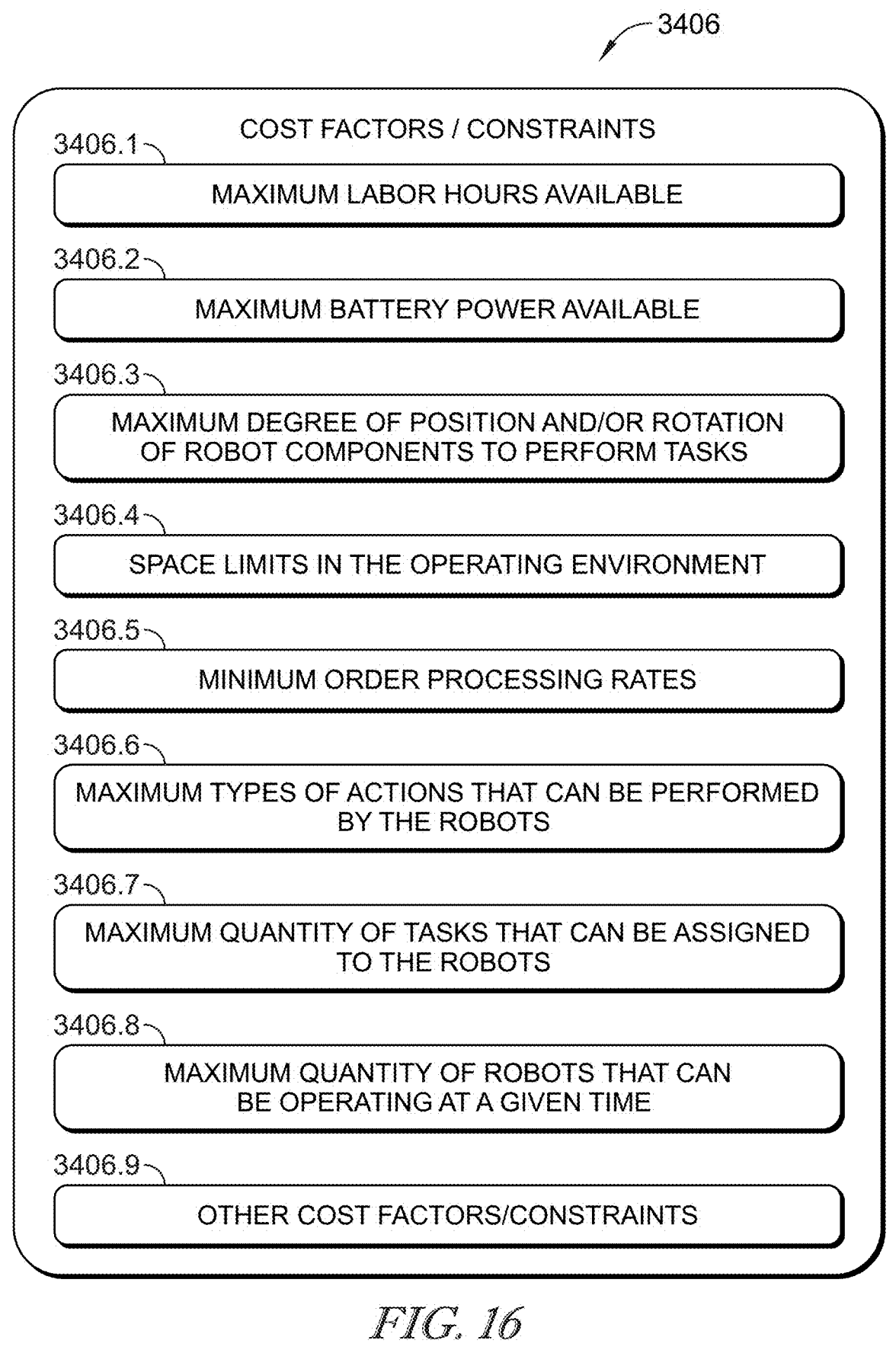

3406

COST FACTORS / CONSTRAINTS

3406.1
MAXIMUM LABOR HOURS AVAILABLE 3406.2
MAXIMUM BATTERY POWER AVAILABLE 3406.3
MAXIMUM DEGREE OF POSITION AND/OR ROTATION OF ROBOT COMPONENTS TO PERFORM TASKS 3406.4
SPACE LIMITS IN THE OPERATING ENVIRONMENT 3406.5
MINIMUM ORDER PROCESSING RATES 3406.6
MAXIMUM TYPES OF ACTIONS THAT CAN BE PERFORMED BY THE ROBOTS 3406.7
MAXIMUM QUANTITY OF TASKS THAT CAN BE ASSIGNED TO THE ROBOTS 3406.8
MAXIMUM QUANTITY OF ROBOTS THAT CAN BE OPERATING AT A GIVEN TIME 3406.9
OTHER COST FACTORS/CONSTRAINTS

*FIG. 16*

TOTAL_COST1 = MOVEMENTA + MOVEMENTB + HANDSA + HANDSB
TOTAL_COST1 = 20 + 15 + 2 + 2
TOTAL COST1 = 39

TOTAL_COST2 = MOVEMENTA + MOVEMENTB + HANDSA + HANDSB
TOTAL_COST2 = 5 + 20 + 2 + 2
TOTAL COST2 = 29

TOTAL_COST3 = MOVEMENTA + MOVEMENTB + HANDSA + HANDSB
TOTAL_COST3 = 5 + 5 + 4 + 2
TOTAL COST3 = 16

1

DYNAMIC TASK ASSIGNMENT AMONGST COMMUNICATING HUMANOID ROBOTS

CROSS-REFERENCE TO RELATED APPLICATIONS

This application claims the benefit of and priority to U.S. Provisional Patent Application Nos. 63/705,791, filed Oct. 10, 2024, 63/715,270, filed Nov. 1, 2024, 63/722,057, filed Nov. 18, 2024, 63/725,279, filed Nov. 26, 2024, 63/760,617, filed Feb. 19, 2025, 63/776,429, filed Mar. 24, 2025, 63/819, 533, filed Jun. 6, 2025 and 63/883,647, filed Sep. 17, 2025, each of which is fully incorporated herein by reference.

TECHNICAL FIELD

This disclosure relates to systems, methods, and techniques for training and using a model that coordinates interactions and collaborative behavior of multiple humanoid robots (e.g., a humanoids, robots), such as determining task assignment, status, and completion amongst the communicating robots. The humanoid robot includes a plurality of hardware and software components that are configured to substantially mimic the movements, functionality, and capabilities of a human.

BACKGROUND

The field of robotics has long pursued the goal of creating humanoid robots capable of performing complex tasks in unstructured, human-centric environments. A significant challenge in this pursuit is the development of control systems that can manage the vast number of degrees of freedom (DoF) inherent in a humanoid form. Conventional robotic control systems have traditionally been limited in their scope and capability. Many existing models are narrowly focused, designed to control only a specific part of the robot, such as a 7-DoF end-effector or arm. This approach effectively treats the robot as a disembodied limb, failing to coordinate the entire body. As a result, such systems cannot perform actions that require dynamic balance, postural adjustments, or the use of the torso and legs to extend reach and navigate obstacles. The movements produced are often rigid and limited to a constrained set of pre-programmed motions.

Furthermore, a common deficiency in conventional systems is their reliance on generating discrete, or "binned," action outputs. This method breaks down continuous motion into a finite set of poses or commands. The result is often jerky, imprecise, and unnatural movement, akin to a video with a low frame rate. This discretization introduces compounding errors over time, causing the robot to deviate from its intended path and struggle with tasks requiring fluid, continuous adjustments. These systems lack the temporal consistency needed for smooth, long-horizon tasks and are not robust enough to adapt to the unpredictable nature of real-world environments.

Therefore, a significant need exists for a more advanced control architecture that can overcome these fundamental limitations. There is a demand for a system that can provide comprehensive, whole-body control over a high-degree-of-freedom humanoid robot and generate continuous, real-time control outputs to produce fluid, human-like motion, thereby enabling more effective and reliable performance in complex, dynamic settings.

SUMMARY

The presently disclosed subject matter is directed to a method for coordinating task execution among multiple humanoid robots. Particularly, the method comprises receiving, by a computing system, a high-level task command. The method includes decomposing the high-level task command into a plurality of sub-tasks. The method includes determining, using a cost-optimized bipedal action model (CoBAM), a cost-optimized assignment of the plurality of sub-tasks to available humanoid robots from a fleet of humanoid robots based on a cost function that considers energy consumption, time to completion, and robot capabilities. The method includes transmitting the cost-optimized assignment to the assigned humanoid robots for execution.

The presently disclosed subject matter is directed to a system for multi-robot task coordination. Particularly, the system comprises a plurality of humanoid robots, each humanoid robot including sensors, actuators, and a computing architecture. The system includes a cost-optimized bipedal action model (CoBAM) configured to receive multimodal sensory inputs from the plurality of humanoid robots and output cost-optimized task assignments and robot control commands. The system includes a communication interface configured to enable data exchange between the plurality of humanoid robots and the CoBAM, wherein the CoBAM decomposes high-level tasks into sub-tasks and assigns the sub-tasks to minimize a cost function based on energy consumption and completion time.

The presently disclosed subject matter is directed to a humanoid robot configured for collaborative task execution. Particularly, the humanoid robot comprises a plurality of actuators providing at least thirty degrees of freedom. The humanoid robot includes a sensor system including visual sensors, inertial sensors, and torque sensors. The humanoid robot includes a computing architecture including a local artificial intelligence system configured to execute a cost-optimized bipedal action model (CoBAM). The humanoid robot includes a communication interface configured to communicate with other humanoid robots and receive task assignments from the CoBAM, wherein the CoBAM generates continuous robot control commands for coordinated multi-robot task execution.

The presently disclosed subject matter is directed to a method for training a cost-optimized bipedal action model (CoBAM) for multi-robot coordination. Particularly, the method comprises collecting training data including operational data from multiple humanoid robots performing collaborative tasks. The method includes annotating the training data with cost metrics associated with robot actions, the cost metrics including energy consumption, time to completion, and resource utilization. The method includes training a hierarchical model architecture including a high-level beta model and a low-level alpha model using the annotated training data. The method includes optimizing the hierarchical model architecture to minimize a cost function for multi-robot task assignments.

The presently disclosed subject matter is directed to a cost-optimized bipedal action model (CoBAM) for controlling multiple humanoid robots. Particularly, the CoBAM comprises a hierarchical architecture including a beta model configured to process high-level task commands and generate task decomposition, and an alpha model configured to generate continuous robot control commands. The beta model operates at a low frequency to perform cognitive reasoning and task planning, and the alpha model operates at a high frequency to generate real-time motor commands. The CoBAM is trained to optimize task assignments among multiple robots based on a cost function considering energy consumption, completion time, and robot capabilities.

The presently disclosed subject matter is directed to a method for consensus-based task assignment among humanoid robots. Particularly, the method comprises receiving, by each humanoid robot in a fleet of humanoid robots, a high-level task command. The method includes executing, by each humanoid robot, a local cost-optimized bipedal action model (CoBAM) to independently determine sub-task assignments for the fleet. The method includes communicating the determined sub-task assignments between the humanoid robots. The method includes determining a consensus among the sub-task assignments using a consensus protocol. The method includes executing the consensus sub-task assignments by the respective assigned humanoid robots.

The presently disclosed subject matter is directed to a distributed robotic system for cost-optimized task execution. Particularly, the system comprises a fleet of humanoid robots, each including a computing architecture with a local alpha model component of a cost-optimized bipedal action model (CoBAM). The system includes a remote computing system including a beta model component of the CoBAM configured to perform high-level task planning and generate task assignments. The system includes a communication network connecting the fleet of humanoid robots and the remote computing system, wherein the beta model generates low-frequency task assignments transmitted to the humanoid robots, and each alpha model generates high-frequency control commands for local task execution.

The presently disclosed subject matter is directed to a system for controlling a humanoid robot. Particularly, the system comprises at least one processor and a memory storing instructions that, when executed by the at least one processor, configure the system to implement a high-level cognitive model and a low-level reactive motor model. The high-level cognitive model is configured to receive a high-level task command representing a long-horizon goal, and generate, based on the high-level task command and a cost function that incorporates at least one of energy consumption or time to completion, a task-conditioning latent vector that encapsulates a semantic goal of an optimized task plan. The low-level reactive motor model is configured to receive the task-conditioning latent vector from the high-level cognitive model, and generate, based on the latent vector and real-time sensor data from the humanoid robot, a continuous sequence of whole-body control commands that specify joint torques, velocities, or target positions for a plurality of degrees of freedom of the humanoid robot, thereby causing the humanoid robot to execute fluid, human-like motion to complete the task.

The presently disclosed subject matter is directed to a method for dynamic task assignment among a plurality of humanoid robots. Particularly, the method comprises receiving, at a computing system, a high-level task command. The method includes receiving, at the computing system, real-time state data from the plurality of humanoid robots, the state data comprising at least a location and an operational availability for each robot. The method includes executing a cost-optimized bipedal action model (CoBAM) to perform the steps of decomposing the high-level task command into a plurality of discrete sub-tasks, determining, for each potential allocation of the plurality of sub-tasks to the plurality of humanoid robots, a global cost based on a cost function that incorporates the real-time state data, and generating an optimal assignment plan that allocates the sub-tasks among one or more of the plurality of humanoid robots to minimize the global cost. The method includes transmitting the sub-task assignments from the optimal assignment plan to the respective humanoid robots for execution.

The presently disclosed subject matter is directed to a multi-robot system for collaborative task execution. Particularly, the system comprises a plurality of humanoid robots, each robot comprising an onboard computing system configured to store and execute a local instance of a cost-optimized action model. Each onboard computing system is further configured to receive a shared high-level task command communicated among the plurality of humanoid robots, independently generate a proposed sub-task assignment plan by executing its local instance of the cost-optimized action model based on the shared high-level task command and state data received from other robots in the plurality, broadcast its proposed sub-task assignment plan to the other robots in the plurality, engage in a consensus protocol with the other robots, wherein the proposed sub-task assignment plans are compared to converge on a single, final assignment plan, and generate control commands to execute the sub-task allocated to it in the final assignment plan.

The presently disclosed subject matter is directed to a non-transitory computer-readable storage medium storing instructions for training a cost-optimized action model for controlling humanoid robots. The instructions, when executed by one or more processors, cause the one or more processors to perform the steps of collecting a foundational dataset comprising internet-scale text, images, and human demonstration videos to provide the model with a broad, common-sense understanding, collecting a middle-layer dataset comprising simulation and synthetic robot data generated in a physics engine to train the model on a wide range of task-specific examples, including multi-robot collaboration scenarios, collecting a top-layer dataset comprising high-fidelity, real-world teleoperation data from physical humanoid robots, the top-layer dataset including time-synchronized video and robot state data to fine-tune the model for physically plausible actions, annotating portions of the datasets with cost metrics associated with robot actions, wherein the cost metrics are based on at least one of energy consumption, time to completion, or operational resource utilization, and training the cost-optimized action model on the foundational, middle-layer, and top-layer datasets to minimize a loss function that reflects both task success and the annotated cost metrics, thereby configuring the model to generate cost-optimized actions.

The presently disclosed subject matter is directed to a system for controlling a fleet of humanoid robots. Particularly, the system comprises a remote computing system configured to execute a high-level cognitive model, the high-level model configured to receive a high-level task command and real-time state data from the fleet of humanoid robots, and generate, at a low frequency, a cost-optimized sub-task assignment for at least one humanoid robot in the fleet. The system includes an onboard computing system integrated into each of the humanoid robots in the fleet, each onboard computing system configured to execute a low-level reactive model. Upon the remote computing system transmitting a low-frequency sub-task assignment to a specific humanoid robot, the low-level reactive model on the specific humanoid robot is configured to receive the sub-task assignment, and generate, at a high frequency, a sequence of continuous, whole-body control commands to cause the specific humanoid robot to execute the assigned sub-task.

In some embodiments, the system utilizes a hierarchical artificial intelligence architecture, referred to as a CoBAM, which comprises a high-level L2 beta model and a low-level L1 alpha model. The beta model, containing greater than 5 billion parameters and operating at a low frequency between 1-25 Hz, is deployed on a remote AI system for strategic task planning. In contrast, the alpha model, with less than 1 billion parameters, operates at a high frequency between 100-10,000 Hz and is deployed locally on each humanoid robot to generate continuous control commands. Communication between these models is achieved via encrypted wireless channels, through which the remote beta model transmits task-conditioning latent vectors to the local alpha models to guide their execution.

In some embodiments, each humanoid robot in the fleet is a complex machine equipped with at least thirty actuators that provide a total of sixty-two degrees of freedom. Its hardware includes a comprehensive sensor system with visual (RGB, depth, event-based), inertial, torque, touch, and auditory sensors, all managed by an onboard computing architecture featuring a CPU, GPU, and a neural network processing unit. The local alpha model generates control commands in the form of action chunks, which represent desired future trajectories. These action chunks are then processed by a whole body controller that translates them into precise joint torque commands for the actuators, enabling physical movement.

In some embodiments, the hierarchical model architecture is trained using a layered data structure and an end-to-end process. The training data includes a foundational layer of internet-scale text and images, a middle layer of synthetic data from physics engines, and a top layer of real-world teleoperation data. This data is annotated by human reviewers who assign numerical cost values to robot actions based on metrics like energy and time. The beta and alpha models are then co-trained using end-to-end backpropagation through the task-conditioning latent vectors, with optimization performed via supervised learning and regression loss functions to minimize the error between the model's predicted actions and the ground-truth demonstration data.

BRIEF DESCRIPTION OF THE DRAWINGS

The drawing figures depict one or more implementations in accordance with the present teachings, by way of example only, not by way of limitation. These figures are intended to illustrate and not to restrict the scope of the disclosure. In the figures, like reference numerals refer to the same or similar elements. This convention is maintained throughout the drawings for consistency.

FIG. 4 is a block diagram of sensors for the humanoid robot of FIGS. 1-3B;

FIG. 5 is a block diagram of a communication interface for the humanoid robot of FIGS. 1-3B;

FIG. 6 is a block diagram of a movement controller for the humanoid robot of FIGS. 1-3B;

FIG. 7 is a block diagram of a behavior manager for the humanoid robot of FIGS. 1-3B;

FIG. 14A is a block diagram of an example hierarchical architecture of a CoBAM;

FIGS. 14B-14D are diagrams depicting example deployment configurations of the example hierarchical architecture of FIG. 14A;

FIG. 16 is a block diagram of listing a collection of cost factors and constraints that may be used in generating the CoBAM;

DETAILED DESCRIPTION

Figure 1:
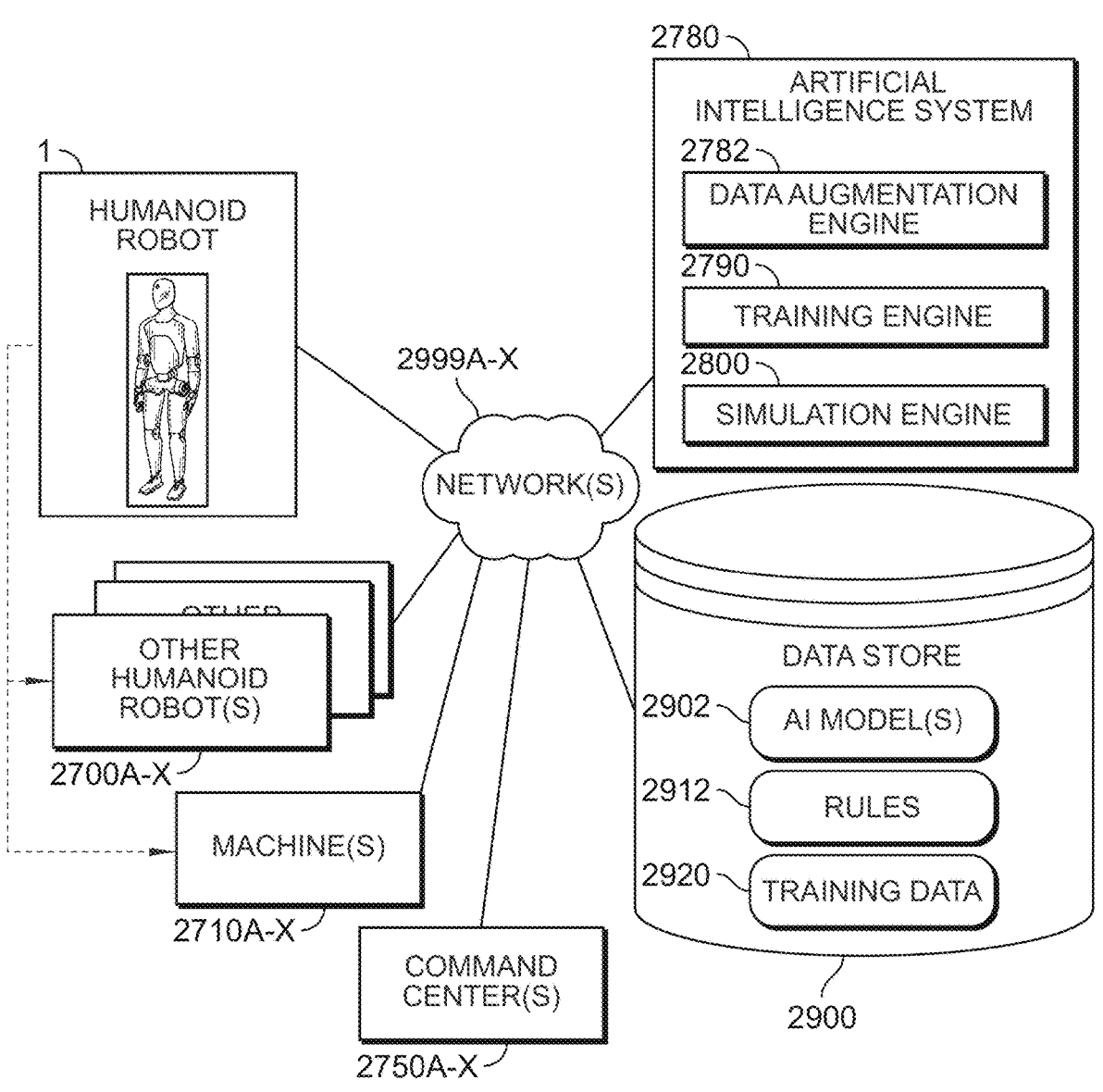
FIG. 1 is a diagram illustrating an environment and a network in which one or more humanoid robots of FIG. 1 may operate, connect, command or be commanded by, control or be controlled by, and/or interact.

In the following detailed description, numerous specific details are set forth by way of examples in order to provide a thorough understanding of the relevant teachings. These examples are illustrative and not exhaustive. It should be apparent to those skilled in the art that the scope of the teachings is not limited to these specific details. Additionally or alternatively, well-known methods, procedures, components, and/or circuitry have been described at a relatively high-level, without detail, in order to avoid unnecessarily obscuring aspects of the present disclosure.

While this disclosure includes several embodiments, there is shown in the drawings and will herein be described in detail certain embodiments with the understanding that the present disclosure is to be considered as an exemplification of the principles of the disclosed methods and systems and is not intended to limit the broad aspects of the disclosed concepts to the embodiments illustrated. As will be realized, the disclosed methods and systems are capable of other and different configurations, and one or more details are capable of being modified, all without departing from the scope of the disclosed methods and systems. For example, one or more of the following embodiments, in part or whole, may be combined consistent with the disclosed methods and systems. As such, one or more steps from the flow charts or components in the Figures may be selectively omitted and/or combined consistent with the disclosed methods and systems. Additionally, one or more steps from the flow charts or the method of assembling the shoulder and upper arm may be performed in a different order. Accordingly, the drawings, flow charts and detailed description are to be regarded as illustrative in nature, not restrictive or limiting.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C). The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A. Introduction

Disclosed herein is a cost-optimized bipedal action model (CoBAM) architecture characterized by a decoupled dual-system design, comprising a high-level cognitive beta model and a low-level reactive motor alpha model. The beta model, which may be a large, pretrained vision-language model with billions of parameters, is responsible for perception, language understanding, and long-horizon planning. It operates at a low frequency to process complex multimodal inputs, such as a user command like "get me a drink from the fridge," and generates a task-conditioning latent vector that encapsulates the semantic goal of the task. This latent vector is then passed to the alpha model, a smaller, high-frequency visuomotor policy with millions of parameters, which translates the high-level intent from the alpha model into precise, continuous robot actions. This separation of concerns allows for independent development and optimization of the reasoning and control components, enabling the robot to benefit from the broad world knowledge of large models while maintaining the real-time responsiveness required for fluid and safe physical interaction in dynamic environments.

A key advantage of the CoBAM is its inherent capability for cost optimization. When presented with a task, the CoBAM is trained to analyze various factors such as energy consumption, time to completion, and user-defined priorities to generate the most efficient plan. For multi-robot scenarios, this extends to decomposing complex tasks into sub-tasks and assigning them to available robots in a way that optimizes the collective effort. This ensures that whether a single robot is sequencing its chores or a team of robots is collaborating on a larger objective, the resulting actions are executed in the most cost-effective manner possible. The placement of the alpha and beta models offers a range of deployment configurations to balance computational resources, latency, and autonomy. A fully local deployment, with both models running on the humanoid robot's onboard hardware, minimizes communication latency and enables network-independent operation, which is suitable for tasks in environments with unreliable connectivity but places a high demand on the robot's computational resources.

The training of a CoBAM relies on a layered data structure designed to provide the model with a broad understanding of the world while grounding it in the specifics of robotic embodiment. The foundational layer consists of vast quantities of internet-scale text, images, and videos, supplemented by human demonstration data, providing a broad base of common-sense knowledge. The middle layer is composed of simulation and synthetic data, offering a scalable way to generate millions of task-specific training examples. The top layer contains the highest-fidelity real-world robot data, collected through teleoperation, which is essential for fine-tuning the model and ensuring its actions are physically plausible. This data explicitly includes examples of multi-robot collaboration, task decomposition, and scheduling based on priorities, enabling the CoBAM to learn complex, cost-optimized coordination strategies.

The training process for a CoBAM can be adapted to its specific architecture, such as an alpha model-only or a combined alpha/beta model, and can be based on imitation learning, reinforcement learning, or other types of learning. For a co-trained combined alpha/beta model, the process is end-to-end, where the error between the alpha model's predicted action and a ground-truth demonstration is back-propagated through both models. This allows the high-level beta model to be fine-tuned and its general knowledge to be grounded in the physical actions of the alpha model, leading to a more robust and generalizable policy that inherently understands cost-efficiency and collaborative tactics.

The deployment of a trained CoBAM involves a continuous, closed-loop process of perception, planning, and action. During runtime, the deployed model receives a stream of multimodal inputs, including user commands and real-time sensor data. For multi-robot tasks, the CoBAM can operate in various collaborative frameworks, including remote server, master-robot, or consensus-based systems, to determine the optimal distribution of sub-tasks. The model outputs a sequence of action chunks representing the desired future trajectory for one or more robots. These high-level actions are then translated into low-level motor commands by a whole-body controller of the respective robot, which performs safety checks before execution. The robots' new states are then fed back into the CoBAM, enabling a continuous cycle of action generation that allows the robots to perform long-horizon, cost-optimized tasks and dynamically adapt to their environment.

The disclosed CoBAM integrates artificial intelligence models into a tangible system that solves significant, long-standing technological problems in robotic control. The disclosed CoBAM is not merely an instruction to "apply" an abstract idea on a generic computer; rather, it is a particular technological solution to a deeply rooted technological problem. A primary technical improvement is its revolutionary approach to whole-body, continuous, and cost-optimized control for single and multiple robots. Conventional systems are often confined to controlling a 7-degree-of-freedom (DoF) end-effector with discrete outputs, resulting in movements that are clunky and imprecise. The CoBAM architecture overcomes this by providing direct, continuous control over the full sixty-two degrees of freedom of the humanoid robot, enabling coordinated, human-like motions. This constitutes a specific, tangible improvement to the functioning and capability of the robot itself.

Action chunking is used for the CoBAM output, where the model predicts a sequence of multiple future actions in a single inference step. This approach mitigates compounding errors in imitation learning, handles non-Markovian behaviors, and decouples the model's low inference frequency from the robot's high control frequency, achieving smooth motion. Various action chunking strategies can be employed, from simple sequential execution to more advanced asynchronous methods like real-time chunking and temporal ensemble, which improve motion smoothness and reactivity by overlapping the prediction and execution of action chunks.

A significant advantage of the CoBAM lies in its ability to output cost-optimized assignments and actions for one or more robots, providing a particular solution to the technical problem of efficient and intelligent task execution. This cost optimization is multi-faceted, encompassing metrics like energy consumption, time to completion, resource utilization, and adherence to user-defined priorities or preferences. For a single robot, this translates to dynamic scheduling; for instance, it may prioritize a time-sensitive task or sequence its actions to minimize movement and conserve battery life. In a multi-robot context, the CoBAM addresses the complex challenge of collaborative work by dynamically decomposing high-level tasks into discrete sub-tasks. It then generates an optimal assignment plan based on the real-time state of the robot fleet, considering factors like each robot's location, capabilities, and current workload. This intelligent, adaptive planning and scheduling capability, which stems from the model's training on diverse cost-annotated and collaborative data, represents a substantial improvement over conventional systems that rely on rigid, pre-programmed logic, enabling a more efficient, flexible, and truly autonomous robotic workforce.

B. Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Although selected human medical terminology is used to describe features and/or relative positions related to the bipedal or humanoid robot, it should be understood that said medical terminology may not directly correspond to the exact same features of a human. It should be understood that names of various assemblies and components (e.g., including housings and assemblies contained within) may generally relate to a location of similar anatomy of a human body and may not have an exact correlation in dimension, function, or shape. The reference system including three orthogonal reference planes is defined with respect to the robot in a neutral standing position to describe relative positions of components of the robot. Although standard human medical terminology is used to describe the anatomical reference planes (i.e., sagittal, coronal, transverse) of the robot, the planes may be shifted from the typical location on a human to be meaningful for the kinematic layout and features of the robot.

Humanoid Robot: a robot that is capable of bipedal locomotion and includes components (e.g., head, torso, etc.) that generally resemble parts of a human. However, the robot does not need to include every part of a human (e.g., hands with over ten degrees of freedom), nor do its components need to have a shape that exactly or substantially resembles human parts. Furthermore, it should be understood that a humanoid robot is not designed to be primarily quadruped or have a wheeled base.

Neutral State: a state where the robot is standing upright on a horizontal support surface (PG) and facing a forward direction with its torso substantially vertically aligned over its pelvis and legs, where the legs are substantially straight with the knees substantially aligned under the hips and substantially above the ankles, such that the robot's weight is balanced over its feet. In the neutral state, the robot's head is facing forward (i.e., in the forward direction), the arms are located at the sides of the robot, the hands are oriented with the palms facing substantially inward, and the fingers pointing in a substantially downward direction toward the horizontal support surface. An illustrative example of the neutral state for the humanoid robot 1 is shown FIG. 3A.

Figure 3A:
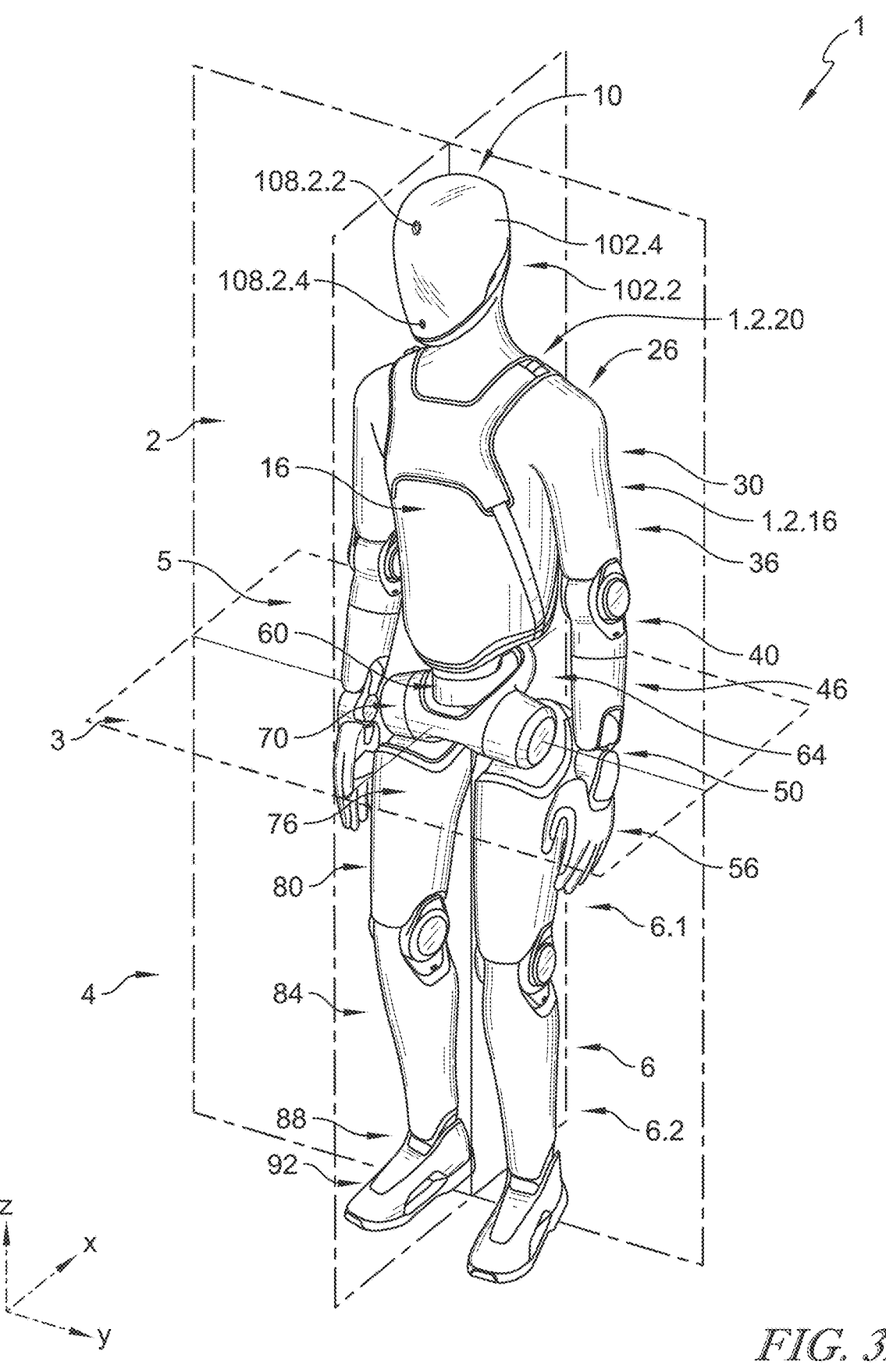
FIG. 3A is a perspective view of the humanoid robot of FIGS. 1-2.
Figure 3B:
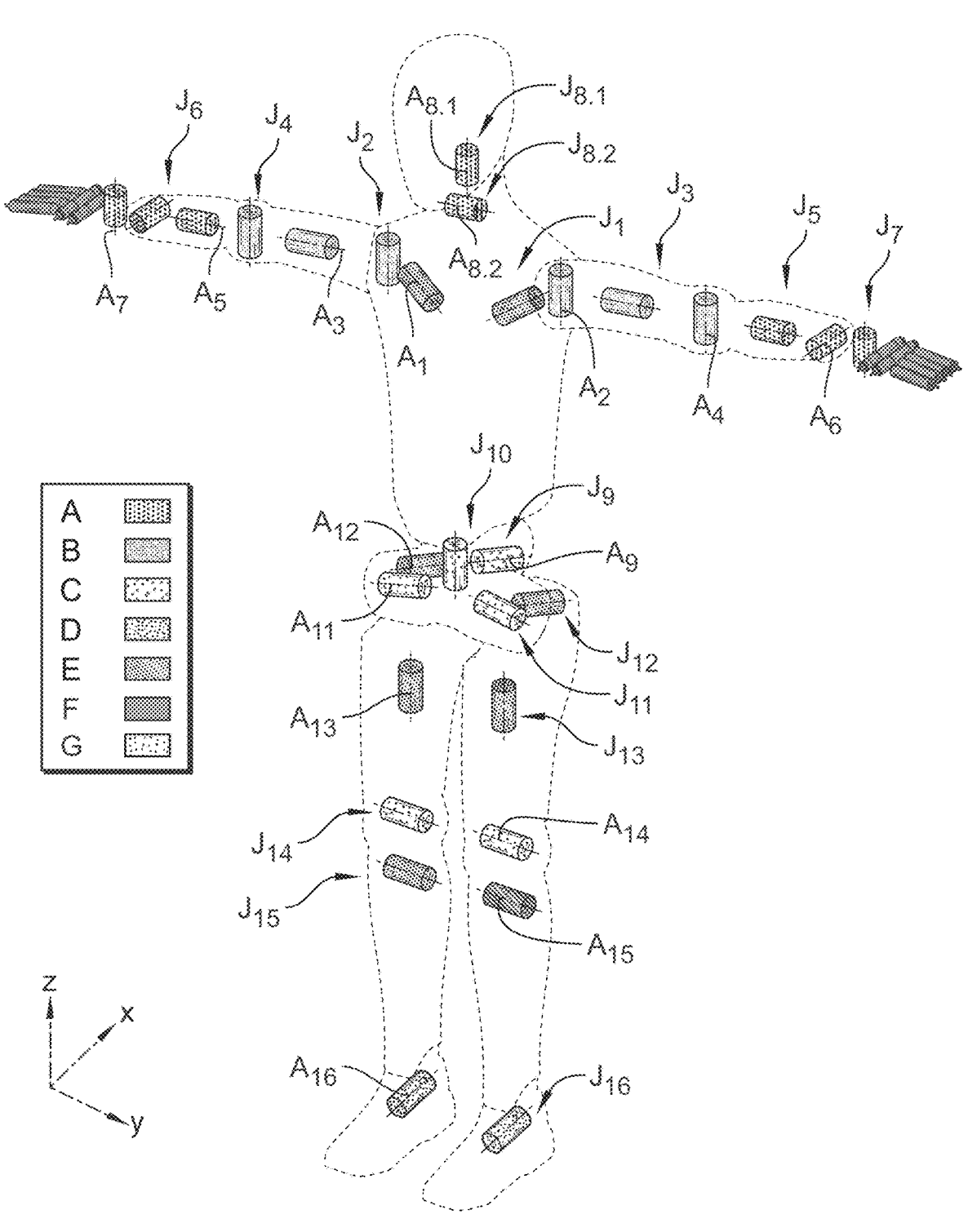
FIG. 3B is a diagram illustrating actuators contained within the humanoid robot of FIGS. 1-3A and the corresponding rotational axes of said actuators.

Extended State: a state of the robot with the arms extended outward laterally at the shoulder (as illustrated in FIG. 3B) and oriented with the palms of the hands substantially facing downward and the fingers pointing in a substantially outward direction, where the central and lower portions of the robot remain in a neutral state.

Sagittal Plane: a vertical plane when the robot is in the neutral state that aids in defining left and right sides of the robot for all states. Accordingly, the sagittal plane may: (i) divide the robot and/or the torso into left and right portions or halves, (ii) extend through an axis of rotation about which the torso twists or rotates relative to the pelvis and legs, (iii) contain an origin point of the robot, and/or (iv) be positioned between the left and right legs, and/or left and right arms. In an illustrative embodiment, the sagittal plane ($P_S$) (e.g., as illustrated in FIG. 3A) is a vertical plane positioned at a midway point between the left and right legs and the left and right arms and contains a rotational axis $A_{10}$ of a torso twist actuator (J10) (e.g., as illustrated in FIG. 3B) located in the spine 60 of the robot 1 and divides the left and right sides of the robot 1 (e.g., as illustrated in FIG. 3A). In other words, in an illustrative embodiment, the sagittal plane ($P_S$) is a plane that is colinear with the rotational axis $A_{10}$ of the torso twist actuator (J10).

Coronal Plane: a vertical plane when the robot is in the neutral state that aids in defining front and back portions of the robot for all states. Accordingly, the coronal plane may: (i) divide the robot and/or the torso into front and back portions or halves, (ii) contain an axis of rotation about which the torso pitches forward or backward from the neutral state, (iii) contain an axis of rotation of a knee joint about which a lower shin pitches forward and backward, and/or (iv) contains an axis of rotation of an elbow joint about which a lower forearm moves forward and backward, when the robot is in the extended state. In various embodiments, said axis of rotation for torso pitch may be two colinear axes, a single centrally located axis, an axis defined by a line connecting the midpoints of two non-collinear actuator axes that provide the torso pitch function, or an axis defined by a line connecting the center of actuator bearings of two actuators that provide the torso pitch function. In the illustrative embodiment (see, e.g., FIGS. 3A and 3B), the coronal plane ($P_C$) is a vertical plane that contains the rotational axes $A_{11}$ of the hip flex actuators (J11) located in the hips 70 (and likewise may contain an axis defined by a line connecting the midpoints of a left hip flex actuator (J11) axis ($A_{11}$) and a right hip flex actuator (J11) axis ($A_{11}$) and rotational axis $A_{10}$ of torso twist actuator (J10) located in the spine 60 of the robot 1. As shown in these figures, the coronal plane ($P_C$) does not bisect the robot, or torso, into equal front and back halves, as it is offset forward of a majority of the arm actuators in the extended position, and other positional relationships that can be understood from the figures.

Transverse Plane: a horizontal plane that aids in defining the upper and lower portions of the robot. Accordingly, the transverse plane may: (i) divide the robot into upper and lower portions or halves, and/or (ii) contain an axis of rotation about which the torso pitches forward or backward, as discussed above. In the illustrative embodiment, the transverse plane (PT) is a horizontal plane that contains the mid-point of the rotational axes $A_{11}$ of the hip flex actuators (J11) located in the hips 70 of the robot 1.

Origin Point: an orthogonal intersection point of the sagittal plane, coronal plane, and transverse plane, all of which extend through the humanoid robot disclosed herein. In the illustrative embodiment of the robot 1 shown in FIG. 3A, an origin point ($C_P$) is present and shown.

Reference Axes: consist of: (i) the Z-axis (vertical) is defined pursuant to the intersection of the sagittal plane and coronal plane, (ii) the Y-axis (horizontal) is defined pursuant to the intersection of the coronal plane and transverse plane; and (iii) the X-axis (depth) is defined pursuant to the intersection of the sagittal plane and transverse plane. FIG. 3A illustrates example Z, Y, X reference axes where the sagittal, coronal, and transverse planes share a common origin point.

Kinematic Chain: a representation of an assembly of rigid bodies connected by joints to provide constrained motion. Within this application, e.g., FIG. 3B, a kinematic chain is illustrated by cylindrical bodies, where the respective central axis of each individual cylindrical body represents the position and orientation of the axis of rotation for the individual joints. For example, each rotary actuator has a central rotational axis. Other types of actuators may include linkages that provide rotational movement about one or more rotational axes via linkages, bearing or other rotation features, or other means.

Range of Motion: a range of rotational motion of an actuator about an axis of rotation, where a first and second angle define a rotational limit in opposing rotational directions from a neutral position of the actuator with the limits expressed in Radians.

Degrees of Freedom (DoF): the number of parameters that define the configuration of the kinematic chain and possible movements associated therewith.

Singularities: geometric configurations of the robot's joints in which one or more degrees of freedom are effectively lost due to the alignment or overlap of rotational or translational axes, which in some cases is also affected by interference of extents of components where one or more of the components are moved by the joint.

Actuator Bearing: a specific component of the individual actuator that is generally ring-shaped with parallel edge guides, wherein the rotational axis ($A_n$) of the actuator is centered within the actuator bearing and orthogonal to the parallel edge guides. Within this application, the actuator bearings of individual actuators are referenced to further define orientation of the rotational axes and/or relative size of the individual actuator.

Actuator bearing plane ($B_n$): a plane defined mid-width of actuator bearing between parallel edge guides and orthogonal to the rotational axis ($A_n$).

Textile: a flexible (e.g., fabric-like), highly durable cover material that has high clastic stretch capabilities and is resistant to pilling, abrasions, and cuts. A textile includes both common textiles (e.g., traditional woven cloth), engineered textiles, and non-fabric-like materials (e.g., plastics or polymers), and/or a combination of the above.

C. Robot(s) and Environment

FIG. 1 illustrates an exemplary network and/or operational environment in which a humanoid robot (also referred to as a bipedal robot) 1, which is further detailed in additional figures herein, may operate. The environment may include a plurality of interconnected components, such as: (i) the humanoid robot 1, (ii) one or more other humanoid robots 2700A-X which may the same as or different from the robot 1, (iii) one or more machines 2710A-X, (iv) one or more command centers 2750A-X, (v) one or more remote artificial intelligence (AI) system(s) 2780 which are remote from the robot 1, such as a cloud-base AI system, and (vi) one or more data stores 2900. Each component may be interconnected with another component, directly or indirectly, by at least one of: (i) one or more networks 2999A-X, (ii) direct communication systems (not illustrated—e.g., a data store 2900 may have direct communication with a remote AI system 2780) and/or (iii) physical contact with one another (e.g., the humanoid robot 1 may be in direct physical contact when operating a machine 2710A-X). The one or more networks 2999A-X may include, for example, the Internet, a local area network, a wide area network, a private network, a cloud computing network, or a network based on a wireless communication protocol. Additionally, it should be understood that the humanoid robot 1 may be interconnected with one or more other humanoid robots 2700A-X through a wireless communication protocol, such as a Bluetooth connection or a connection based on a near-field communication protocol, or through a wired connection.

The humanoid robot 1 may be collocated with one or more of the other humanoid robots 2700A-X to collectively or separately perform a given task or workflow. Such operations may occur, e.g., at a worksite such as a factory, warehouse, industrial facility, or home. Furthermore, the humanoid robot 1 may also be situated in a separate geographical location relative to other humanoid robots 2700A-X. For example, the humanoid robot 1 may be located in a given worksite, while another humanoid robot 2700A-X is located at another worksite in a different geographical location.

The operational environment may generally include machines 2710A-X, which may be embodied as any device, heavy machinery, or object with which a humanoid robot 1 and/or other humanoid robots 2700A-X may interact. For instance, a machine 2710A-X can include, among other things, tools, packaging machinery, forklifts, drilling machines, pallet movers, HVAC equipment, carts, bins, and platform machines.

The command centers 2750A-X may be comprised of one or more physical computing devices or virtual computing instances executing on a local or cloud network. These centers 2750A-X may be utilized for one or more of monitoring, managing, and configuring tasks, as well as for issuing control directives to the humanoid robot 1 and other humanoid robots 2700A-X at one or more worksites. A command center 2750A-X may be collocated with any of the humanoid robot 1 or the other humanoid robots 2700A-X, or it may be located in a different geographical location from the robots 1 and other humanoid robots 2700A-X. The computing devices of the command centers 2750A-X may execute software that is used to monitor (e.g., charge level, task performance, etc.), manage the robots 1 and other humanoid robots 2700A-X, and/or transmit long-horizon goals, tasks, and control directives to the robots 1 and other humanoid robots 2700A-X over the networks 2999A-X. Additionally and as such, the humanoid robots 1 and other humanoid robots 2700A-X may each be configured to: (i) send data to the command centers 2750A-X, (ii) perform a given task based on the transmitted long-horizon goals, tasks, and control directives, and/or (iii) infer a task based on the transmitted long-horizon goals, tasks, and control directives.

The command centers 2750A-X may determine, based on available humanoid robots 1 and the capabilities of each robot, which of the robots may be best suited for a given task. For example, the command centers 2750A-X may identify a humanoid robot 2700A-X to transfer parts to the other room once they are placed in the jig. The command centers 2750A-X may thereafter relay the assignment to the assigned other humanoid robot 2700A-X, which may be identified based on a unique identifier (e.g., serial number) assigned to each of the humanoid robots 1 and 2700A-X, and also to the other humanoid robots 2700A-X to indicate which other humanoid robot 2700A-X has been assigned the task.

The remote AI system 2780 may be comprised of one or more computing devices that are configured to perform global operations related to AI/ML for the entire computing environment. For example, the remote AI system 2780 may store, retrieve, and otherwise manage data within the data store 2900. This data may include one or more AI models 2902, rules 2912, and training data 2920. The AI models 2902 may be embodied as any type of model that: (i) can be run in an environment that is remote from the humanoid robot 1 and 2700A-X, while being in communication with the humanoid robot 1 to enable the humanoid robots 1 and

2700A-X to perform the functions described herein (e.g., observing, reasoning, and performing tasks), (ii) can be sent to the humanoid robot 1 and 2700A-X, where the humanoid robot 1 and 2700A-X runs the model locally to perform the functions described herein, and/or (iii) can be used in the training of any model described herein. For instance, the AI models 2902 may comprise artificial neural networks, convolutional neural networks, recurrent neural networks, generative adversarial networks, variational autoencoders, diffusion models, transformer models, natural language processing models (e.g., speech-to-text and/or text-to-speech), object detection models, image segmentation models, facial recognition models, transfer learning models, autoregressive models, large language models, visual language models, vision-action models, multi-modal language models, graph neural networks, reinforcement learning models, or any other type of model known in the art or disclosed herein. The rules 2912 may be comprised of sets of rules and conditions that are used to enable: (i) deterministic behavior by the humanoid robot 1 and the other humanoid robots 2700A-X, (ii) training the models that enable the humanoid robots 1 and 2700A-X to perform the functions described herein, and/or any other known rule. For example, the rules 2912 may include any combination of finite state machines, reactive control protocols, safety rules, configuration files, task sequencing protocols, safety protocols, and/or protocols for compliance with standards, safety, morals and/or regulations.

The training data 2920 may be embodied as any type of data that is used to train one or more of the AI models 2902. For example, the training data 2920 may include: (i) image data, such as raw image data, annotated image data, or synthetic data comprising computer-generated images used to augment real image datasets, particularly in instances where usable data is scarce; (ii) video data, such as raw video data, annotated video data, or synthetic data; (iii) text data, such as natural language instructions, dialogue data, machine-readable instructions, or natural language mapping data; (iv) depth data, such as map data or point cloud data; (v) robot joint trajectories; (vi) robot joint locations; (vii) robot joint location data, which may be obtained from teleoperation of a robot; (viii) robot joint rotations data, which may also be obtained from teleoperation of a robot; (ix) other robot sensor data, such as inertial measurement unit (IMU) data, force and torque data, or proximity sensor data; (x) simulation data; (xi) human demonstration data, such as first person or third person images or videos of humans performing a task; (xii) robot demonstration data, such as images or videos of other robots performing a task; (xiii) any combination of the aforementioned data types; and/or (xiv) any other known data type. For clarity, it should be understood that any data type that is described above may be either labeled or unlabeled.

The remote AI system 2780 may include a data augmentation engine 2782, a training engine 2790, and a simulation engine 2800. The data augmentation engine 2782 may be embodied as any combination of hardware, software, or circuitry that is configured to increase the size and diversity of the training data 2920, particularly in instances where the training data is limited. For example, the data augmentation engine 2782 may be configured to perform: (i) image augmentation of visual data such as images and video frames (e.g., identifying anatomical point and/or kinematic chains), (ii) sensor data augmentation to simulate real-world inaccuracies like noise, thereby assisting in training the AI models 2902 to account for such inaccuracies, (iii) trajectory augmentation to modify the speed or timing of movements, which assists the AI models 2902 in learning to recognize and adapt to different behaviors, or to alter the trajectories or paths of the robot 1 in simulations, and (iv) domain randomization, which involves altering parameters including textures, lighting, and object positions.

The illustrative training engine 2790 may be embodied as any combination of hardware, software, or circuitry for training the AI models 2902, given a set of rules 2912 and training data 2920. To do so, the training engine 2790 may apply a variety of AI/ML techniques, such as supervised learning techniques (e.g., classification, regression), unsupervised learning techniques (e.g., clustering, dimensionality reduction, anomaly detection), semi-supervised learning techniques (e.g., training with both labeled and unlabeled data), reinforcement learning techniques (e.g., model-free methods, model-based methods), ensemble learning, active learning, and transfer learning techniques (e.g., by leveraging pre-trained models 2902). It should be understood that each of these techniques may be applied online or offline.

The simulation engine 2800 may be embodied as any combination of hardware, software, or circuitry for executing one or more of the AI models 2902 within a virtualized simulation environment. This allows for the simulation and analysis of various aspects of the humanoid robot 1, such as its kinematics, sensor behavior, overall behavior, anomalies, and the like. For example, the simulation engine 2800 may generate the simulation environment based on real-world mapping data that was previously observed and/or generated by the humanoid robot 1 or other humanoid robots 2700A-X, or that was obtained from third-party services. The simulation engine 2800 may also generate a physics-accurate model of the humanoid robot 1, which has a specified configuration (e.g., a physical structure, joints, sensors, actuators, and other components with predefined parameter sets). The data generated from the simulations may then be used by the training engine 2790 to build, train, alter, fine-tune, or modify a previously generated model, a new model, and/or rules. Advantageously, the simulation engine 2800 is designed to improve efficiencies in the manufacture, testing, and deployment of a given humanoid robot 1 for a specified purpose.

The remote AI system 2780 may account for the substantial computing and resource demands required by AI/ML-based techniques by processing at least a portion of data, requests, and/or training. As such, the humanoid robots 1 may be configured with considerably less powerful compute, network, and storage resources. For instance, the humanoid robot 1 may prioritize certain processes, such as those relating to the performance of a presently assigned task, and offload other processes, such as the refining of local AI/ML models, to the remote AI system 2780. The remote AI system 2780 may also periodically update the humanoid robots 1 and 2700A-X with refined AI models 2902 and training data 2920, or it may receive updates and propagate them to the robots 1, for instance, via over-the-air updates or push subscription-based updates. The remote AI system 2780 may also push updated rules 2912 to the robots 1 and 2700A-X. Additionally, the remote AI system 2780 may receive data from each of the humanoid robots 1 and 2700A-X, which may include behavioral information, learning information, model reinforcement data, and the like. The remote AI system 2780 may store such data as training data 2920 and subsequently use this data to refine the AI models 2902.

Although FIG. 1 depicts the data augmentation engine 2782, the training engine 2790, and the simulation engine 2800 as executing on a single remote AI system 2780, one of skill in the art will recognize that each of these engines may execute on separate systems or computing nodes associated with the remote AI system 2780. Such an arrangement may be advantageous in improving the performance and resource management of each of the engines 2782, 2790, and 2800.

D. Humanoid Robot

Figure 2:
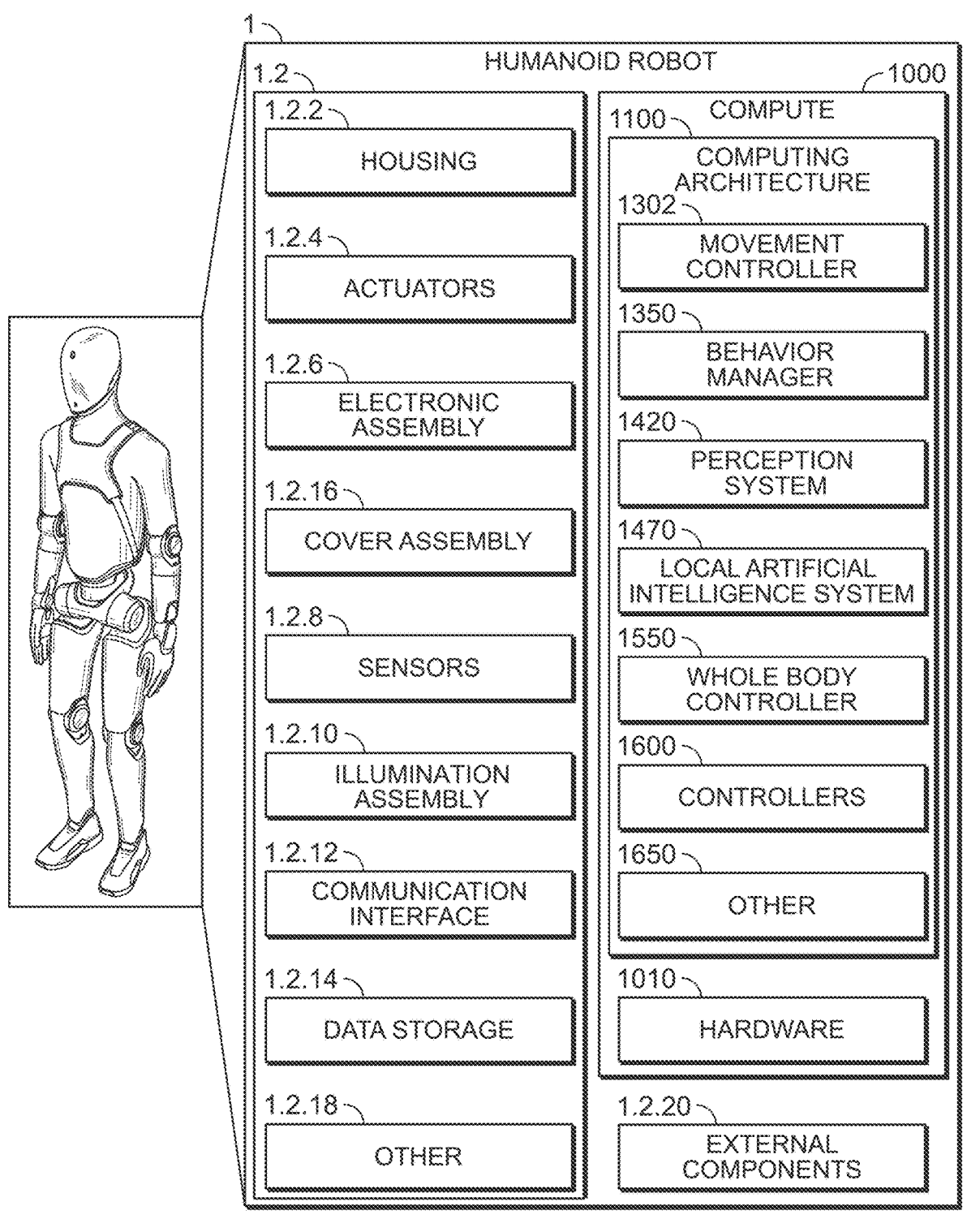
FIG. 2 is a block diagram illustrating components of the humanoid robot of FIG. 1.

FIG. 2 is a block diagram of a humanoid robot 1 that includes a variety of architectures and other components that may include: (i) a mechanical/electrical architecture 1.2 that includes housings 1.2.2, actuators 1.2.4, electronic assembly 1.2.6, sensors 1.2.8, communication interface 1.2.12, illumination assembly 1.2.10, data storage 1.2.14, exterior covering assembly 1.2.16, external components 1.2.20, other components 1.2.18, and (ii) compute 1000 that includes a computing architecture 1100.

a. Humanoid Robot Configuration

The high-level configuration for the robot 1 includes assemblies that function together to provide the robot with a humanoid shape and enable said robot to perform human-like movements. As such, the structures and kinematic principles that are inherent to non-humanoid systems cannot be simply adopted or implemented into a humanoid robot 1 without undergoing careful analysis and empirical verification against the complex realities of design, testing, and manufacturing. Theoretical designs that attempt such direct modifications are insufficient, and in some instances woefully insufficient, because they amount to mere design exercises that are not tethered to the complex realities of successfully creating a functional, general-purpose humanoid robot.

i. Robot Components

In addition to the general systems, assemblies, components, and parts described above, the humanoid robot 1 in the illustrative embodiment shown in FIG. 3A may include the following systems, assemblies, components, and parts, which can be broadly categorized into three regions. As shown in FIG. 3A, these three regions include: (i) an upper portion 2, which includes a head and neck assembly 10, a torso 16, left and right arm assemblies 5, and left and right hands 56; (ii) a central portion 3, which includes a spine 60, a pelvis 64, and left and right upper leg assemblies 6.1 of left and right leg assemblies 6; and (iii) a lower portion 4, which includes left and right lower leg assemblies 6.2 of leg assemblies 6.

In the illustrative embodiment shown in FIG. 3A, each arm assembly 5 may include a shoulder 26, an upper humerus 30, a lower humerus 36, an upper forearm 40, a lower forearm 46, and a wrist 50. The hand 56 is coupled to the wrist 50. Each leg assembly 6 may include: (i) an upper leg assembly 6.1, which may comprise a hip 70, an upper thigh 76, and a lower thigh 80, and, (ii) a lower leg assembly 6.2, which may comprise a shin 84, a talus 88, and a foot 92. In other embodiments, some of these systems, assemblies, components, or parts may be omitted, combined, or replaced with alternative designs.

1. Head and Neck Assembly

The head and neck assembly 10 of the humanoid robot 1 may be designed to enhance its anthropomorphic characteristics, while also providing functional capabilities that support interaction, perception, and communication. The head and neck assembly 10 is coupled to a torso 16 and possesses an overall shape that generally resembles the general shape of a human head. The head and neck assembly 10 is, however, specifically designed to lack pronounced human facial structures, such as checks, eye protrusions, a mouth, or other moving parts, to maintain a non-humanlike appearance. The exterior surface of the head 10.1 is characterized by an absence of large flat surfaces (e.g., the head 10.1 is not a cube or prism) and the head is also not formed with significant cylindrical features or perfect circles. Instead, almost all exterior surfaces of the head 10.1 are curvilinear or contain substantial curvilinear aspects, which presents a generally egg-shaped appearance when viewed from the front or top.

Structurally, the head 10.1 is symmetrical about the sagittal plane $P_S$ but is asymmetrical about Z-Y and X-Y planes that intersect the head and are parallel to the coronal plane ($P_C$) and the transverse plane ($P_T$), respectively. The width (parallel to the y-axis) and depth (parallel to the x-axis) of the head 10.1 change constantly from top to bottom, reaching a maximum dimension in the temple region, which is located at approximately 30-50% of the head's height from its top end.

The head 10.1 itself may house a range of components, such as high-resolution cameras, microphones, and displays, all of which are contained within an impact-resistant polymer shell 102.2. This shell 102.2 includes a large, freeform (i.e., not conforming to a regular or formal structure or shape) frontal shield 102.4 that covers the frontal and crown regions of the head 10.1. The frontal shield 102.4 is formed as a separate and distinct piece from the displays positioned behind it, thereby protecting the displays and internal electronics from damage. This separation provides a significant advantage during the performance of industrial tasks, as a damaged frontal shield 102.4 is substantially cheaper and easier to replace than a damaged display. The frontal shield 102.4 extends rearward beyond an auricular region into an occipital region and extends down to a chin region, but it does not extend below a jaw line.

Cameras embedded within the head 10.1 may include RGB, depth-sensing, thermal imaging capabilities and/or any other cameras disclosed herein, which are designed to enable the humanoid robot 1 to perform tasks such as object recognition, environmental mapping, and facial expression analysis. For the specific purpose of generating a low-latency Virtual Reality (VR) view, a pair of high-resolution, high-frame-rate RGB cameras with global shutters may be utilized. For example, this pair of cameras may be the vertically arranged cameras 108.2.2 and 108.2.4, or they may be horizontally arranged internal/external cameras. Microphones may be arranged in an array to facilitate directional audio input and noise cancellation, which enhances the ability of the humanoid robot 1 to understand and respond to verbal commands.

Displays integrated into the head 10.1 may serve as user interfaces, providing visual feedback or conveying expressions to improve communication and user engagement. Unlike the heads of conventional robots, the disclosed head 10.1 includes a main display 108.4 that is curved in at least one direction and is positioned at an angle relative to a sagittal plane. This curved design permits the inclusion of a larger display with a greater surface area compared to a flat screen, which increases the amount of information that can be conveyed, such as robot status and sensor data. This information is displayed using generic blocks or shapes rather than anthropomorphic features like eyes or a mouth. In addition to the main display 108.4, two side-facing displays are included to show indicia such as the identification number/serial number, battery life, current task, any required safety indicia, and/or any other information associated with the humanoid robot 1.

Further, an extent of the illumination assembly 1.2.10, which comprises a plurality of light emitters, is positioned adjacent to an edge (e.g., lower) of the frontal shield 102.4. These light emitters may be configured to function as indicator lights to communicate the status of the robot 1 to nearby humans—for instance, by emitting light that appears to humans in different colors (e.g., yellow for working, green for idle, red for an error state, or blue for thinking) or illumination sequences—without relying on the main displays. This method of communication may be more power-efficient than displays, and may relay information more rapidly.

Additionally, the head 10.1 may house: (i) other sensors, such as gyroscopes and accelerometers, (ii) heat management systems (e.g., heat pipes, fans, etc.), (iii) wireless communication modules (e.g., 5G cellular, Wi-Fi, Bluetooth) and antennas. To maximize bandwidth and ensure connectivity, a plurality of 5G cellular radios may be positioned in the torso 16 and wired through the neck to the antennas in the head 10.1. The head and neck assembly 10 may also incorporate advanced materials and shock-absorbing structures to protect the sensitive electronic components housed within, which may improve the overall durability and reliability of the humanoid robot 1.

The head and neck assembly 10 may include two primary actuators: a head twist actuator (J8.1) 120, which is responsible for enabling rotational movement of the head 10.1 about axis $A_{8.1}$, which is a vertical (yaw) axis when the robot is in the neutral state, and a head nod actuator (J8.2) 140, which enables rotation of the head 10.1 about the axis $A_{8.2}$, which is a horizontal axis when the robot is in the neutral state. Together, these two actuators may provide two degrees of freedom for the head 10.1, allowing it to perform movements that emulate natural human head motions. The head twist actuator (J8.1) 120 may be positioned within the head and neck assembly 10, while the head nod actuator (J8.2) 140 may be located at the base of the neck. This head twist actuator (J8.1) 120 and head nod actuator (J8.2) 140 may each utilize a motor, a gear reduction system, and sensors or encoders that are similar to the actuator types discussed herein.

The head actuators, J8.1 and J8.2, may work in coordination to position the head 10.1 accurately, enabling the humanoid robot 1 to track objects, focus on specific areas of interest, or maintain eye contact during human-robot interactions. The actuators may be controlled, in conjunction with input from visual and inertial sensors, to execute smooth, human-like movements. For example, the head twist actuator (J8.1) 120 may rotate the head 10.1 to follow a moving object, while the head nod actuator (J8.2) 140 adjusts the pitch to maintain an optimal viewing angle.

Additionally, variations of head 10.1 may include modular head designs that allow for the quick customization or replacement of sensory and communication components. These modular designs may facilitate easy upgrades or modifications to the capabilities of the humanoid robot 1 without requiring extensive changes to the overall head and neck assembly 10. Furthermore, advanced control algorithms may be implemented to enable more natural, biomimetic head movements, potentially incorporating machine learning techniques to adapt and refine the motion patterns of the head 10.1 based on interaction data and environmental feedback.

2. Torso

The torso assembly 16 is a central component within the humanoid robot 1, extending vertically between the waist and the head and neck assembly 10, and horizontally between the shoulders 26. The torso 16 is designed to provide the robot 1 with a generally humanoid shape, offer structural and operable support for the arm assemblies 5 and the head and neck assembly 10, and house and protect internal components, including the arm actuators (J1) 190 and an electronics assembly 1.2.6 housed at least partially within the torso 16.

The electronics assembly 1.2.6 within the torso 16 contains various interconnected components that are essential for the operation of the robot 1, including the battery pack, the compute 1000 (which includes CPUs and GPUs), power distribution unit, and a charging system. The components are strategically positioned to optimize space and balance. The battery pack may be rearwardly offset, positioned in a rear section of the torso 16, while the compute 1000 is placed in a forward section. This spatial distribution helps to maintain a balanced posture, allows for efficient cooling, and maximizes the size and power density of the battery pack. A cooling system may be integrated between the battery pack and the compute 1000 to manage their respective thermal loads. The electronics assembly 1.2.6 may be designed with modularity to facilitate easier maintenance, repair, and upgrades. The charging system may support both wired and wireless protocols. A wired system might use a docking station, while a wireless system could utilize inductive charging, with coils that may be embedded in a housing 1.2.2 and/or the feet 92. The charging system may also include safety features such as overcharge protection and temperature monitoring.

The torso 16 may have a total volume of more than 10 liters, preferably more than 15 liters, and most preferably more than 20 liters. However, the torso 16 has a total volume that is less than 40 liters and most preferably less than 30 liters. The torso 16 also has an uninterrupted internal height that is more than 250 mm, and is preferably near to 300 mm, but is less than 350 mm. This substantial internal volume may accommodate a battery pack that exceeds 2 liters, preferably more than 4 liters, and most preferably more than 6 liters in capacity. Consequently, the humanoid robot 1 may incorporate a battery pack with a capacity exceeding 2.5 kWh, which may provide an operational runtime of over 3.5 hours under normal conditions, and preferably more than 4.5 hours, and most preferably more than 6 hours. In some implementations, the torso 16 may adopt a quasi-trapezoidal prism configuration, wherein its front surface is smaller than its back surface, with angled side shrouds connecting these two sections. This geometric design may enhance the range of motion of the robot 1, particularly by improving its ability to reach across its own body.

3. Arm Assemblies

The arm assemblies include joints between the components that may include interfaces, which are selected to provide high torque transmission efficiency and precise alignment, and may include components such as splined shafts, polygon couplings, Oldham couplings, bellows couplings, jaw couplings, universal joints, magnetic couplings, or flexure couplings. Additionally, the components of the arm assembly may incorporate features such as hard-stops, cooling channels, heat sinks, or other materials, structures, components, or assemblies described herein. For example, a heat pipe may extend from the hand to the lower forearm. Furthermore, the wrist 50 may include a quick-release mechanism that enables the interchange of different end-effectors or tools. Moreover, the housing of each component may be designed with internal reinforcement structures, may be made from various materials (e.g., metal alloys or advanced materials like carbon-fiber-reinforced polymers).

4. Leg Assemblies

The leg assemblies 6 include joints between the components that may include interfaces, which are selected to provide high torque transmission efficiency and precise alignment, and may include components such as splined shafts, polygon couplings, Oldham couplings, bellows couplings, jaw couplings, universal joints, magnetic couplings, or flexure couplings. Additionally, the components of the leg assembly may incorporate features such as hard-stops, cooling channels, heat sinks, or other materials, structures, components, or assemblies described herein. For example, a heat pipe may extend from the knee to the shin 84. Furthermore, the talus 88 may include a quick-release mechanism that enables the interchange of a different foot 92. Moreover, the housing of each component may be designed with internal reinforcement structures, may be made from various materials (e.g., metal alloys or advanced materials like carbon-fiber-reinforced polymers).

To enhance the stability and adaptability of the humanoid robot 1, the leg assemblies 6 may incorporate advanced sensing and control systems, as well as comprehensive protective systems. For instance, force sensors located in the feet 92 and ankles may provide real-time feedback on ground contact forces and pressure distribution. This data may be used by the control system of the humanoid robot 1 to make rapid adjustments in order to maintain balance, especially when moving on uneven or dynamic surfaces. Inertial measurement units (IMUs) positioned in the leg assemblies 6 and the pelvis 64 may also provide crucial information on the orientation and acceleration of each leg segment, thereby allowing for the precise control of leg positioning during movement.

b. Mechanical and Electrical Architecture

The mechanical and electrical architecture 1.2 may be embodied as any combination of hardware, software, and circuitry that enables the humanoid robot 1 to operate and perform physical functions in response to electrical charges or electrical signals. As illustrated comprehensively in additional figures herein, the robot 1 is composed of a plurality of assemblies and components that are specifically arranged to emulate or generally resemble human anatomical structures and their functional characteristics. A humanoid form is advantageous because it enables the robot 1 to execute a wide range of general tasks that are typically performed by humans, such as walking between different locations, handling and moving objects, and retrieving items from various positions and orientations. Non-humanoid forms (e.g., wheeled robots or quadrupeds) typically lack the versatility and effectiveness that are required to perform such a diverse array of generalized tasks.

i. Actuators

The actuators 1.2.4 contained within the robot 1 include thirty actuators (J1)-(J16), excluding the end effectors, that are housed within various components of the robot 1 to actuate movement of said components. An additional aggregate total of twelve actuators are in both hands 56 combined. Below is a summary table showing the actuator 1.2.4 reference names and numbers for the thirty actuators (J1)-(J16), the quantity of each, descriptive actuator names used herein for consistency, common corresponding informal actuator names, and associated rotational axes from the high-level configuration of the illustrative embodiment robot 1. Specific actuators in each hand 56 (e.g., six actuators in each hand) are not individually included in the table below.

TABLE 1

| Actuator | Qty | Actuator Name | Informal Actuator Name(s) | Axis |
|---|---|---|---|---|
| (J1) 190 | 2 | arm | primary arm | $A_1$ |
| (J2) 280 | 2 | shoulder | (none) | $A_2$ |
| (J3) 320 | 2 | upper arm twist | upper arm x, upper arm roll | $A_3$ |
| (J4) 374 | 2 | elbow | arm z, arm yaw, lower humerus | $A_4$ |
| (J5) 468 | 2 | lower arm twist | lower arm x, lower arm roll | $A_5$ |
| (J6) 484 | 2 | wrist flex | wrist/hand y, wrist/hand pitch, flick | $A_6$ |
| (J7) 520 | 2 | wrist pivot | wrist/hand z, wrist/hand yaw, wave | $A_7$ |
| (J8.1) 120 | 1 | head twist | head no | $A_{8.1}$ |
| (J8.2) 140 | 1 | head nod | head yes | $A_{8.2}$ |
| (J9) 680 | 1 | torso lean | spine x, torso/spine roll | $A_9$ |
| (J10) 620 | 1 | torso twist | spine z, torso/spine yaw | $A_{10}$ |
| (J11) 720 | 2 | hip flex | hip y, hip/leg pitch, forward kick | $A_{11}$ |
| (J12) 768 | 2 | hip roll | hip x, hip/leg roll, sideways kick | $A_{12}$ |
| (J13) 782 | 2 | leg twist | hip z, hip/leg yaw | $A_{13}$ |
| (J14) 820 | 2 | knee | lower thigh, lower leg y, lower leg pitch, rear kick | $A_{14}$ |
| (J15) 860 | 2 | foot flex | foot y, foot pitch, or first ankle | $A_{15}$ |
| (J16) 900 | 2 | foot roll | talus, foot roll, foot x, second ankle | $A_{16}$ |

It should be understood that in other embodiments, some of these systems, assemblies, components, and/or parts may be omitted, combined, or replaced with alternative systems, assemblies, components, and/or parts.

ii. Sensors

As illustrated in FIG. 4, sensors 1.2.8 may be embodied as any hardware, software, and/or circuitry for providing sensor data indicative of perceived stimuli, conditions, and measurements to enable the humanoid robot 1 to process, reason, and act appropriately (e.g., based on a given task, a set of rules, and/or other constraints). The sensors 1.2.8 may include one or more torque sensors 1.2.8.2, inertial sensors 1.2.8.4, visual sensors 1.2.8.6, auditory sensors 1.2.8.8, touch sensors 1.2.8.10, proximity sensors 1.2.8.12, environmental sensors 1.2.8.14, and other sensors 1.2.8.16. The sensors 1.2.8 may provide sensor data (e.g., torque, inertia measures, audiovisual sensor data, touch data, proximity data, environmental data, etc.) to the compute 1000 processors, further described below, to enable appropriate interaction between the humanoid robot 1 and the environment.

The torque sensors 1.2.8.2 may comprise one or more torque cells that are positioned within the actuators and are designed to measure the amount of force or torque applied to a part of the humanoid robot 1. The measurements may be transmitted to other components of the humanoid robot 1, such as the whole body controller 1550 or one or more controllers 1600, to enable balance, locomotion, manipulation, and handling by the humanoid robot 1.

The inertial sensors 1.2.8.4 may comprise sensors for measuring the motion, position, and orientation of the humanoid robot 1 relative to the environment for purposes of navigation, stabilization, and interaction with the environment and surroundings. For example, the inertial sensors 1.2.8.4 can include one or more accelerometers (e.g., to measure acceleration forces in one or more directions for use in determining changes in velocity and orientation), gyroscopes (e.g., to measure angular velocity for use in tracking rotational movement and maintaining balance), IMUs (e.g., combining the accelerometers and gyroscopes for use in providing comprehensive motion and orientation data), and Global Positioning System (GPS) receivers (e.g., to provide location data based on satellite signals, for use in outdoor navigation and positioning).

The visual sensors 1.2.8.6 may comprise sensors for capturing visual data, including cameras (e.g., red-green-blue (RGB) standard color cameras, grayscale monocular cameras, and stereo cameras (e.g., to capture depth perception)), depth cameras (e.g., depth cameras using technologies such as structured light or time-of-flight to measure distance to objects, Azure® Kinect® depth camera, Intel® RealSense® depth camera, etc.), LIDAR (Light Detection and Ranging) sensors (e.g., to measure distance to objects by emitting laser pulses, analyze the reflections, and provide detailed 2D or 3D maps of the environment), radar (e.g., to detect objects via radio waves and measure distance and speed for use in various applications including navigation and obstacle detection). Visual sensors 1.2.8.6 may also include event-based cameras, which report changes in pixel intensity rather than full frames, offering advantages in speed and data efficiency for dynamic scenes. Examples of said visual sensors 1.2.8.6 include the cameras 108.2.2 and 108.2.4 contained in the head 10.1 of the robot 1.

The auditory sensors 1.2.8.8 may comprise sensors for capturing audio data, including microphones (e.g., to capture audio signals for voice recognition, environmental noise detection, or communication), ultrasonic transducers (e.g., to capture distance measurement and obstacle detection through high-frequency sound waves), spatial audio sensors such as microphone arrays and direction of arrival sensors (e.g., to capture sound from different locations to determine the direction and distance of sound sources for 3D positioning). Auditory sensors 1.2.8.8 could also include specialized acoustic sensors for detecting specific sound patterns, such as the sound of failing machinery or distress calls, further enhancing the robot's environmental awareness.

The touch sensors 1.2.8.10 may comprise sensors for detecting physical contact or pressure applied to the surface of the humanoid robot 1, e.g., to enable tactile feedback, safety and collision avoidance, object handling and manipulation, and interaction with the environment and surroundings. Example touch sensors 1.2.8.10 may include pressure sensors to measure an amount of pressure applied to a surface by the humanoid robot 1, such as capacitive sensors (e.g., to detect touch or proximity through changes in capacitance), resistive sensors (e.g., to detect pressure or touch by measuring changes in resistance), piezoelectric sensors (e.g., to generate an electrical charge in response to mechanical stress or pressure and detect vibrations or impact), force-sensitive resistors (e.g., to change resistance based on the amount of applied force), and optical touch sensors (e.g., to use light beams or infrared to detect touches or proximity). Alternative touch sensors 1.2.8.10 may involve artificial skin technologies that provide a more distributed and nuanced sense of touch, capable of detecting not only contact but also shear forces and temperature changes on the robot's surfaces.

The proximity sensors 1.2.8.12 may comprise sensors for detecting the presence or absence of objects within a given range without necessarily making physical contact with the object, e.g., to provide obstacle avoidance, navigation, and object detection. Example proximity sensors 1.2.8.12 can include ultrasonic sensors (e.g., to measure distance by emitting ultrasonic waves and detecting reflection of the waves for avoiding obstacles and measuring distance) and infrared rangefinders (e.g., to detect, using infrared light, the presence or distance of objects for proximity sensing and simple obstacle detection). Capacitive proximity sensors may also be used as part of proximity sensors 1.2.8.12, particularly for close-range interactions.

The environmental sensors 1.2.8.14 may comprise sensors for measuring various physical parameters of the environment and surroundings to enable the humanoid robot 1 to interact with the environment and surroundings, adapt to changes in the environment and surroundings, and perform a given task. Example environmental sensors 1.2.8.14 can include thermocouples (e.g., to measure temperature by generating a voltage proportional to temperature difference), thermistors (e.g., to measure temperature based on changes in resistance), magnetometers (e.g., to measure magnetic fields for navigation and orientation), light sensors (e.g., to measure intensity of light in the environment), gas sensors (e.g., to detect presence and concentration of various gases and monitor air quality), and humidity sensors (e.g., to measure relative humidity in the air). Other environmental sensors 1.2.8.14 could include barometric pressure sensors for altitude determination or weather prediction, radiation sensors for operation in hazardous environments, or particulate matter sensors for air quality assessment in industrial settings.

iii. Communication Interfaces

The communication interfaces 1.2.12 may be embodied as any hardware, software, or circuitry to enable the exchange of data, signals, and other forms of communication between different components within the humanoid robot 1, and between the humanoid robot 1 and other systems (e.g., other humanoid robots 2700A-X, the command centers 2750A-X, the remote AI system 2780), and other components and devices interconnected over the networks 2999A-X. Specifically, FIG. 5 shows that the humanoid robot 1 may be configured with a variety of communication interfaces 1.2.12. The communication interfaces 1.2.12 may be embodied as any combination of a communication circuit, device, or collection thereof, capable of enabling communications over a network (e.g., the networks 2999A-X). The communication interfaces 1.2.12 may be configured to use any one or more communication technology (e.g., wired or wireless communications) and associated protocols to effect such communication.

Referring to FIG. 5, examples of communication interfaces 1.2.12 include a wireless communication interface 1.2.12.2 (e.g., Bluetooth®, Wi-Fi®, WiMAX, Cellular (e.g., 3G, 4G, 5G), Zigbee, LoRa (Long Range) and RF (Radio Frequency)), a wired communication interface 1.2.12.4 (e.g., Ethernet, USB, Serial Communication (e.g., RS-232, RS-485), and Controller Area Network (CAN) interface)), a local communication interface 1.2.12.6 (e.g., an I2C (Inter-Integrated Circuit), SPI (Serial Peripheral Interface)), and a human-robot communication interface 1.2.12.8 (e.g., voice recognition systems to enable communication through spoken commands using speech recognition technology, touch interfaces such as touchscreens or physical buttons for direct human interaction with the humanoid robot 1). Alternatively or additionally, the human-robot communication interface 1.2.12.8 may include gesture recognition systems or gaze tracking, allowing for more intuitive and non-verbal interaction with human operators. The communication interfaces 1.2.12 may also include a network interface controller (NIC) (not illustrated), which may also be referred to as a host fabric interface (HFI). The NIC may be embodied as one or more add-in-boards, daughtercards, controller chips, chipsets, or other devices that may be used by the humanoid robot 1 for network communications with remote devices.

c. Compute

As illustrated in FIG. 2, the compute 1000 may comprise any combination of hardware, software, and circuitry to perform various computing functions that enable the humanoid robot 1 to operate semi- or fully-autonomously. Specifically, the compute 1000 includes: (i) compute hardware 1010, and (ii) computing architecture 1100. Such functions may include processing long-horizon goals, coordinating with other humanoid robots 2700A-X, processing sensor information, controlling the humanoid robot 1 based on sensor information and goals, controlling the activation or deactivation of mechanical components, learning, simulating, refining behavioral models, and policy management.

i. Hardware

The compute hardware 1010 may operate as one or more general purpose processors or special purpose processors (e.g., digital signal processors, application specific integrated circuits (ASICs), field programmable gate arrays (FPGAs), etc.) that can be configured to execute computer-readable program instructions stored in the aforementioned data storage devices. Such instructions can be executed to provide controller operations (e.g., to activate or deactivate components of the mechanical and electrical architecture 1.2, etc.). Specifically, the humanoid robot 1 may be configured with a variety of processors such as one or more central processing units (CPUs) 1100 (e.g., x86 CPUs, ARM CPUs, RISC-V CPUs, embedded CPUs such as Internet-of-Things CPUs or mobile CPUs), graphics processing units (GPUs) (e.g., ray tracing GPUs, accelerated computing GPUs, embedded GPUs such as system-on-chip (SoC) GPUs or mobile GPUs), neural network processing units (for example, tensor processing units designed for tensor computations in machine learning tasks; dedicated neural network processing units such as Intel Nervana NNP, Graphcore IPU, IBM TrueNorth, or Qualcomm Cloud AI 100; custom neural network processing units such as Amazon Web Services (AWS) Inferentia, Apple Neural Engine, and Huawei Ascend; and Neuromorphic Neural Network Processing Units such as Intel Loihi or BrainChip Akida), and other processors. For example, the other processors may be embodied as a single or multi-core processor, a microcontroller, or other processor or processing/controlling circuit. In some embodiments, the other processors may be embodied as, include, or be coupled to an FPGA, an ASIC, reconfigurable hardware or hardware circuitry, or other specialized hardware to facilitate the performance of the functions described herein.

ii. Architecture

The computing architecture 1100 includes: (i) a movement controller 1302, (ii) a behavior manager 1350, (iii) a perception system 1420, (iv) a local AI system 1470, (v) a whole body controller 1550, (vi) one or more controllers 1600, and (vii) other subcomponents 1650.

1. Movement Controller

Referring to FIG. 6, the movement controller 1302 may be embodied as any hardware, software, or circuitry to determine a sequence of actions or a path for the humanoid robot 1 to achieve a given goal or complete a given task, in light of a current state, a set of constraints (e.g., the capabilities of the robot 1 and the environment and surroundings of the robot 1), and instructions from another sub-component of the robot 1 or another aspect of the overall architecture 1100. To carry this out, the movement controller 1302 may include a variety of components, such as: (i) a coordination engine 1320, (ii) a navigation engine 1370, (iii) a communication module 1344, (iv) a data storage 1346, and/or (v) other 1348.

The disclosed movement controller 1302 overcomes limitations associated with conventional robotic systems by enabling the robot 1 to: (i) coordinate its body using the body coordination planner 1356 and foot placement planner 1360 based on instructions from the local AI system 1470 and/or remote AI system 2780, (ii) navigate its world by mapping its environment (e.g., SLAM) and predict movement of objects within said environment, and (iii) communicate with its environment. The movement controller 1302 also enables the robot 1 to adapt in real-time to dynamic environments by continuously monitoring the execution of its plans and comparing the expected outcomes with actual results. The movement controller 1302 further solves the technical challenge of efficient resource allocation. By considering the current state of the robot 1, available energy, time constraints, and the relative importance of different goals, the movement controller 1302 optimizes the allocation of the computational and physical resources of the robot 1. Furthermore, the movement controller 1302 can addresses the issue of human-robot collaboration by incorporating models of human behavior and preferences into its decision-making process. This allows the robot 1 to generate plans that are not only efficient from a purely mechanical standpoint but are also intuitive and comfortable for human collaborators.

In an embodiment, the coordination engine 1320 receives task inputs from one or more AI systems 1470, 2780 and provides supplemental information to the whole body controller 1550 regarding the state, configuration, and/or position of the robot 1 within its environment. In particular, the coordination engine 1320 can utilize both the body coordination planner 1356 and the foot placement planner 1360 to control the body placement and foot placement of the humanoid robot 1 based on the inputs from the one or more AI systems 1470, 2780. Specifically, the coordination engine 1320 may break down or override the task inputs from the one or more AI systems 1470 to ensure efficient control of the robot 1 within a space, e.g., during movement such as walking, running, or jumping, to ensure balance, stability, and efficient locomotion of the humanoid robot 1. In other embodiments, the coordination engine 1320 and/or most of the movement controller 1302 may be consumed within the one or more AI systems 1470, 2780.

The navigation engine 1370 may be embodied as any combination of hardware, software, and/or circuitry to map the environment and surroundings based on obtained sensor data (and data that may be obtained from external sources such as other humanoid robots 2700A-X, mapping services, weather services, GPS modules, etc.) and to generate one or more paths. The mapping for the environment by the navigation engine 1370 may then be provided to the one or more AI systems 1470, 2780 to enable said systems to plan the next move or task of the robot 1.

The data storage 1346 may be configured to store navigational data generated by the navigation engine 1370 and/or position data generated by the planners 1356, 1360. This navigational data and/or position data may be then fed back into the one or more AI systems 1470, 2780 to enable said systems to plan the next move or task. This data may be categorized as short-term memory data and/or long-term memory data. For example, the short-term memory data may include said position data, which comprises the positions of the robot 1 over the last predefined amount of time (e.g., 1 minute or 5 seconds, or anytime between). Meanwhile, the long-term memory data may include the navigational data, which comprises maps of every place any robot 1, 2700A-X has ever visited or been. The ability to feed different amounts of short-term memory data and/or long-term memory data into the one or more AI systems 1470, 2780 provides a significant advantage over conventional robots, as it can efficiently limit the data needed to perform the task without requiring unnecessary processing power that could not be performed on a mobile robot 1. It should be understood that the movement controller 1302 may be omitted and/or consumed by one or more models (e.g., RL trained models) that are contained within the local AI system 1470.

2. Behavior Manager

Referring to FIG. 7, the behavior manager 1350 may be embodied as any hardware, software, or circuitry for managing behaviors or actions of the humanoid robot 1 based on a given goal, sensor data, and the environment and surroundings of the humanoid robot 1. To accomplish this, the behavior manager 1350 includes: (i) at least one model predictive control engine 1364, (ii) a mode manager 1390, (iii) an autonomy selector 1352, (iv) a communications module 1414, (v) a data storage 1416, and (vi) other modules or components 1418. The disclosed behavior manager 1350 solves several critical technical issues in the field of robotics. One technical issue solved by the behavior manager 1350 is the integration and coordination of multiple modules within a single robotic system. The behavior manager 1350 also solves the technical issue of ensuring that the behaviors of the robot 1 are executed in the correct order, which prevents conflicts and ensures smooth transitions between different actions or states. For example, the manager 1350 might ensure that a "stand up" behavior is completed before a "walk" behavior is initiated, or that an "object recognition" behavior is performed before an attempt to grasp an object is made.

The model predictive control engine 1364 aids in predicting future states of the humanoid robot 1 based on its current state, and/or making decisions to optimize behavior and performance over a given time period. The MPC engine 1364 may select from one or more predefined or learned actions for the humanoid robot 1 to take in response to various stimuli observed by the humanoid robot 1 (e.g., via sensors 1.2.8) and other factors such as assigned tasks to perform. For example, such MPC engine 1364 may select from or utilize different predefined routines or modes to accomplish path planning, obstacle avoidance, object grasping and manipulation, human-robot interaction, task planning and execution, decision making, coordination with other humanoid robots 2700A-X and machines 2710A-X, and safety and regulatory compliance behaviors. Over time, the MPC engine 1364 may communicate with the local AI system 1470 to enable the MPC engine 1364 to refine its selections based on learning algorithms that identify predefined or learned actions for the humanoid robot 1 based on the given tasks, scenarios, and constraints.

Meanwhile the mode manager 1390 can manage modes of the robot 1. Specifically, the mode manager 1390 is configured to select an appropriate mode or set of modes given a specified task, scenario, or constraint. For example, the mode manager 1390 may select between a power mode, a standby mode, a standing mode, a sitting mode, a movement mode (e.g., running, walking, jumping, hovering, etc.), a falling mode, a learning mode, a diagnostic mode, an emergency mode, etc. Over time, the mode manager 1390 may collaborate with the local AI system 1470 to refine its mode selection based on learning algorithms.

The autonomy selector 1352 may be configured to manage autonomous features of the behavior manager 1350. For example, an operator may, through the autonomy selector 1352, configure a level of autonomy of the humanoid robot 1 (e.g., such that the humanoid robot 1 operates manually, in which the operator may remotely control the operation of the robot 1, semi-autonomously, or fully autonomously). In an embodiment, the operator may, through the autonomy selector 1352, specify certain features to be conducted autonomously and others to, e.g., perform a repetitive task without any form of AI/ML-based behavior or to require some form of manual input for operation.

The communication module 1414 may be embodied as any combination of hardware, software, or circuitry to enable components of the behavior manager 1350 to communicate with one another and with other components of the humanoid robot 1 (such as of the compute 1000). The data storage 1416 may be any data storage device or partition on a data storage device for short-term or long-term storage of behavior controller data (e.g., event logs, movement data, training data, navigation logs, mapped area and path data, etc.). Other components 1418 may pertain to other hardware, software, and/or circuitry not previously discussed above relative to the behavior manager 1350, such as cache data, data aggregation modules, data augmentation modules, body part component health management, or calibration data management. It should be understood that the behavior manager 1350 may be omitted and/or consumed by one or more models (e.g., RL trained models) that are contained within the local AI system 1470.

3. Perception System

The perception system 1420 may be embodied as any hardware, software, or circuitry for obtaining audiovisual data (e.g., from sensors 1.2.8) and providing this data to the local AI system 1470 for executing AI-based vision techniques (e.g., object detection, image classification, segmentation, object tracking, facial recognition, scene understanding, depth estimation, anomaly detection, reinforcement learning etc.) to generate, from the audiovisual data, one or more three-dimensional (3D) images. The images may further be annotated with contextual data (e.g., foreground/ background information, object classification data, labeling, etc.) for additional processing by the local AI system 1470 and the behavior manager 1350. It should be understood that the perception system 1420 may be omitted and/or folded into the local AI system 1470.

4. Local AI system

The local AI system 1470 may be embodied as any combination of hardware, software, or circuitry to drive semi- to fully-autonomous perception, learning, and behavior by the humanoid robot 1. The local AI system 1470 may: (i) include modes or architectures that are run on the disclosed local AI system 1470 only, (ii) include models or architectures where a portion of the model or architecture is run on the local AI system 1470 and another portion of the model or architecture is run on the remote AI system 2780, and (iii) include modes or architectures that are run on the disclosed remote AI system 2780 only. The local AI system 1470 is described in further detail relative to FIG. 8.

Figure 8:
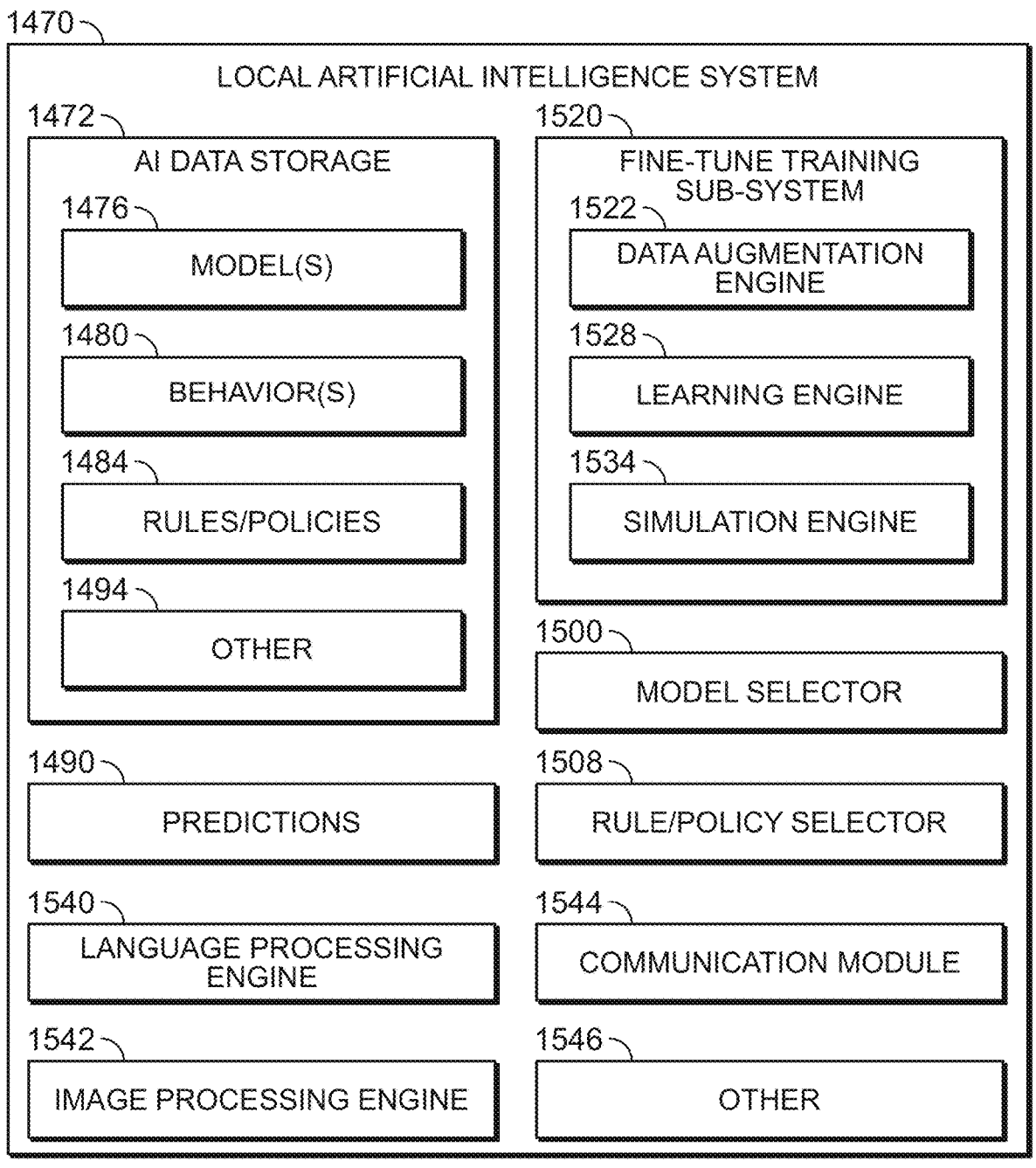
FIG. 8 is a block diagram of an onboard artificial intelligence (AI) system for the humanoid robot of FIGS. 1-3B.
Figure 9:
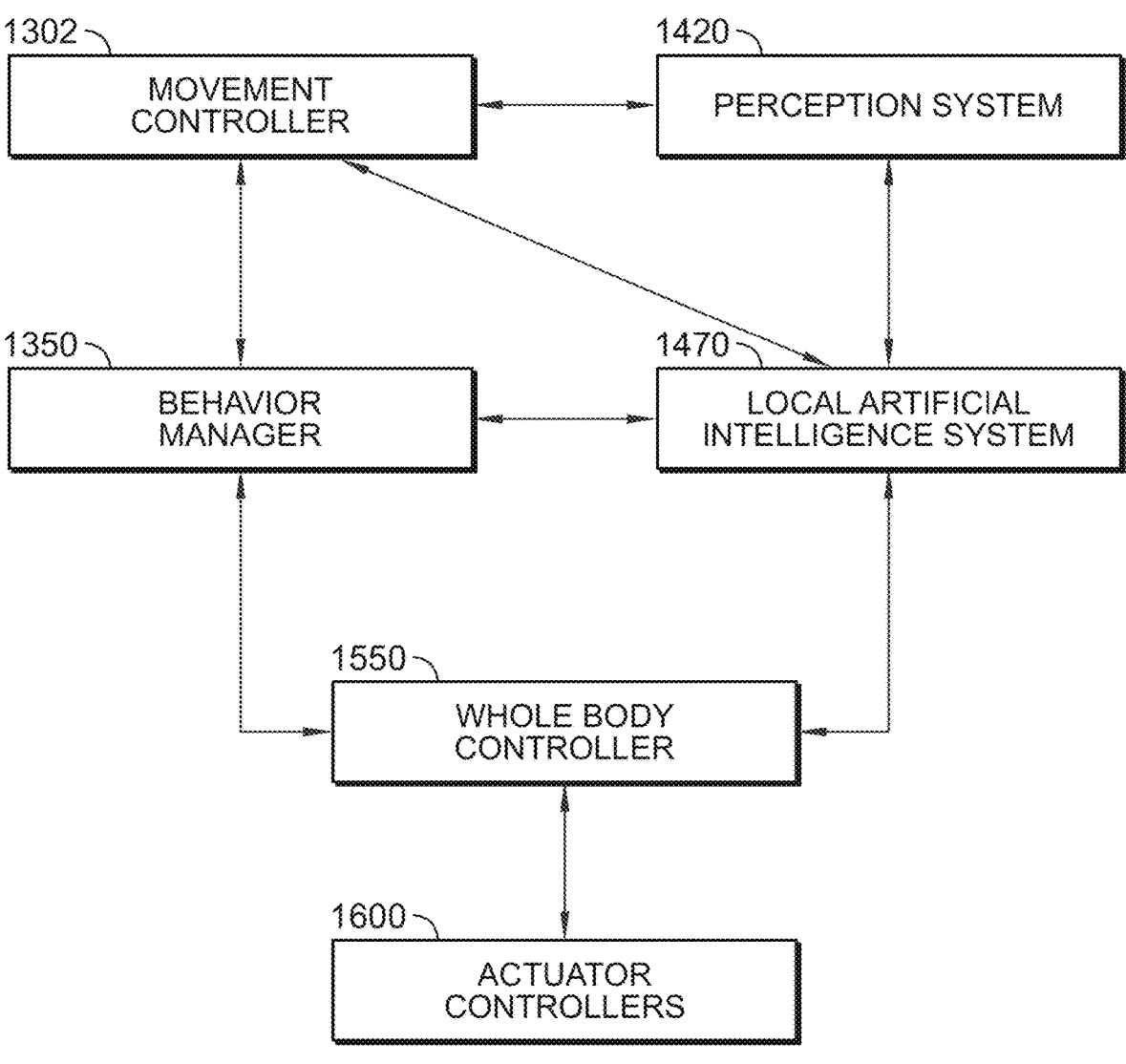
FIG. 9 is a diagram depicting an interaction of components contained within a computing architecture of the humanoid robot of FIGS. 1-3B

Referring now to FIG. 8, the illustrative local AI system 1470 may include a variety of components, including an AI data storage 1472, predictions 1490, a model selector 1500, a rule and policy selector 1508, a training sub-system 1520, a language processing engine 1540, an image processing engine 1542, and a communication module 1544. However, it should be understood that the local AI system 1470 may interact with and form part of each and every other component (e.g., movement controller 1302, behavior manager 1350, perception 1420, whole body controller 1550, and controllers 1600). As such, in some embodiments, the compute 1000 may only include or primarily include the local AI system 1470. In other words, the local AI system 1470 may not be considered a separate component or system, but instead an integral component of other systems contained within the compute 1000. Thus, a primary technical issue solved by the local AI system 1470 is the challenge of real-time, context-aware decision-making. Traditional robotic systems often rely on pre-programmed responses or remote processing, which can lead to delays or inappropriate actions in dynamic situations. The local AI system 1470 overcomes this limitation by enabling rapid, localized processing of sensory inputs and the immediate generation of appropriate responses.

Another technical challenge addressed by the local AI system 1470 is the integration and interpretation of multi-modal sensory data. The humanoid robot 1 is equipped with various sensors, including visual, auditory, tactile, and proprioceptive systems. The AI system 1470 efficiently fuses these diverse data streams in real-time, creating a comprehensive and coherent representation of the state of the robot 1 and its environment. This integrated perception allows for more nuanced and accurate interactions with the physical world and human collaborators. The local AI system 1470 also solves the technical issue of adaptive learning and continuous improvement. Unlike static systems, this local AI system 1470 can modify its behavior based on experience and feedback. It employs advanced machine learning algorithms, potentially including deep reinforcement learning and online learning techniques, to continuously refine its decision-making processes. This adaptability allows the robot 1 to improve its performance over time, learn new tasks with minimal explicit programming, and adjust to changes in its operational environment or physical capabilities. A further technical challenge resolved by the local AI system 1470 is the efficient management of the limited computational resources of the robot 1. The AI system 1470 implements sophisticated task prioritization and resource allocation algorithms, ensuring that critical processes receive adequate computational power while less urgent tasks are managed efficiently. This dynamic resource management enables the robot 1 to maintain optimal performance across a wide range of operational scenarios, from simple repetitive tasks to complex problem-solving situations.

The AI data storage 1472 may further include one or more models 1476, behaviors 1480, rules and policies 1484, and other data 1494. The models 1476 may comprise one or more AI/ML-based models to perform the functions described herein, such as observing, reasoning, and learning behaviors based on the environment and surroundings and performing simple to complex tasks given the environment and surroundings, e.g., similar to the models 2902 of the remote AI system 2780. The illustrative model selector 1500 is configured to select an appropriate model or set of models 1476 given a specified task, scenario, or constraint. For example, the model selector 1500 may select a given model based on considerations such as the task, a cost to perform the task, performance efficiency, the environment and surroundings, resource management, or the current health status of the humanoid robot 1 or its components. Over time, the model selector 1500 may be refined based on learning algorithms that identify efficient models 1476 for given tasks, scenarios, and constraints. In an embodiment, the model may be selected in response to operator input as an alternative to automated selection. This may be useful, e.g., during the initialization of the humanoid robot 1.

The illustrative rule and policy selector 1508 may be configured to select one or more of the rules and policies 1484 that are stored in the AI data storage 1472 to be enforced during the operation of the humanoid robot 1, e.g., based on operator input given a context, environment, compliance and regulatory jurisdiction, safety considerations, and the like. In an embodiment, the rule and policy selector 1508 may automatically learn efficient methods for adapting to selected rules and policies over time.

The language processing engine 1540 may be embodied as any combination of hardware, software, or circuitry for obtaining, parsing, interpreting, and understanding natural language directives and concepts, and also for generating natural language speech. For example, the language processing engine 1540 may be configured to translate speech-to-text and text-to-speech. The image processing engine 1542 may be embodied as any combination of hardware, software, or circuitry for performing object detection, image classification, segmentation, object tracking, facial recognition, scene understanding, depth estimation, anomaly detection, or reinforcement learning on input visual data (e.g., as obtained by sensors 1.2.8 such as cameras or in preloaded training data).

The training sub-system 1520 may be embodied as any hardware, software, or circuitry configured to refine models 1476 and behaviors 1480 based on observed data and training data. The training sub-system 1520 may include a data augmentation engine 1522, a learning engine 1528, and a simulation engine 1534. The data augmentation engine 1522 may be embodied as any hardware, software, or circuitry configured to increase the size and diversity of training data, similar to the data augmentation engine 2782 of the remote AI system 2780. The learning engine 1528 may be embodied as any hardware, software, or circuitry for training the AI models 1476, given a set of rules and policies 1484, behaviors 1480, and training data, similar to the training engine 2790 of the remote AI system 2780. The simulation engine 1534 may be embodied as any hardware, software, or circuitry for executing one or more of the AI models 1476 in a virtualized simulation environment to simulate and analyze aspects of the humanoid robot 1, such as kinematics, sensor behavior, robot 1 behavior, and anomalies, similar to the simulation engine 2800 of the remote AI system 2780. Compared to the remote AI system 2780, the AI fine-tuning conducted by the local AI system 1470 may be localized to the specific humanoid robot 1, which can be advantageous in situations such as those where the humanoid robot 1 is configured to perform a specific task.

The other 1546 may include a communications module that is embodied as any combination of hardware, software, and/or circuitry to enable components of the local AI system 1470 to communicate with one another and with other components of the humanoid robot 1 (such as of the compute

1000). It should be understood that the controllers may be omitted and/or consumed by one or more models (e.g., RL trained models) that are contained within the local AI system 1470.

5. Whole Body Controller

The whole body controller 1550 may be embodied as any combination of hardware, software, or circuitry for receiving information from the behavior manager 1350 or the local AI system 1470. The whole body controller 1550 may thereafter send the information to other components of the compute 1000. For example, the whole body controller 1550 may transmit joint torque data, which is data pertaining to rotational forces exerted at "joints" of the humanoid robot 1, to the controllers 1600. It should be understood that the whole body controller 1550 may be omitted and/or consumed by one or more models (e.g., RL trained models) that are contained within the local AI system 1470.

The controllers 1600 may be embodied as any combination of hardware, software, and/or circuitry for transmitting joint torque data to the actuators 1.2.4, e.g., to extend and retract parts (such as arms, hands, fingers of the humanoid robot 1). The controllers 1600 may also infer joint torque and angle data received from other sensors 1.2.8, such as IMUs mounted on a given "body part." In some embodiments, the joint torque and angle data may be measured using rotary position sensors, optical reflection, or other methods. The whole body controller 1550 may also incorporate advanced control strategies, such as passivity-based control or adaptive control, to ensure stability and robustness in the presence of uncertainties or external disturbances. It should be understood that the controllers 1600 may be omitted and/or consumed by one or more models (e.g., RL trained models) that are contained within the local AI system 1470.

6. Other

Other components 1650 of the compute 1000 may include components not discussed above relative to the compute 1000, such as power management modules (e.g., to manage battery pack health, manage power usage profiles, etc.) and calibration modules (e.g., to ensure that actual kinetic movements of the humanoid robot 1 align with the expected kinetic movements determined based on calculations). The humanoid robot 1 may include other components 1.2.18, which can encompass components that do not necessarily fall within the aforementioned mechanical and electrical architecture 1.2, or compute 1000. For example, the other components 1.2.18 may include safety systems and mechanisms, emergency override systems, or ports for connecting peripheral devices.

d. Interaction Between Components of the Computing Architecture

Figure 10:
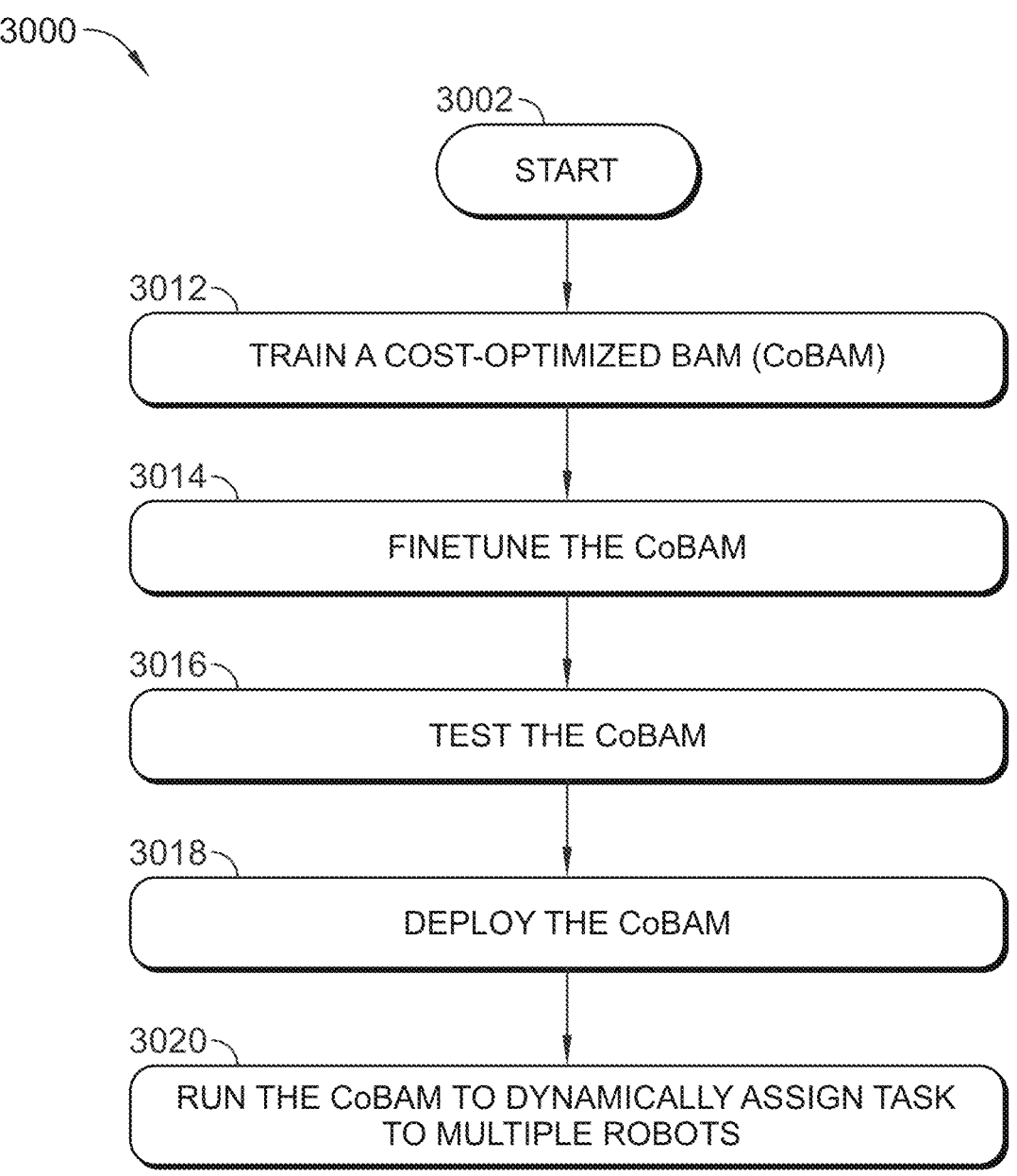
FIG. 10 is a flowchart illustrating the process of training, running, and retraining a cost-optimized bipedal action model (CoBAM)

FIG. 10 depicts interactions between components of the humanoid robot 1 during its operation. Upon startup of the humanoid robot 1, the humanoid robot 1 may be in a standby mode or may otherwise remain idle in an initial position (e.g., standing, sitting, lying down, etc.). The robot 1 may initialize and activate its sensors 1.2.8 and obtain data in relation to the environment and surroundings of the robot 1, as well as positional data, audiovisual data, and the like. The movement controller 1302 may be configured to obtain data from its environment using the perception system 1420, while understanding the location and position of the robot 1 within said environment.

As described above, the environmental data and the robot data can be fed into: (i) the BAM, wherein a portion of said BAM (e.g., the beta model 3001.2) is running on the local AI system 1470, and (ii) the behavior manager 1350. The BAM can then convert speech to text in order to obtain long-horizon goals, wherein said BAM can subdivide these long-horizon goals into one or more sub-goals or tasks. The BAM can then check with the behavior manager 1350 to confirm that the robot 1 is in the correct state for performing the first sub-goal or task. Once the state of the robot 1 is confirmed or the state of the robot 1 is changed to be in the right state, the BAM can determine the movements and actions to perform for a given specified task. For instance, the alpha model 3001.1 of the BAM may process the task and sensor data to generate information that is provided to a semantic latent vector. This information is passed through said latent vector and into the beta model 3001.2 of the BAM. The beta model 3001.2 of the BAM may then communicate the detailed movement or action information to the whole body controller 1550, which in turn generates joint current data and/or torque data and transmits the data to the controllers 1600 to effect activity in the actuators 1.2.4 and cause the movement or action to be performed.

Each of the interacting components may provide feedback information to each other as the movements or actions are being performed. For example, the perception system 1420 may relay an indication to the movement controller 1302 that a given task is complete based on audiovisual data received during the performance of an action or movement. As another example, the behavior manager 1350 may be in continuous communication with the whole body controller 1550 to ensure that the movement and positioning of the robot 1 are as instructed and/or planned by the local AI system 1470. As yet another example, the local AI system 1470 may continuously receive data from the perception system 1420, the movement controller 1302, the behavior manager 1350, and the whole body controller 1550 and use the data to refine and optimize the currently executing model given present configurations, conditions, and constraints. It should be understood that the movement controller 1302, behavior manager 1350, perception system 1420, whole body controller 1550, and/or controllers 1600 may be omitted or replaced in alternative embodiments.

E. Cost-Optimized Bipedal Action Model ((CoBAM)

Disclosed herein are systems, methods, and techniques for generating, finetuning, testing, and deploying a Cost-optimized Bipedal Action Model (CoBAM), which constitutes an end-to-end framework for controlling the complex, high-degree-of-freedom movements of one or more humanoid robots 1, 2700A-X. The CoBAM is designed to ingest multimodal sensory inputs from a fleet of available robots. These inputs may comprise a combination of real-time visual data from onboard cameras, proprioceptive state information from joint encoders, data from inertial measurement units, force-torque sensor readings, and natural language instructions.

Upon receiving a high-level task, the CoBAM first decomposes the task into a series of sub-tasks. It then intelligently assigns these sub-tasks to one or more robots from the available fleet. This assignment is performed in a manner that optimizes a predefined cost function, wherein the criteria can be user or system-defined to achieve outcomes such as the lowest energy consumption, minimum time to completion, or other efficiency metrics. Following the cost-optimized assignment, the CoBAM outputs the specific actions for each assigned robot to complete its sub-task. These actions can be a continuous sequence of low-level robot control commands that directly specify joint torques, velocities, or target positions that can be utilized by any of the robots 1, 2700A-X. In cases where the most cost-effective solution involves a single robot performing the entire task, the action output for that individual robot can also be a continuous sequence of low-level robot control commands, or "actions," that directly specify joint torques, velocities, or target positions or deltas thereof.

The disclosed CoBAM offers several key advantages over existing robotic control approaches, including zero-shot generalization capabilities that enable robots to perform novel tasks and interact with unseen objects without task-specific training. It also provides direct continuous control over high-dimensional action spaces to produce fluid and precise motion. Furthermore, the CoBAM has inherent capabilities for multi-robot collaboration through shared world models that maintain consistency across robot instances, and a design that is commercially ready and fully scalable for deployment across fleets of robots 1, 2700A-X.

a. Introduction

FIG. 10 is a flowchart of a master process 3000 for the lifecycle of a Cost-optimized Bipedal Action Model (CoBAM), from initial creation to operational execution. The process commences at a start block (3002). The first major phase is to train a CoBAM (block 3012). This phase involves the creation and initial training of the model, which may have a hierarchical architecture. The CoBAM is designed to receive high-level user commands or environmental data and dynamically determine the optimal breakdown of a task into sub-tasks, create assignments for one or more robots, and generate the specific, cost-optimized actions each robot needs to perform. This comprehensive training stage is described in further detail in FIGS. 13-18.

Following the initial training, the CoBAM is finetuned (block 3014). This step serves to refine the model's performance, enhance its generalization capabilities for new tasks or environments, and further optimize its decision-making. This finetuning process, which may occur in a simulated environment, is detailed in FIG. 19. Once finetuned, the CoBAM is tested (block 3016). This validation phase ensures that the model performs as expected and can reliably control robots to execute tasks according to the desired cost-optimization criteria in real-world scenarios. The testing process is further illustrated in FIG. 20.

After successful testing, the CoBAM is deployed (block 3018). This involves integrating the trained and validated model into the target robotic system, which could involve installing it on the robots' local computing hardware, a remote server, or across a hybrid architecture. The deployment process is described in FIG. 21. Finally, the deployed CoBAM is run to dynamically assign tasks to multiple robots (block 3020). In this operational stage, the CoBAM actively receives input, processes it, and outputs task assignments and actions to the robots under its control. Illustrative examples of the CoBAM running and coordinating multiple robots to perform tasks are provided in FIGS. 22A-22E.

Figure 11:
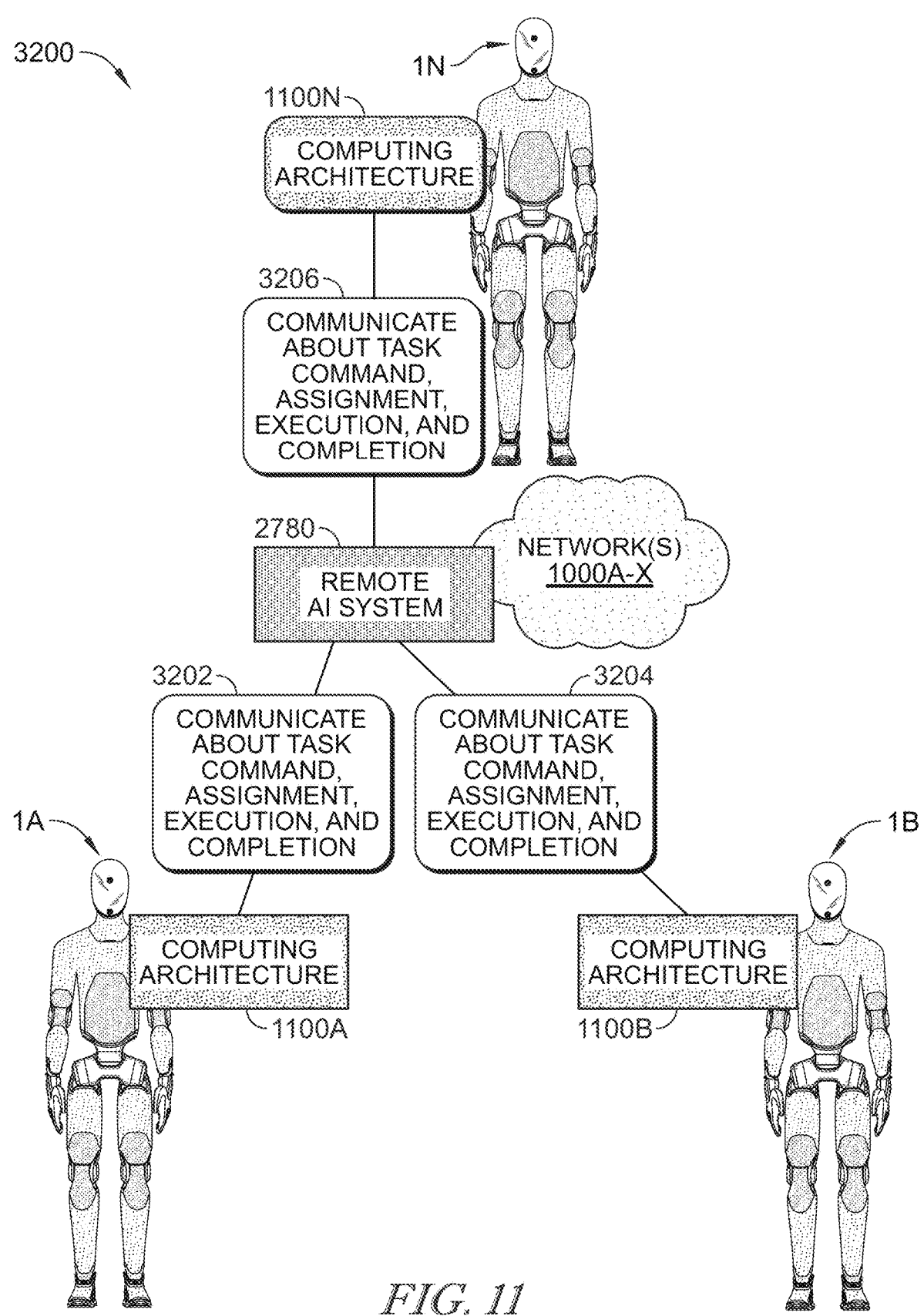
FIG. 11 is a conceptual diagram of a system having multiple humanoid robots communicating with each other to determine and execute a task.

FIG. 11 is a conceptual diagram of a system 3200 having multiple humanoid robots 1A-N communicating with each other over one or more networks 1000A-X to determine and execute a task. Although FIG. 11 is shown and described from the perspective of completing a single task, the operations described herein can also be performed to determine the completion of any quantity of tasks in the system 3200.

In the example system 3200, a fleet of robots 1A-N can collaboratively manage a high-level command through a sequence of operations including receiving the command, assigning sub-tasks based on the command, and executing the assigned sub-tasks. Throughout this process, the robots 1A-N engage in continuous communication regarding task assignment, execution status, and completion. More specifically, the computing architectures 1100A-N of the respective robots 1A-N can receive and process information and data to perform the operations in blocks 3202-3206.

For example, in block 3202, a command may be received by one or more of the robots 1A-N. This initial command can be a spoken prompt from a human user (e.g., "Bring me part A") or a text prompt provided through a user's computing device or a remote system. In some implementations, this command represents a high-level task. This block encompasses the initial communication of the task command to the robot fleet, which serves as the trigger for subsequent planning and execution phases.

In block 3204, tasks can be assigned based on the received command. This process can be managed by one or more of the robots 1A-N or by a remote AI system 2780. The remote AI system 2780 can be configured to determine the specific sub-tasks to complete the overall command. For example, the system 2780 may obtain robot data from the robots 1A-N, including the received command, execute a cost-optimized Bipedal Action Model (CoBAM), and then output the task assignments and controls to the robots 1A-N. Executing the CoBAM includes decomposing the high-level command into multiple sub-tasks to be performed by one or more of the robots 1A-N. This execution can also involve cost function algorithms or models to determine the most efficient and least costly subdivision and assignment of the command into a series of tasks. This stage involves significant communication, including the transmission of the initial command for processing, the distribution of task assignments, and status updates related to the allocation process.

In some implementations, still referring to block 3204, the robots 1A-N can themselves process the command to generate robot-readable data (e.g., tokenized data from a spoken prompt). The robots 1A-N can then process this data to determine how to subdivide the command into a series of sub-tasks or steps, which can be performed sequentially or in parallel by one or more robots from the fleet. Once the sub-tasks are identified, the remote AI system 2780 can assign these tasks among the robots 1A-N (or among other groups or fleets within the system 3200). The remote AI system 2780 can leverage one or more cost function algorithms or models to determine the most efficient and least costly subdivision and assignment of the command into the series of tasks.

In block 3206, the robots 1A-N that were assigned tasks in block 3204 execute or otherwise perform those tasks. The determination of appropriate movements and robot controls can be performed by the remote AI system 2780, for instance, by executing the CoBAM. When the system 2780 determines and assigns the specific movements and controls, the respective robots 1A-N may simply execute those assigned instructions in block 3206. In some implementations, performing the tasks involves the system 2780 executing one or more models to discern the appropriate movements and robot controls for the assigned sub-task(s). These controls are then executed to cause the respective robots 1A-N to move and physically perform the assigned sub-task(s). The models can include, but are not limited to, the CoBAM or other models such as multimodal large language models (MLLMs), visual language models (VLMs), and/or bipedal action models (BAMs). This execution phase involves communication regarding the initiation, progress, and successful completion of physical actions. In some implementations, models deployed on the edge at the respective robots 1A-N can also perform the disclosed techniques to determine, assign, and execute tasks.

Blocks 3202-3208 also represent the continuous communication that occurs between the robots 1A-N before, during, and after executing the tasks. This communication can take the form of natural spoken language, allowing robots to effectively "talk" to each other. Information exchanged among the robots can be processed to determine whether real-time adjustments should be made to task identification, assignment, execution, or robot controls. Consequently, the robots 1A-N can perform tasks while dynamically determining and updating task completion information, enabling adaptive and resilient team collaboration.

For example, if robot 1B encounters an obstacle while bringing a step ladder to the location of robot 1A, robot 1B can communicate to the other robots 1A-N, stating, "I ran into an obstacle. It's going to take me a bit longer." The other robots 1A-N may process this new information, using the cost function algorithms and models described herein, to re-evaluate whether the team is still on track to complete the high-level command as quickly and efficiently as possible. If any of the robots 1A-N determine that the current plan is no longer optimal, they can, individually or collectively, determine whether and how to update the identification and assignment of tasks in real-time.

Figure 12:
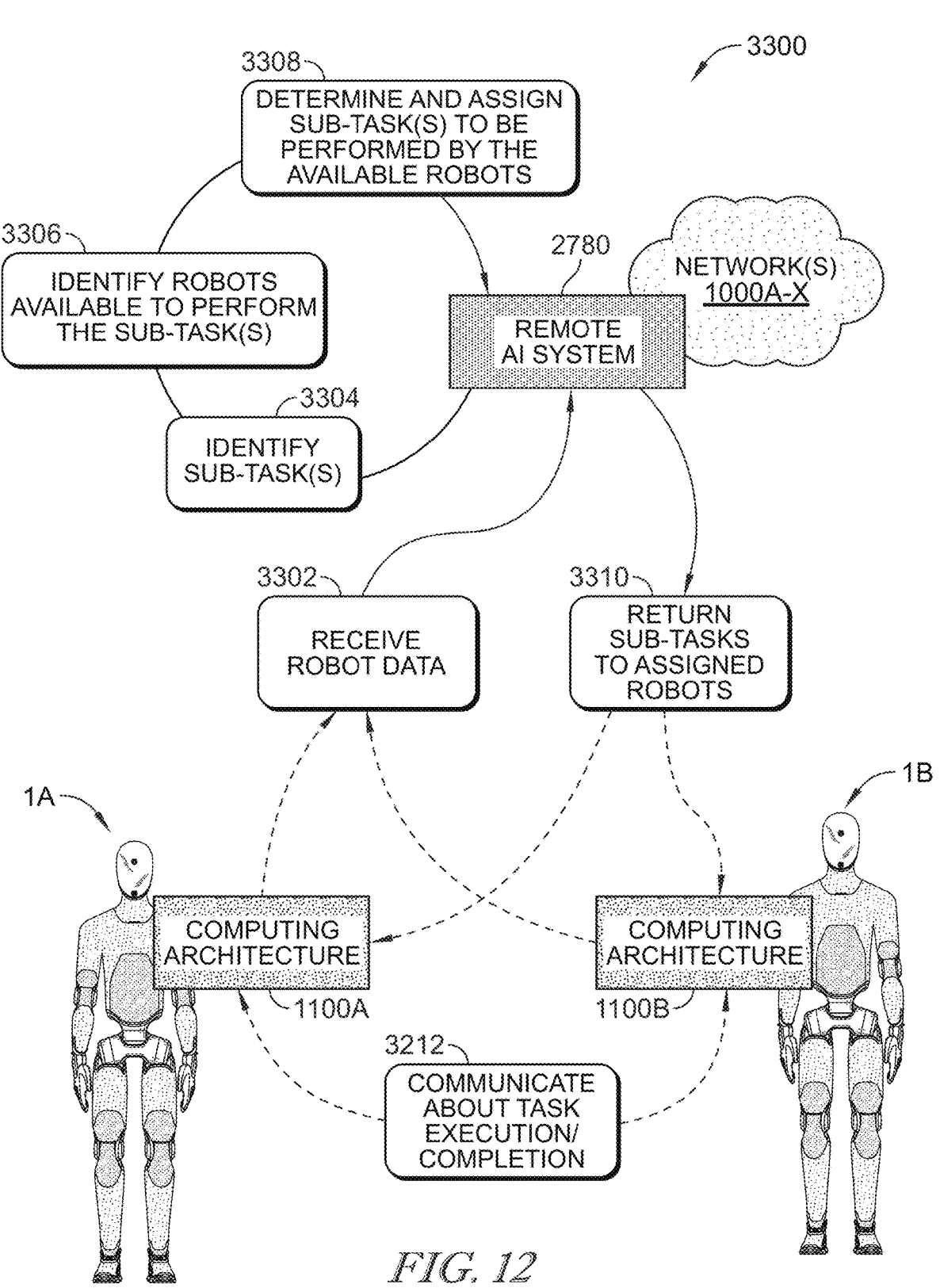
FIG. 12 is a conceptual diagram of a system having a remote system that communicates with multiple humanoid robots to determine and execute a task.

FIG. 12 is a conceptual diagram of a system 3300 wherein the remote AI system 2780 is configured to communicate with multiple humanoid robots 1A-N to determine and execute a task, such as a high-level task or a long-horizon goal. In some implementations, the system 3300 can include a controller system as an alternative to the remote AI system 2780. In the example system 3300, the remote AI system 2780 identifies and assigns sub-tasks to the robots 1A-N to facilitate the execution and completion of the overall task. The robots 1A-N then receive their respective assignments and perform the assigned sub-tasks. The remote AI system 2780 can be located remotely from the operating environment of the robots 1A-N. In some implementations, the remote AI system 2780 can be located on the edge, for instance, within one of the robots 1A-N. Alternatively, the remote AI system 2780 can be situated within the operating environment of the robots 1A-N but remain remote from the individual computing architectures 1100A-N of the robots 1A-N.

In the example system 3300, the remote AI system 2780 receives robot data from one or more of the robots 1A-N (block 3302). This robot data can include commands, such as those initially received by the robots from a user or another system.

Upon receiving the data, the remote AI system 2780 identifies one or more sub-tasks to be performed to complete the command (block 3304). Subsequently, the remote AI system 2780 identifies which of the robots 1A-N are available to perform the sub-task(s) (block 3306) and then proceeds to determine and assign the sub-tasks to be performed by the available robots (block 3308).

In block 3310, the remote AI system 2780 returns or communicates the sub-tasks to the assigned robots 1A-N, and each of these robots receives its assigned sub-task(s). As the robots 1A-N execute their assignments, they can communicate with each other about task execution and completion, for example, through spoken language (block 3212). This communication network may also include robots 1A-N that have not been assigned sub-tasks, allowing them to receive information and maintain situational awareness. Such information can be provided back to the remote AI system 2780, which can use the data to gauge the progress of task completion, assess whether the robots 1A-N are operating at the lowest possible cost, determine if sub-tasks should be modified or reassigned, and inform how to divide and allocate other tasks that are being received or identified.

b. Training CoBAM

Figure 13:
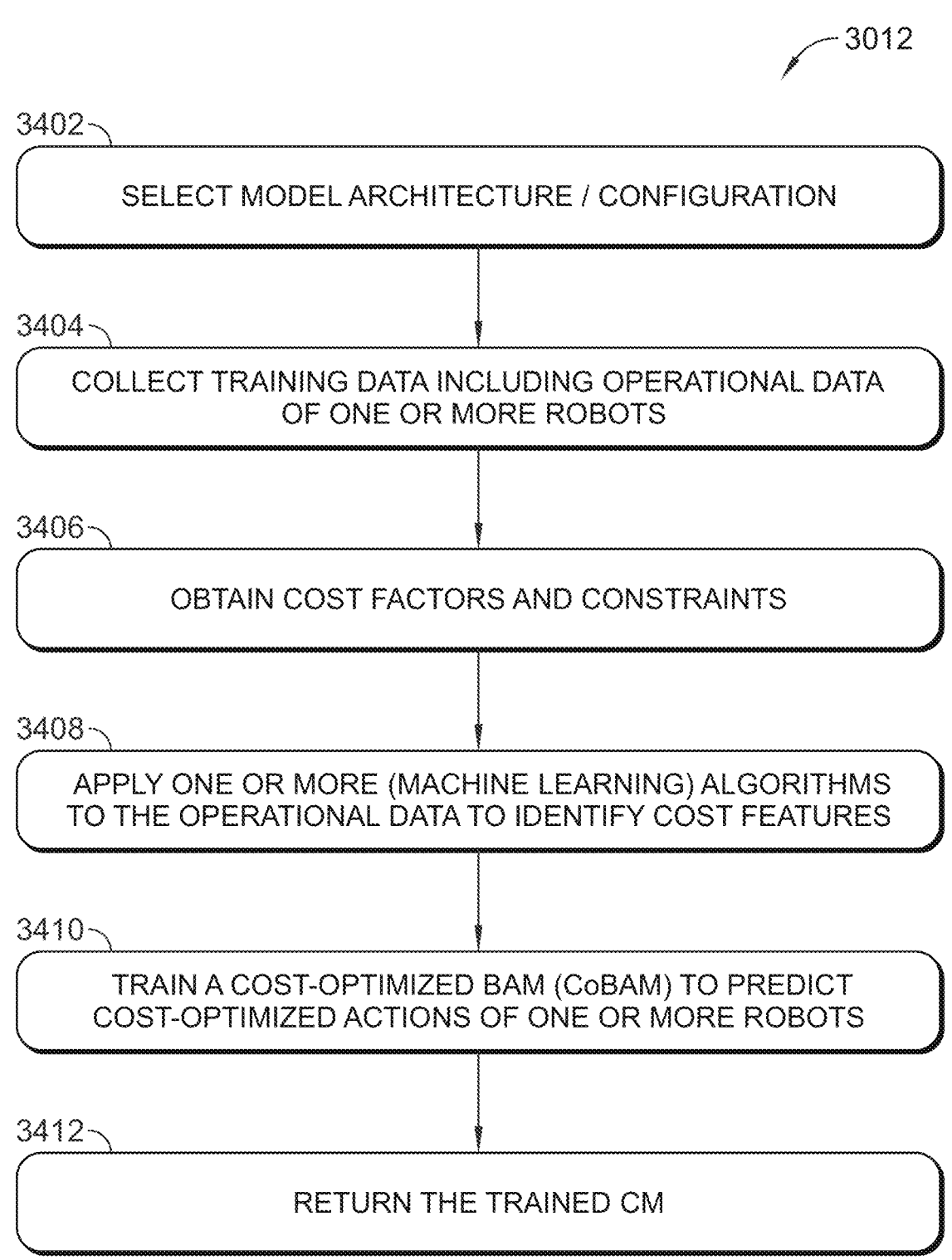
FIG. 13 is a flowchart illustrating the process of training a cost-optimized bipedal action model.

FIG. 13 illustrates a flowchart of a method for the development of a Cost-optimized Bipedal Action Model (CoBAM).

First, a model architecture and configuration are selected (block 3402), as further detailed in FIGS. 14A-14D. This step involves specifying foundational elements such as: (i) a deployment configuration, which dictates how computational resources are allocated between local onboard processors and remote servers, (ii) an internal architecture, which defines the arrangement and interaction of different model components, and (iii) the specific type or types of machine learning models to be contained within the architecture. For instance, the CoBAM may have a hierarchical architecture, designed to dynamically resolve a high-level task into optimized sub-tasks and/or assignments for one or more robots. As such, this step defines the foundational structure and components of the CoBAM.

Figure 15:
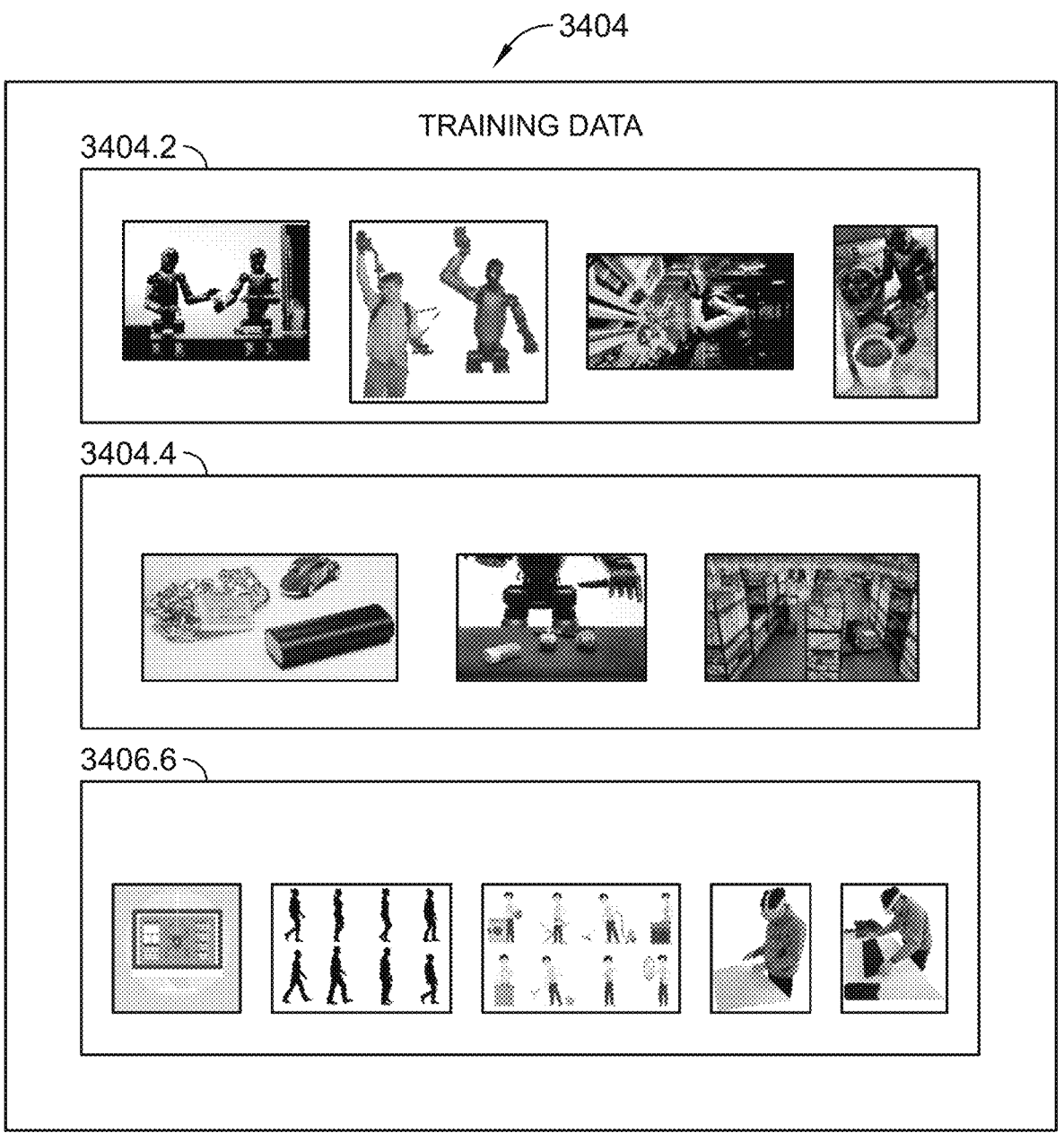
FIG. 15 is a block diagram depicting a collection of training data that may be used in generating the CoBAM.

Once the foundational elements are established, the process proceeds to collect training data, including operational data from one or more robots (block 3404), as described in relation to FIG. 15. This training data may encompass a wide range of sensory inputs, actions, and environmental contexts relevant to the tasks the CoBAM is intended to perform, ranging from large-scale internet datasets to specific, high-fidelity robot teleoperation logs with synchronized multi-sensor streams.

Next, cost factors and constraints are obtained (block 3406), as shown in FIG. 16. This involves identifying and quantifying variables that influence the efficiency of task execution. The definition of "cost" is flexible and can be optimized based on criteria such as lowest energy consumption, shortest time to completion, minimal mechanical wear, or other metrics defined by a user or system. Constraints can include operational limits like joint torque limits, battery life, and no-go zones within an environment. Following this, one or more machine learning algorithms are applied to the operational data to identify relevant cost features (block 3408), as exemplified in FIGS. 17A-17C. This step automatically extracts patterns and correlations from the data that are predictive of cost, which are then used to inform the training process.

Figure 18:
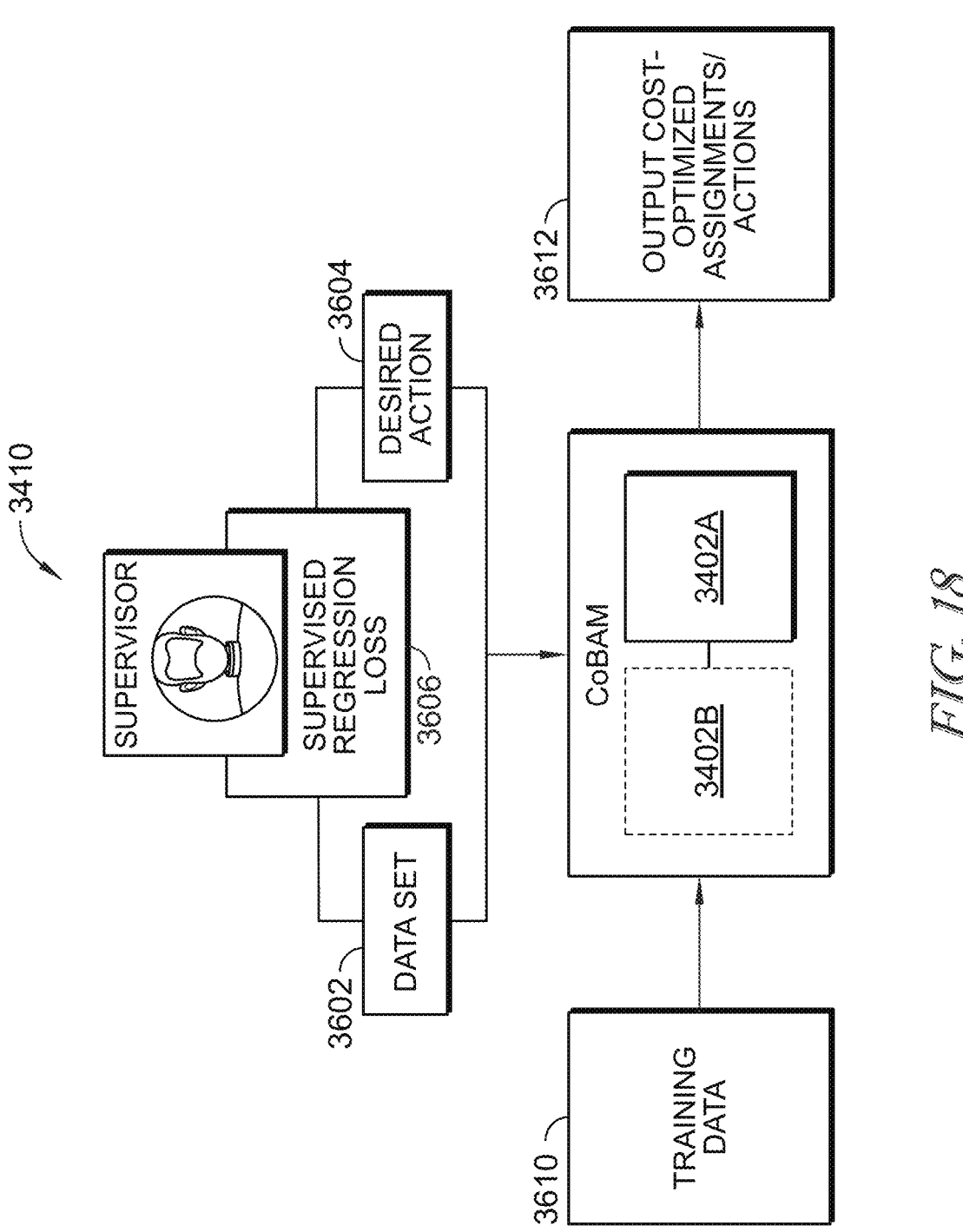
FIG. 18 is a diagram illustrating a training methodology that may be used in the generation of the CoBAM.
Figure 19:
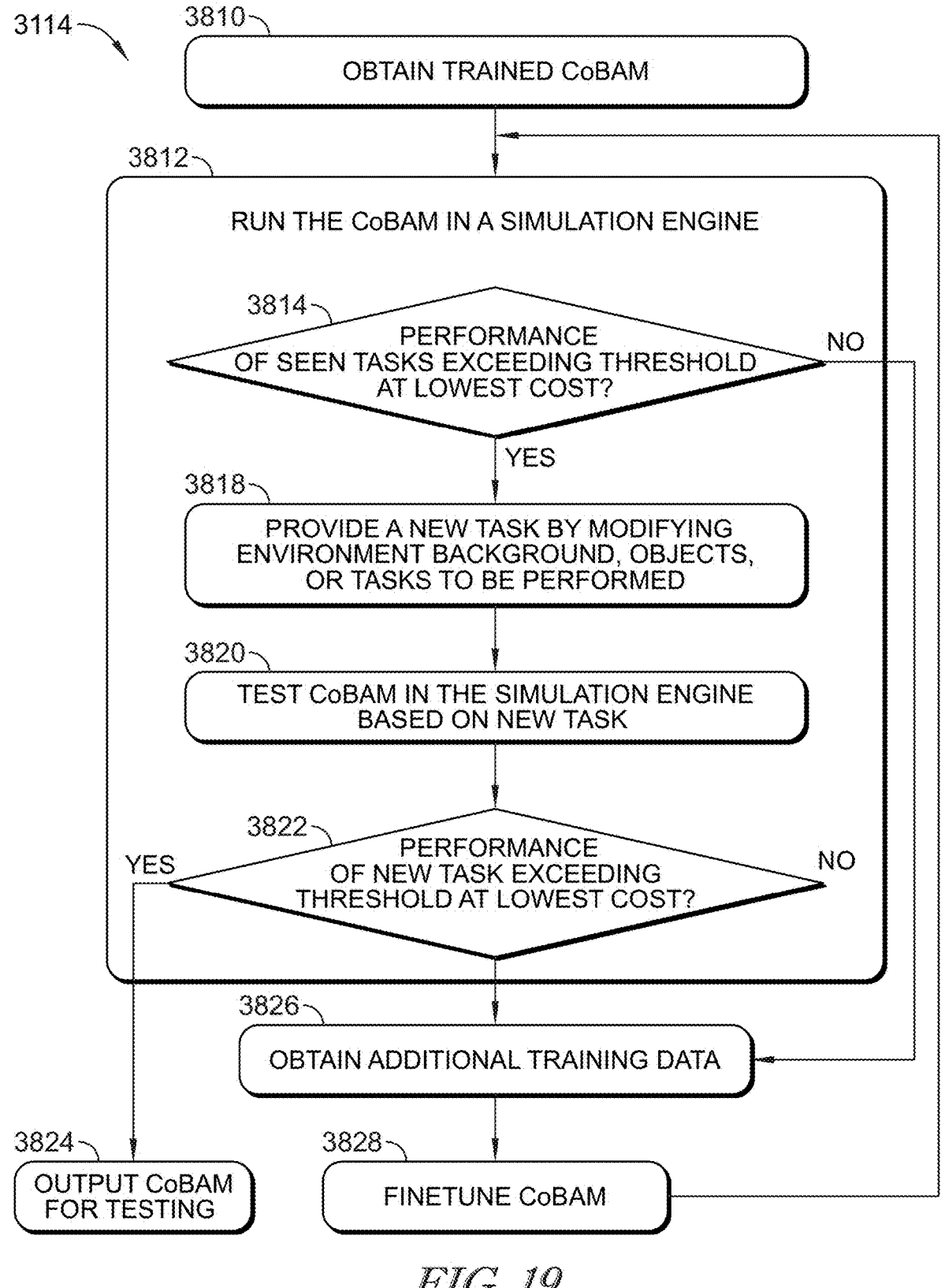
FIG. 19 is a flowchart illustrating a process of finetuning the CoBAM.
Figure 20:
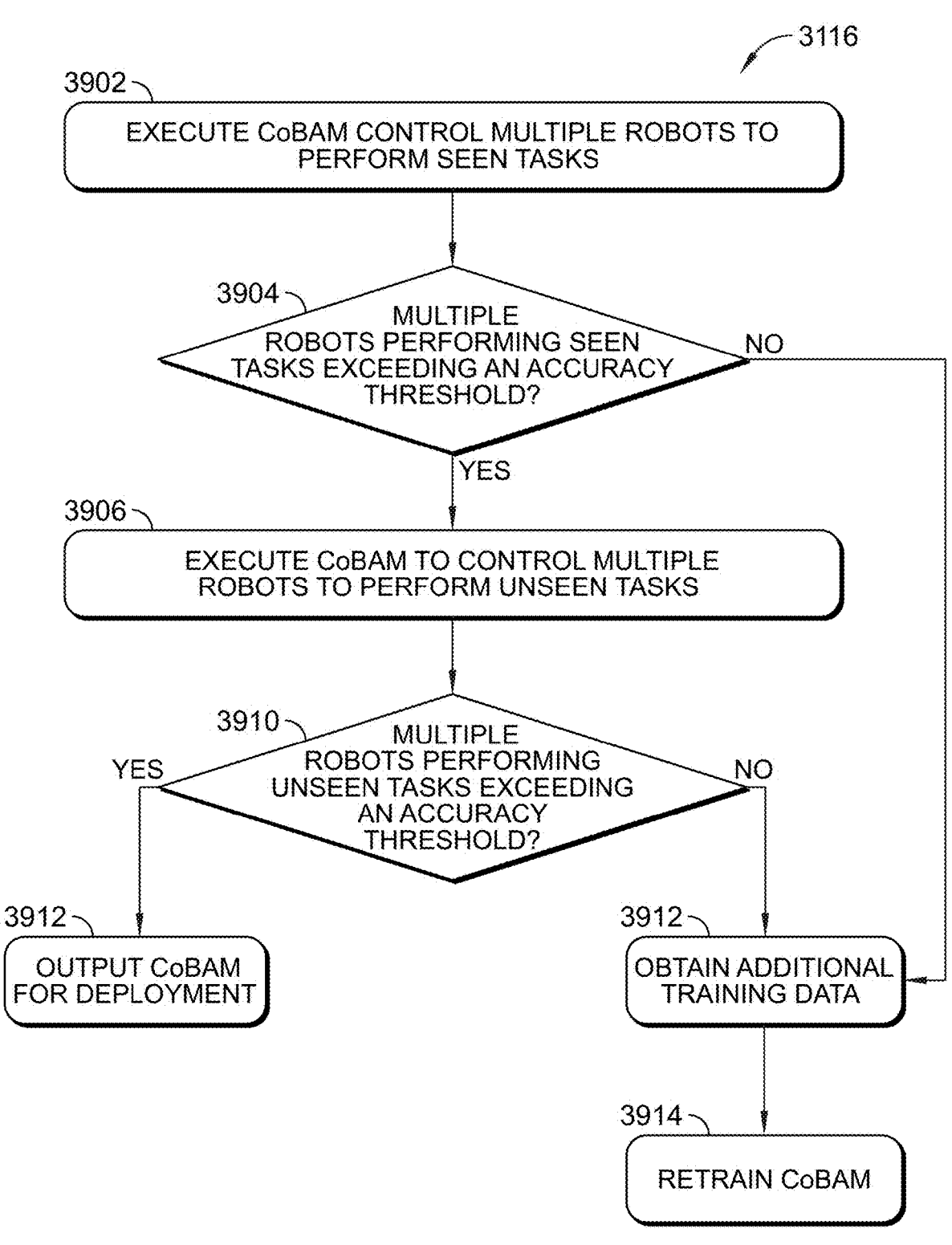
FIG. 20 is a flowchart illustrating a process of testing the CoBAM.

With the training data prepared and cost features identified, the CoBAM is trained to predict cost-optimized actions for one or more robots (block 3410), a process further illustrated in FIGS. 18-20. This training process involves adjusting the internal parameters (e.g., weights and biases) of the neural network models within the CoBAM. The adjustment is designed to facilitate the identification of complex, non-linear correlations between the multimodal inputs and the output of continuous robot control commands or "actions." The goal is to minimize a loss function that reflects both task success and the associated costs, teaching the model to generate behaviors that are not only effective but also efficient. The ultimate output of the trained CoBAM is a set of actions that may include direct control commands for a single robot, or, if more than one robot is involved, strategic task and sub-task assignments designed to achieve the overall goal with the lowest possible cost.

Figure 21:
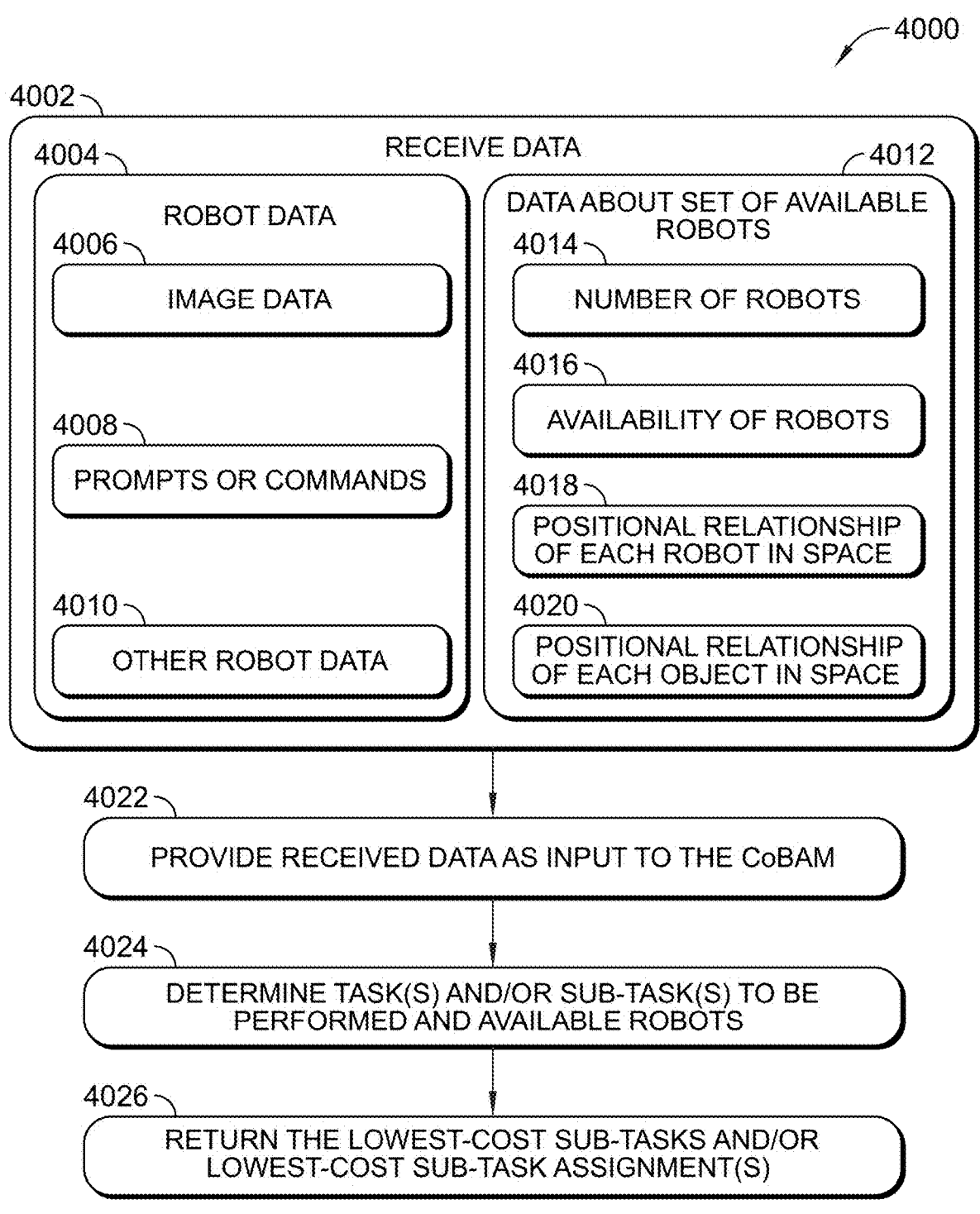
FIG. 21 is a flowchart illustrating a process of deploying the CoBAM.

Upon completion of the training, the trained CoBAM is returned (block 3412) and is ready for deployment, the process of which is shown in FIG. 21. During runtime, the deployed CoBAM continuously receives multimodal inputs and processes them to output actions that are optimized for cost. For a single robot, these actions are often continuous control commands organized into action chunks spanning a future trajectory, which are then processed by a whole-body controller to generate low-level actuator commands. In multi-robot scenarios, the actions can be the assignment of tasks or sub-tasks to specific robots in the group. This closed-loop design enables the robot(s) to perform long-horizon tasks and dynamically adapt behavior in response to the environment through online replanning and reactive control. While the robot operates with the deployed CoBAM, new data can be collected, including successful task completions, failure cases, and novel interactions. This data can then be used to update, retrain, or refine the CoBAM, enabling iterative improvement of the model's performance and facilitating a continuous learning loop.

i. System Architecture

One of the first steps in generating a cost-optimized Bipedal Action Model (CoBAM) involves the selection and/or identification of the desired deployment configuration. Referring now to FIG. 14A, an embodiment of a hierarchical model architecture 3402 presents a streamlined version of the hierarchy, comprising an optional L2 beta model 3402B and one or more L1 alpha models 3402A. This two-layer architecture can achieve efficiency in tasks that are either highly procedural or can be directly addressed by a sophisticated, multi-skilled action model without an intermediate tactical planning layer, thereby reducing system complexity and response latency. The L2 beta model 3402B remains optional, allowing the AI system to scale down to a purely reactive, L1 alpha model-driven mode for simpler, well-defined tasks where high-level planning would add unnecessary overhead.

To illustrate this architecture, consider a common household chore where a user gives the command, "please sort the laundry pile and wash them." If the optional L2 beta model 3402B is utilized, which may be a large model (e.g., 100M-20B parameters) with a long context length (1-5 million tokens), it can act as a high-level task planner that provides context and constraints. The model leverages its long-term memory, specifically its semantic knowledge, to understand that "sorting" and "washing" are distinct sub-tasks. More importantly, it can access episodic memory and historical user data to recall specific preferences and priorities. In this example, based on past interactions, the model knows this user prefers laundry to be sorted into "kids" and "adults" piles, and has set a priority to always wash the kids' laundry first. The L2 beta model 3402B then decomposes the complex command into a prioritized sequence of simpler sub-tasks: (1) Sort laundry into kids and adults piles, (2) Wash kids laundry, (3) Wash adults laundry. It then sends these directives sequentially to the L1 alpha model 3402A.

In this embodiment, the L1 alpha model 3402A can be a powerful, self-contained visuomotor policy that has been extensively trained on the specific skill of sorting laundry through thousands of examples in simulation and real-world scenarios. The L1 alpha model 3402A, which may be a smaller model with less than 1 billion parameters and a high running frequency of 100-250 Hz, may receive the high-level command from the L2 beta model 3402B and take full ownership of the task, demonstrating autonomous execution capability. For instance, using onboard vision encoders, the L1 alpha model 3402A can perceive the pile of clothes, identifying individual items through segmentation algorithms. The L1 alpha model 3402A can maintain the state of the task in its medium-term memory, which in this streamlined case might be a simple internal state machine or counter tracking the number of items sorted into each pile (whites, darks, colors), providing task progress awareness. The context length of the L1 alpha model 3402A (e.g., 500K-2M tokens) may be sufficient to support this medium-term task tracking. For each piece of clothing, the L1 alpha model 3402A can use its short-term memory, also enabled by the context window holding a buffer of the last few camera frames, to visually classify the item's color. Based on this classification, the L1 alpha model 3402A may generate a series of action chunks: a sequence of motor commands to approach the item, grasp it with appropriate force based on fabric detection, move it to the correct destination pile following an optimized trajectory, and release it with proper placement. The L1 alpha model 3402A can continue this perception-action loop until the laundry pile becomes empty, at which point the L1 alpha model 3402A signals task completion, demonstrating end-to-end task execution without high-level intervention.

Furthermore, the architecture 3402 can support a mode of operation where the L2 beta model 3402B is bypassed entirely, enabling direct task execution for well-learned behaviors. A user could give a more direct command like, "Sort these clothes." A sophisticated L1 alpha model 3402A, equipped with its own integrated vision and text encoders, can be trained to recognize this command directly through multi-modal processing. The L1 alpha model 3402A can map the visual input of the laundry pile and the textual command directly to the initiation of its internal sorting behavior, demonstrating zero-shot task understanding. This L1 alpha model-only mode relies on the knowledge being implicitly "baked into" the neural network's weights through extensive prior training on diverse sorting scenarios. This allows for a highly reactive and efficient system that can perform familiar, well-trained tasks without the latency of consulting a large, external model, achieving response times suitable for real-time human-robot interaction.

As shown in FIGS. 14B-D, the CoBAM may be deployed in the remote AI system 2780 only, in the local AI system 1470 only, and/or split between the remote AI system 2780 and the local AI system 1470. It should be understood that the term "local" is intended to mean that the model or the identified portion of the model is running on computing hardware physically integrated within or attached to the robot 1, including embedded GPUs, TPUs, or specialized neural processing units. The term "remote" is intended to mean that the model or the identified portion of the model is running on computing hardware that is not local to the robot 1. In other words, the term "remote" includes all servers, computers, edge computing nodes, and/or other equipment that is not physically integrated within or attached to the robot 1, but can be located in the same building as the robot 1, adjacent to the robot 1, and/or distributed across data centers positioned around the world.

The deployment configuration of the CoBAM may be or include any known configuration. FIGS. 14B-D identify a few different configurations, but other configurations are contemplated by this disclosure. This subsection is primarily focused on what computing resources may be used to run the CoBAM. As such, FIG. 14C is a diagram depicting a deployment configuration 3402.2 of the CoBAM, wherein an L2 beta model 3402B is deployed on the remote AI system 2780, while an L1 alpha model 3402A is deployed on the local AI system 1470. This arrangement beneficially allows the computationally demanding cognitive tasks (e.g., abstract reasoning, long-horizon planning, nuanced language understanding, etc.) that can run at a lower refresh rate or frequency of 1-100 Hz, and preferably between 1 and 20 Hz to be handled by the extensive resources of powerful remote servers. Concurrently, this allows the less computationally demanding reactive tasks (e.g., balance control, positioning of end effectors, force compliance, collision avoidance, etc.) that need to run at a higher refresh rate or frequency of 100 Hz-500 kHz to be handled by the less power-hungry local computing resources optimized for real-time execution.

FIG. 14B is a diagram depicting a deployment configuration 3402.1 of the CoBAM, wherein both the L2 beta model 3402B and the L1 alpha model 3402A are deployed locally on the humanoid robot. This configuration can effectively minimize the communication latency between the L2 beta model 3402B and L1 alpha model 3402A, thereby enabling exceptionally fast, reactive control and immediate real-time decision-making without network dependencies. However, running both computationally distinct models locally may place high demands on the robot's onboard computing resources, potentially involving more powerful processors, increased memory, and greater power consumption, which could impact the robot's overall design, weight distribution, and operational endurance. It should be understood that in some embodiments, the L2 beta model 3402B may be omitted in this deployment configuration, and the CoBAM may only include a single L1 alpha model 3402A optimized for the specific task domain.

FIG. 14D is a diagram depicting a deployment configuration 3402.3 of the CoBAM, wherein neither the L2 beta model 3402B nor the L1 alpha model 3402A is deployed locally on the humanoid robot. This architectural setup minimizes the computational load on the robot to the greatest extent possible through thin-client design principles, as all significant processing including neural network inference, trajectory optimization, and scene understanding is offloaded to scalable remote servers with elastic compute capabilities. This may be particularly advantageous for deploying fleets of robots that are designed to be lightweight with reduced mechanical inertia, energy-efficient with extended battery life exceeding 8 hours, and less expensive due to reduced onboard computing requirements that eliminate the need for high-end processors and cooling systems. It should be understood that the L2 beta model 3402B may be omitted in this deployment configuration for simplified control pipelines, and the CoBAM may only include a single L1 alpha model 3402A specialized for the target application domain.

In a further deployment configuration, some layers or functions (e.g., encoding through convolutional layers, decoding through transposed convolutions, attention mechanisms with query-key-value projections) of either the L2 beta model 3402B or the L1 alpha model 3402A may be split between the remote AI system 2780 and the local AI system 1470 using model partitioning strategies. For example, the L1 alpha model 3402A and the tokenization and/or embedding layers associated with the L2 beta model 3402B, comprising vocabulary lookups and positional encodings, may be performed on the local AI system 1470 with SIMD optimizations, while the remaining computationally intensive transformer blocks of the L2 beta model 3402B containing multi-head attention and feed-forward networks may be performed on the remote AI system 2780 with tensor parallelism. In an alternative example, the high-frequency reflexes operating at 1 kHz and basic stability functions such as zero-moment-point control of the L1 alpha model 3402A may be performed on the local AI system 1470 using real-time kernels, while the remaining tasks/functions of the L1 alpha model 3402A including trajectory generation and the L2 beta model 3402B for semantic understanding may be performed on the remote AI system 2780. Even further deployment configurations are contemplated, wherein a single remote model may communicate with models locally deployed on a plurality of robots through publish-subscribe architectures, or any other configuration that facilitates distributed intelligence based on this disclosure.

Along with selecting the deployment configuration, the internal architecture for the CoBAM may be selected. The internal architecture may include a single model or a pool of models. For instance, the architecture may comprise an optional pool of L2 beta models 3402B and a pool of L1 alpha models 3402A. While these pools of models can be deployed on the local AI system 1470, these pools and their associated models may be fully or partially deployed on the remote AI system 2780, as described above. It should also be understood that the CoBAM may have any type of hierarchical internal design, or may only include a single model, and thus not have a hierarchical internal design.

In an architecture utilizing a pool of models, each pool may contain a single model or a plurality of models. For example, a pool of L2 beta models 3402B may include models specialized for different cognitive reasoning domains, such as industrial, household, or retail environments. Likewise, a pool of L1 alpha models 3402A may include models specialized for different reactive movements corresponding to those domains. At runtime, the humanoid robot can dynamically select one or more models from the pools to best suit the current task. For instance, to execute a command like "go to the kitchen," the system might select an L2 beta model 3402B with spatial reasoning capabilities and pair it with an L1 alpha model 3402A specialized for locomotion. The selection of models from these pools allows the CoBAM, given a task input, to generate cost-optimized actions (e.g., lowest energy cost or fastest completion time) for a single robot or for a collaborative task between multiple robots.

The models within the architecture can be configured with different characteristics. In some embodiments, the L2 beta model 3402B may have a higher or larger number of parameters (e.g., exceeding 5 billion) or a larger context window (e.g., exceeding 30,000 tokens) than the L1 alpha model 3402A (e.g., below 1 billion parameters or below 10,000 tokens). Correspondingly, the L2 beta model 3402B may operate at a lower frequency or refresh rate (e.g., 1-25 Hz) compared to the higher frequency or refresh rate (e.g., 100-10,000 Hz) of the L1 alpha model 3402A. Alternatively, the models may have similar sizes and operate at similar frequencies for synchronized execution. This architectural modularity also enhances system resilience, as faults or errors in the output from the L2 beta model(s) 3402B can be sandboxed from the lower-level outputs of the L1 alpha model(s) 3402A, reducing the likelihood of erratic actuator or robot behavior in response to erroneous task logic.

The L2 beta model(s) 3402B and the L1 alpha model(s) 3402A may be of any type of artificial intelligence models, machine learning models, neural network-based models, deep learning models, or generative artificial intelligence models. In addition to these general model types, the L2 beta model(s) 3402B and the L1 alpha model(s) 3402A may be classified as one, more than one, or a combination of large language models (LLMs), visual language models (VLMs), multimodal large language models (MLLMs), audio models, video models, graph models, any combination thereof, and/ or any other known model.

Further, the L1 alpha model(s) 3402A and the L2 beta model(s) 3402B may be implemented as and/or including: (i) transformer family architectures (e.g., decoder-only with causal masking; encoder-only (BERT) with bidirectional attention; cross-attention encoder-decoder (T5) with separated encoding and decoding; ViT/DeiT for image patches, Swin with hierarchical windows; Longformer with sparse attention, BigBird with random and global tokens, Reformer with locality-sensitive hashing, Linformer with linear complexity, Performer with kernel-based attention; Transformer-XL with segment-level recurrence, Memorizing Transformer with explicit memory; Cross-Modal Bridges for multi-modal fusion, Q-Former for query-based extraction; Perceiver/Perceiver-IO with latent bottlenecks; Graph Transformers for structured data), (ii) state-space/long-sequence & recurrence models (e.g., S4/S5 with structured matrices; Mamba/Mamba-2 with selective state spaces; RetNet with retention mechanisms; Liquid Models with continuous-time dynamics; Hyena/Long Convolutions with implicit parameterization; Linear-Attention Kernels with softmax alternatives), (iii) recurrent neural networks (e.g., LSTM/GRU/SRU with gating mechanisms; RWKV with linear complexity; RNN-T for sequence transduction), (iv) convolutional neural network architectures (e.g., ResNet/ EfficientNet/ConvNeXt with modern design principles; U-Net for dense prediction; Sparsc/3D CNNs (Minkowski) for point clouds), (v) graph neural network & geometric architectures (e.g., GCN/GAT/GIN with message passing; GraphSAGE with sampling; EGNN with equivariance; SE(3)-Transformers with group theory; E(n)-Equivariant CNNs preserving symmetrics), (vi) spiking neural networks (e.g., Event-Driven SNNs with temporal coding), (vii) MLP-Style Vision architectures (e.g., MLP-Mixer with token mixing; gMLP with gating; MetaFormer-Style Variants abstracting transformer components), (viii) audio-centric backbones (e.g., Conformer combining convolution and attention; TasNet/Conv-TasNet for source separation; wav2vec/HuBERT for self-supervised speech; Diffusion Vocoders for waveform generation), (ix) sets/point clouds/ 3D representations (e.g., DeepSets/Set Transformer with permutation invariance; PointNet/PointNet++ with hierarchical features; Point Transformer adapting attention; KPConv with kernel convolutions; Minkowski networks for sparse voxels), (x) implicit neural representations/neural fields (e.g., SIREN with periodic activations; NeRF Family Including Mip-NeRF with anti-aliasing, Instant-NGP with hash encoding; DeepSDF for shape representation; 3D Gaussian Splatting for fast rendering), (xi) autoregressive models (e.g., Token/Patch/Audio AR with sequential generation; PixelCNN/RNN for images; AR Transformers with causal masking), (xii) variational autoencoder & latent-variable models (e.g., $\beta$-VAE with disentanglement; Hierarchical VAEs with multiple scales), (xiii) diffusion/score-based models (e.g., LDMs in latent space; DiT with transformers; Video Diffusion with temporal consistency; Vocoders for audio synthesis), (xiv) normalizing flows (e.g., RealNVP with coupling layers; Glow with invertible convolutions; Neural ODE Flows with continuous dynamics; FFJORD with free-form Jacobians), (xv) generative adversarial networks (e.g., StyleGAN with style modulation; BigGAN with class conditioning), (xvi) energy-based models (e.g., Including Boltzmann/RBMs with stochastic units), (xvii) masked/denoising objectives (e.g., BERT-Style MLM for language; MAE for images; Denoising AEs with corruption), (xviii) contrastive/self-distillation methods (e.g., CLIP for vision-language; SimCLR for visual representations; MoCo with momentum encoding; DINO/iDINO with self-distillation), (xix) tokenization/latent tokenizers (e.g., VQ-VAE/VQ-GAN with discrete codes; Tokenizer-Decoder Stacks for compression), (xx) preference/RL fine-tuning (e.g., RLHF/RLAIF with human feedback; DPO for direct optimization), (xxi) mixture-of-experts (MoE) systems (e.g., Switch with routing; GShard with sharding; DeepSeck-MoE with sparse activation), (xxii) retrieval & external memory (e.g., RAG for knowledge grounding; kNN-LM with nearest neighbors; NTM with differentiable memory; DNC with addressing mechanisms), (xxiii) world/dynamics models (e.g., PLaNet/RSSM/Dreamer with latent dynamics; MuZero-Style with planning; Latent ODE Dynamics with continuous time; Diffusion World Models for stochastic environments), (xxiv) multimodal fusion strategies (e.g., Cross-Attention Bridges between modalities; FiLM-Style Conditioning with affine transformations; Gated Fusion with learnable weights; Q-Former/Perceiver Latents for bottleneck processing), any combination thereof through hybrid architectures, and/or any other type that advances the state of the art based on this disclosure.

Additionally, this Application contemplates that the L1 alpha model(s) 3402A and the L2 beta model(s) 3402B could use or include any model type disclosed in any one of the following papers: Radford, Alec, et al. "Learning transferable visual models from natural language supervision." *International conference on machine learning*. PMLR, 2021, Li, Yangguang, et al. "Supervision exists everywhere: A data efficient contrastive language-image pre-training paradigm." *arXiv preprint arXiv:*2110.05208 (2021), Yao, Lewei, et al. "Filip: Finc-grained interactive language-image pre-training." *arXiv preprint arXiv:*2111.07783 (2021), Rombach, Robin, et al. "High-resolution image synthesis with latent diffusion models." *Proceedings of the IEEE/CVF conference on computer vision and pattern recognition.* 2022, Li, Junnan, et al. "Blip: Bootstrapping language-image pre-training for unified vision-language understanding and generation." *International conference on machine learning*. PMLR, 2022, Zhang, Renrui, et al. "Llama-adapter: Efficient fine-tuning of language models with zero-init attention." *arXiv preprint arXiv:*2303.16199 (2023), Liu, Haotian, et al. "Visual instruction tuning." *Advances in neural information processing systems* 36 (2024), Liu, Haotian, et al. "Improved baselines with visual instruction tuning." *Proceedings of the IEEE/CVF Conference on Computer Vision and Pattern Recognition.* 2024, Lin, Ji, et al. "Vila: On pre-training for visual language models." *Proceedings of the IEEE/CVF Conference on Computer Vision and Pattern Recognition.* 2024, Jin, Yang, et al. "Unified Language-Vision Pretraining in LLM with Dynamic Discrete Visual Tokenization. arXiv 2024." *arXiv preprint arXiv:*2309.04669, Maniparambil, Mayug, et al. "Do Vision and Language Encoders Represent the World Similarly?." *Proceedings of the IEEE/CVF Conference on Computer Vision and Pattern Recognition.* 2024, Liu, Daizong, et al. "A Survey of Attacks on Large Vision-Language Models: Resources, Advances, and Future Trends." *arXiv preprint arXiv:*2407.07403 (2024), Chang, Yupeng, et al. "A survey on evaluation of large language models." *ACM Transactions on Intelligent Systems and Technology* 15.3 (2024): 1-45, Yin, Shukang, et al. "A survey on multimodal large language models." *arXiv preprint arXiv:*2306.13549 (2023), Zhang, Duzhen, et al. "Mm-llms: Recent advances in multimodal large language models." *arXiv preprint arXiv:*2401.13601 (2024), Vaswani, A. "Attention is all you need." *Advances in Neural Information Processing Systems* (2017), Radford, A. "Improving language understanding by generative pre-training." (2018), Wang, Wei, et al. "Structbert: Incorporating language structures into pre-training for deep language understanding." *arXiv preprint arXiv:*1908.04577 (2019), Radford, Alec, et al. "Language models are unsupervised multitask learners." *OpenAI* blog 1.8 (2019): 9, Liu, Yinhan. "Roberta: A robustly optimized bert pretraining approach." *arXiv preprint arXiv:*1907.11692 (2019), Sanh, V. "Distil-BERT, A Distilled Version of BERT: Smaller, Faster, Cheaper and Lighter." *arXiv preprint arXiv:*1910.01108 (2019), Raffel, Colin, et al. "Exploring the limits of transfer learning with a unified text-to-text transformer." *Journal of machine learning research* 21.140 (2020): 1-67, Brown, Tom B. "Language models are few-shot learners." *arXiv preprint arXiv:*2005.14165 (2020), Touvron, Hugo, et al. "Llama 2: Open foundation and fine-tuned chat models." *arXiv preprint arXiv:*2307.09288 (2023), Schulman, John, et al. "Proximal policy optimization algorithms." *arXiv preprint arXiv:*1707.06347 (2017), Radford, Alec, et al. "Learning transferable visual models from natural language supervision." *International conference on machine learning*. PMLR, 2021, Li, Yangguang, et al. "Supervision exists everywhere: A data efficient contrastive language-image pre-training paradigm." *arXiv preprint arXiv:*2110.05208 (2021), Chen, Zhe, et al. "Internvl: Scaling up vision foundation models and aligning for generic visual-linguistic tasks." *Proceedings of the IEEE/CVF Conference on Computer Vision and Pattern Recognition.* 2024, all of which are incorporated herein by reference and in their entirety for any purpose.

Furthermore, the L2 beta model 3402B may be a vision-language model (VLM) that was trained using internet-scale data comprising billions of image-text pairs with a cross-entropy loss function to output discrete data, whereas the L1 alpha model 3402A is a cross-attention encoder-decoder transformer trained on robot data including teleoperation demonstrations and simulated trajectories using a regression loss function to output continuous data as floating-point action vectors. The selection of an open-weight pre-trained vision-language model is beneficial because it simplifies the training pipeline to provide the model with context awareness through learned representations, reduces data requirements through transfer learning, and enables zero-shot generalization to novel scenarios. Using a robot-trained cross-attention encoder-decoder transformer that outputs continuous data is also beneficial, as the model weights are tailored to the robot's kinematics through embodiment-specific training, offering high precision due to the model's ability to directly predict the floating-point values for each action dimension without quantization artifacts, and avoids discretization errors that arise from binning continuous spaces. The selection of these models represents a significant leap forward over conventional solutions that generate clunky movements with temporal inconsistencies, as these conventional solutions split the continuous action dimension into a finite number of bins resulting in discretization artifacts when predicting the appropriate bin for each degree of freedom.

Moreover, the L2 beta model 3402B and the L1 alpha model 3402A may incorporate techniques such as Low-Rank Adaptation (LoRA) with rank decomposition, Quantized LoRA (QLoRA) combining quantization and adaptation, Adaptive LoRA (AdaLoRA) with importance-based allocation, Decomposed LoRA (DoRA) separating magnitude and direction, Kronecker/Hadamard Low-Rank Adapters (LoKr/LoHa) with structured matrices, Sparse LoRA with selective updates, Adapter-Based Fine-Tuning (Houlsby Adapters) with bottleneck layers, Pfeiffer Adapters with sequential processing, Parallel Adapters with concurrent paths, Compacter (Parameter-Sharing Adapters) with hypercomplex numbers, MAD-X (Modular Adapter Exchange) for task switching, AdapterFusion combining multiple adapters, AdapterDrop for efficient inference, Uni-PELT (Unified Parameter-Efficient Tuning) integrating methods, Prefix-Tuning with virtual tokens, Prompt Tuning (Soft Prompts) with learnable embeddings, P-Tuning v2 with deep prompt encoding, Deep Prompt Tuning across layers, Visual Prompt Tuning (VPT) for vision models, BitFit (Bias-Only Fine-Tuning) updating only biases, $IA^3$ (Input-Attention-Activation Multiplicative Adapters) with element-wise scaling, Side-Tuning with parallel networks, Ladder Side-Tuning with hierarchical connections, Knowledge Distillation (Logit Matching) transferring predictions, Feature/Intermediate-Layer Distillation preserving representations, Self-Distillation (Born-Again Networks) with self-teaching, Sequence-Level Distillation for generation tasks, Multi-Teacher/Ensemble Distillation combining knowledge sources, Online Distillation with co-training, Policy Distillation for reinforcement learning, Data-Free Distillation without training data, Post-Training Quantization (PTQ) reducing precision, Quantization-Aware Training (QAT) with simulated quantization, 8-Bit Optimizers for memory efficiency, NF4/FP4 Low-Precision Training with novel formats, GPTQ with Hessian-based quantization, AWQ with activation-aware quantization, SmoothQuant balancing weights and activations, Structured/Unstructured/Movement Pruning removing parameters, N: M Sparsity with hardware acceleration, Low-Rank SVD Adapters decomposing weight matrices, DreamBooth for subject-driven generation, Textual Inversion learning new concepts, HyperNetworks generating weights, Diffusion-LoRA for generative models, any combination thereof implementing hybrid strategies, any technique disclosed in a paper that is incorporated herein by reference advancing the field, and/or any other technique that enhances model efficiency and adaptation based on this disclosure.

The above L2 beta model 3402B and L1 alpha model 3402A and incorporated techniques may have been generated using any one or combination of the following loss functions: cross-entropy loss (with label smoothing), negative log-likelihood (token-level NLL/perplexity), regression losses (MSE/l2, MAE/l1, huber/smooth-l1), kullback-leibler (kl) divergence, connectionist temporal classification (CTC) loss, rnn-t loss, infonce/NT-XENT (contrastive) loss, focal loss, dice/IOU (jaccard) loss, perceptual/quality losses (feature-space/VGG, SSIM, LPIPS), adversarial GAN losses (non-saturating/logistic, hinge, WGAN-GP), exact log-likelihood/bits-per-dim (normalizing flows), diffusion objectives ($\varepsilon$-prediction MSE, v-parameterization, $x_0$-prediction, variational lower bound), VAE evidence lower bound (ELBO) including $\beta$-VAE, autoregressive maximum-likelihood (teacher-forcing NLL), spectral/audio losses (STFT/multi-resolution STFT, SI-SDR/SI-snr with pit), 3D/NERF/point-cloud losses (photometric L1/L2, chamfer distance, earth mover's distance, eikonal regularization), tokenizer/codebook losses (VQ commitment/codebook/ema), multimodal alignment/matching losses (image-text/audio-text contrastive and ITM), distillation objectives (temperature-scaled cross-entropy, KL to teacher, feature/attention transfer), and/or reinforcement-learning fine-tuning objectives (PPO-clip with value/entropy and KL regularization to a reference, direct preference optimization (DPO)).

It should also be understood that the models may be pretrained using any of the following data: (i) image data (e.g., raw image data, annotated image data, synthetic data comprising computer-generated images used to augment real image datasets such as in instances where usable data is scarce, etc.), (ii) video data (e.g., raw video data, annotated video data, synthetic data comprising simulated video data used to train models on dynamic scenarios and interactions, etc.), (iii) text data (e.g., natural language instructions, dialogue data, machine readable instructions, natural language mapping data, etc.), (iv) depth data (e.g., map data, point cloud data from LiDAR or structured light sensors, etc.), (v) robot joint trajectories, (vi) robot joint locations, (vii) robot joint location data (e.g., obtained from teleoperation of a robot), (viii) robot joint rotations data (e.g., obtained from teleoperation of a robot), (ix) other robot sensor data (e.g., inertial measurement unit (IMU) data, force and torque data, proximity sensor data, etc.), (x) simulation data, (xi) human demonstration data (e.g., images or videos of humans performing the task), (xii) robot demonstration data (e.g., images or videos of other robots performing the task), (xiii) any combination of the above data, and/or (xiv) any other known data type. It should be understood that the data may be labeled or unlabeled.

ii. Training Data

The training data 3404 for the CoBAM can be structured in a layered or pyramidal configuration, as illustrated in FIG. 15, and may include any data type that is disclosed herein. This approach is designed to address the challenge of data scarcity in robotics, where high-quality, embodied data is often costly and time-consuming to acquire at scale. By organizing heterogeneous data sources by their scale and specificity, this structure allows the model to first learn broad visual and behavioral priors from vast, general datasets before being grounded in the specifics of embodied, real-robot execution. At each layer, the data may include demonstrations of one or more robots collaborating to achieve tasks. This collaborative data can provide details on how a complex or long-horizon task can be decomposed into a series of sub-tasks, which may be executed in sequence, in parallel, or as a combination thereof. It may also contain information on optimal assignment plans for a group of available robots. Furthermore, each layer can incorporate data related to the scheduling of these sub-tasks, including how to order them according to priority, user preference, or other defined criteria. The quantity of data may generally decrease, while the embodiment-specificity and relevance increase, from the bottom layer to the top layer of the structure. This layered strategy enables the development of a generalist model that is both knowledgeable about the world and proficient in physical interaction.

The foundational layer 3404.6 of the data structure is composed of vast quantities of Internet data and human videos. This layer can provide the largest volume of data and allow for instilling the model with a broad, common-sense understanding of objects, language, and the physical world. The Internet data may include billions of text documents, images, and video clips, which helps the model learn rich semantic representations and the relationships between visual concepts and linguistic descriptions. This is supplemented by large-scale human video datasets, such as egocentric videos of people performing everyday activities. These datasets capture a wide range of real-world human behaviors, including grasping, tool use, cooking, assembly, and other task-oriented activities, providing the model with extensive examples of human-object interactions, affordances, and natural motion patterns. At this level, data might include videos of multiple people working together in a kitchen, implicitly demonstrating task decomposition (e.g., one person chops vegetables while another prepares a sauce) and scheduling based on dependencies.

A notable component of this foundational layer can include robot-free data collection, which allows for the rapid acquisition of human motion data without a physical robot. In this method, a human operator may use a commercially available virtual reality (VR) or augmented reality (AR) headset to perform various manipulation tasks. The AR/VR system may capture a first-person video stream from the headset's camera at 30-90 fps, synchronized with the three-dimensional position and orientation of the operator's head and hands. This technique can be highly scalable with parallel data collection across multiple operators and cost-effective with consumer-grade hardware, as it decouples data collection from the availability of physical robots and reduces hardware wear through eliminating mechanical stress. It allows for the safe collection of data in diverse environments including homes, offices, and industrial settings, and for a wide array of tasks spanning hundreds of activity categories, such as performing household chores with natural variations or demonstrating complex bimanual manipulations with tool use, thereby generating a large and varied dataset of natural human movements with rich annotations that can be used for initial model training through behavior cloning and trajectory learning.

The middle layer 3404.4 of the data structure comprises simulation and synthetic data generated through physics engines and neural rendering. This layer serves to bridge the gap between the abstract knowledge gained from internet data providing semantic understanding and the specific requirements of robotic embodiment including dynamics and control. In simulated virtual environments powered by engines like MuJoCo, Bullet, or Isaac Gym, it is possible to generate millions of perfectly annotated trajectories for a wide range of tasks with deterministic repeatability, including scenarios with multiple robots collaborating. These simulations can feature diverse objects with varying geometries and material properties, backgrounds with different visual complexities, lighting conditions including shadows and reflections, and physics-based interactions modeling contact, friction, and deformation, allowing for systematic training across a vast parameter space with controlled variations. This layer can explicitly model task decomposition and scheduling, for instance, by generating scenarios where two robots must coordinate to lift a heavy object, defining the parallel sub-tasks of each robot lifting one side. Techniques such as domain randomization can help the model learn to generalize to real-world conditions through robust feature extraction.

In addition to physics-based simulation with analytical models, this middle layer may be augmented with neural-generated synthetic data using generative models. For instance, this process can involve fine-tuning large-scale video generation models such as video diffusion models or autoregressive video transformers on a smaller set of real-world robot trajectories comprising thousands of demonstrations. Once fine-tuned through techniques like LoRA or full fine-tuning, these models can generate a significantly larger volume of novel, high-fidelity video data exceeding millions of samples depicting the robot performing counterfactual scenarios with realistic appearance, such as interacting with new objects with different geometries, executing tasks in different sequences with varied ordering, or recovering from perturbations with adaptive responses. This synthetic data generation effectively multiplies the amount of available training data by creating plausible variations of existing demonstrations through learned priors, which can be used to improve the model's robustness through exposure to edge cases and ability to generalize to unseen situations through interpolation in learned spaces.

The top layer 3404.2 of the data structure comprises the highest-fidelity, most embodiment-specific data: real-world humanoid data collected from physical robots. While this dataset is the smallest in terms of volume, typically containing thousands to tens of thousands of trajectories, it provides essential grounding for the model's learned knowledge in the dynamics and constraints of the physical world including gravity, inertia, and actuator limitations. This data can be primarily collected through teleoperation, where human operators control one or more humanoid robots to perform a variety of tasks, including collaborative ones. For example, teleoperation data could capture two robots working together to assemble a piece of furniture, providing concrete examples of task decomposition (e.g., one robot holds a part while the other fastens screws), optimal assignment, and sequencing. This process generates a rich, time-synchronized dataset containing video from the robots' onboard cameras at multiple viewpoints, the robots' complete state data (e.g., joint positions with encoder readings, velocities from differentiation, and torques from motor currents), proprioceptive signals from IMUs and force sensors, and the operators' motion data serving as supervision signals.

The tasks performed during real-world data collection can be designed to cover a wide range of applications with varying complexity levels, from industrial settings involving precision to domestic environments demanding adaptability. This may include autonomous factory work with repetitive precision, such as sorting items on a production line with quality control, as well as common home chores involving dexterity and planning like loading laundry into a washing machine with fabric handling, folding clothes with bimanual coordination, loading a dishwasher with object arrangement, or tidying a room with scene understanding. These demonstrations provide the model with direct experience of physical interaction including contact establishment and maintenance, contact dynamics with force modulation, friction effects on grasping, compliance for safe interaction, and the specific kinematics of the robot's body through joint limit awareness. This real-world data proves invaluable for fine-tuning the model through supervised learning, bridging the sim-to-real gap through domain adaptation, and ensuring that the final CoBAM can be safe through collision avoidance, effective through task completion, and reliable through consistent performance when deployed on the physical humanoid robot in unstructured environments.

Operational data, including data from one or more collaborating robots, can be polled from a variety of computing systems, including but not limited to the robots and other computing systems that are associated with an operating environment of the robots (e.g., a warehouse management system, a data repository, a historical database). The operational data can include but is not limited to: (i) data associated with orders, labor, equipment use, robot utilization, robot actions, tasks, sub-tasks, equipment maintenance, energy usage, energy availability, electricity availability, fuel availability, battery availability, power consumption, etc., in the illustrative context of a warehouse, facility, or distribution center, (ii) inventory costs (e.g., holding, storage, spoilage, insurance), (iii) order costs (e.g., ordering, shipping), (iv) processing-related costs such as processing times for picking, packing, unpacking, and/or shipping operations/actions/tasks, (v) past, present, or future operational data (can include throughput conditions, such as number of orders, tasks processed per hour and/or per day, inventory turnover rate, robot turnover rate, tasks/actions processed per robot per hour and/or per day, etc.), (vi) a combination of the above, and/or (vii) any other similar data known to one of skill in the art. This collected operational data is then processed using various cost functions, algorithms, and predictive models. The objective of this processing is to systematically estimate, predict, and ultimately annotate or associate specific costs—such as energy consumed, time elapsed, and operational resources utilized—with individual robot actions or sequences of actions. By annotating the training data with these cost metrics, a cost-aware dataset is created. This dataset can be instrumental in training the CoBAM, enabling it to learn the relationships between actions and their associated costs. Consequently, the trained CoBAM can generate cost-optimized action plans, whether for a single robot or a collaborating team, thereby ensuring that tasks are completed in the most efficient manner possible.

iii. Cost Factors and Features

As depicted in FIG. 16, the CoBAM training process can obtain a variety of cost factors and constraints 3406 that define the operational limits of the robots and their operating environment. These factors are utilized for establishing a baseline for cost calculations and may be sourced from operational data. The cost factors and constraints can include, but are not limited to: (i) maximum labor hours available 3406.1, (ii) maximum battery power available 3406.2, (iii) maximum degree of position and/or rotation of robot components to perform tasks 3406.3, (iv) space limits in the operating environment 3406.4, (v) minimum order processing rates 3406.5, (vi) maximum types of actions that can be performed by the robots 3406.6, (vii) maximum quantity of tasks that can be assigned to the robots 3406.7, (viii) maximum quantity of robots that can be operating at a given time 3406.8, and/or (ix) any other relevant cost factor and/or constraints 3406.9 thereof.

The system can apply one or more machine learning algorithms to operational data to identify and engineer cost features. These techniques are used to create features, feature vectors, and feature spaces that influence and define the cost function. Such features may include patterns in the size and frequency of inbound and outbound commands, seasonal operational variations, the physical distance between key locations, individual robot productivity rates, the ratio of robot operational time versus idle time, charging or maintenance durations, external influences like traffic patterns or weather, historical demand, and other robot efficiency metrics.

Subsequently, the system can train an AI cost model to predict operational costs associated with various robot actions and tasks. This model can be trained using a variety of machine learning techniques, including multi-objective optimization, to minimize overall costs while maximizing operational throughput. The training process often involves simulating different operational strategies, guided by historical data and real-time conditions within the operating environment. These simulations enable the AI cost model to learn how to accurately predict operational costs across a wide range of strategies and conditions that may exist at any given time.

One or more different types of models may be trained as the AI cost model. For example, regression models (e.g., linear, ridge, LASSO) can be used to predict costs based on various input features. Tree-based models, such as Random Forest or Gradient Boosting, can capture non-linear relationships and interactions among the features. For more complex scenarios, neural networks (NNs) are advantageous for understanding high-dimensional data patterns. Furthermore, optimization algorithms like genetic algorithms or gradient descent can be used to minimize a defined cost function, incorporating the predicted costs from the AI cost model. In dynamic environments, reinforcement learning techniques can be particularly effective for optimizing operations in real-time, using a state space to represent the current environment, an action space for possible robot actions, and a reward function based on cost savings and performance metrics.

The AI cost model may be dynamically refined by applying penalties and weights associated with the obtained cost factors and constraints. This refinement can involve adjusting the model's parameters or the weights within its cost function. Such adjustments are often part of an iterative feedback loop, allowing the AI cost model to adapt and improve its predictive accuracy based on real-world performance data as robots perform operations in their environment. A cost function can then be defined to incorporate predictions generated by the AI cost model. An illustrative example of a cost function may include:

$$C = \alpha \cdot f(\text{identified cost factors}) +$$
$$\beta \cdot \text{ML\_Predicted\_Costs}(\text{features } X) + \gamma \cdot \text{Penalty}(\text{identified constraints})$$

Here, f (identified cost factors) represents a function derived from the established cost factors, AI_Predicted_Costs is the output from the AI cost model based on input features X, and Penalty (identified constraints) applies a penalty for exceeding operational limits.

To illustrate with a home chore example, consider the task "do a load of laundry." A single robot is tasked with gathering laundry from a basket, transporting it to the washing machine, and loading it. The AI cost model predicts the action will take 5 minutes and consume 100 Wh of energy. The cost function prioritizes time over energy, with weighting factors $\alpha$ (for time)=1.0, $\beta$ (for energy)=0.2, and $\gamma$ (for penalties)=1.5. Assuming no constraints are violated, the penalty is 0. The total cost C for a single robot would be calculated as: C_single=(1.0*5 minutes)+ (0.2*100 Wh)+ (1.5*0)=5+20=25.

Now, consider a collaborative scenario with two robots. Robot 1A is tasked with gathering the laundry (taking 2 minutes, consuming 30 Wh), while Robot 1B is tasked with receiving the laundry and loading the machine (taking an additional 1 minute, consuming 40 Wh). The tasks are partially parallelized, and the total time is reduced to 3 minutes, with a total energy consumption of 70 Wh. Using the same cost function and weights, the collaborative cost is calculated as: C_collab=(1.0*3 minutes)+ (0.2*70 Wh)+ (1.5*0)=3+14=17. Since the collaborative cost (C_collab=17) is much lower than the single-robot cost (C_single=25), the AI planner can therefore assign the task to the two robots to execute collaboratively, achieving a more cost-effective outcome.

Figure 17A:
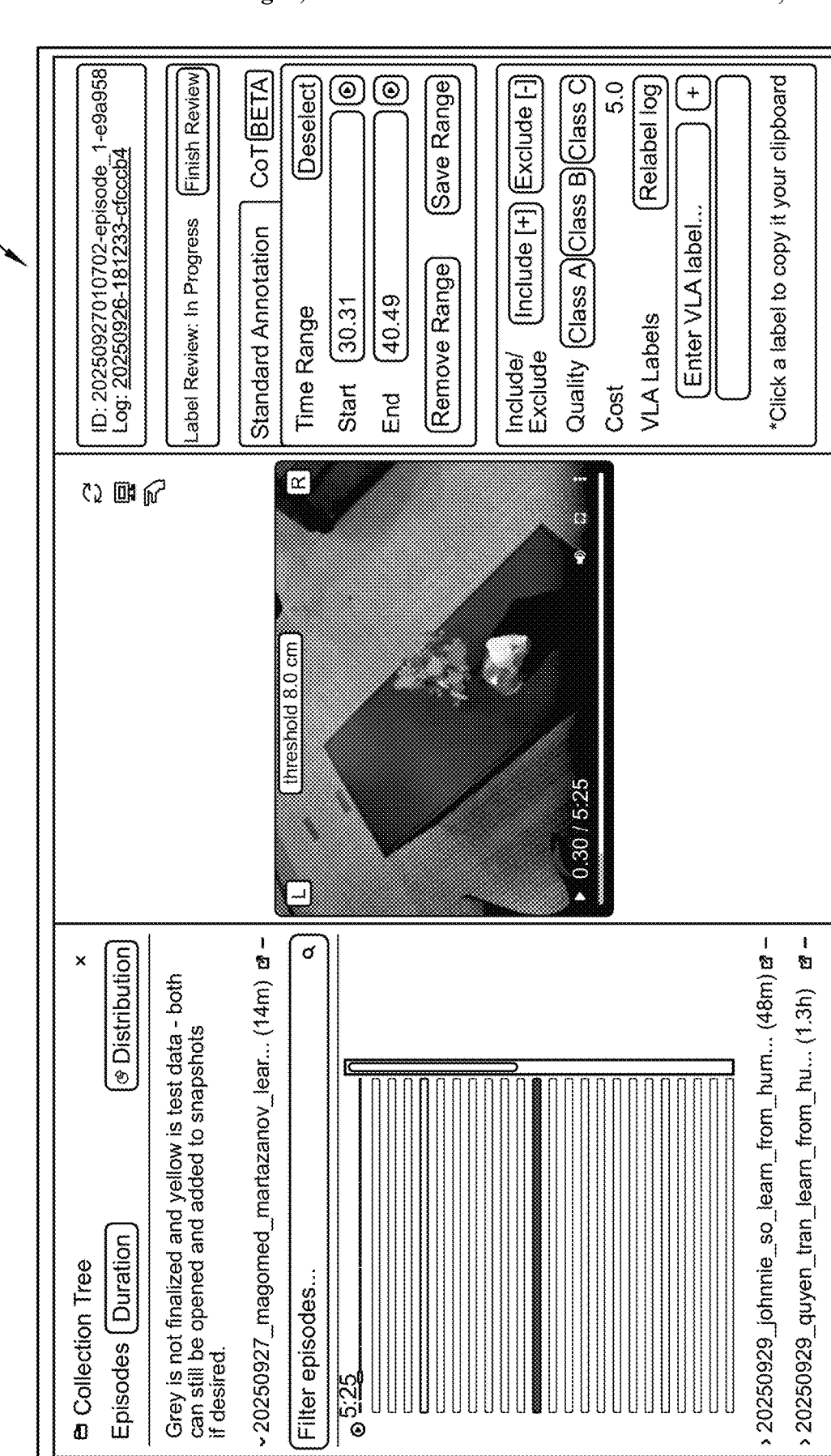
FIGS. 17A-17C are screenshots of a specialized data collection platform can be utilized in annotating costs associated with robot actions.
Figure 17B:
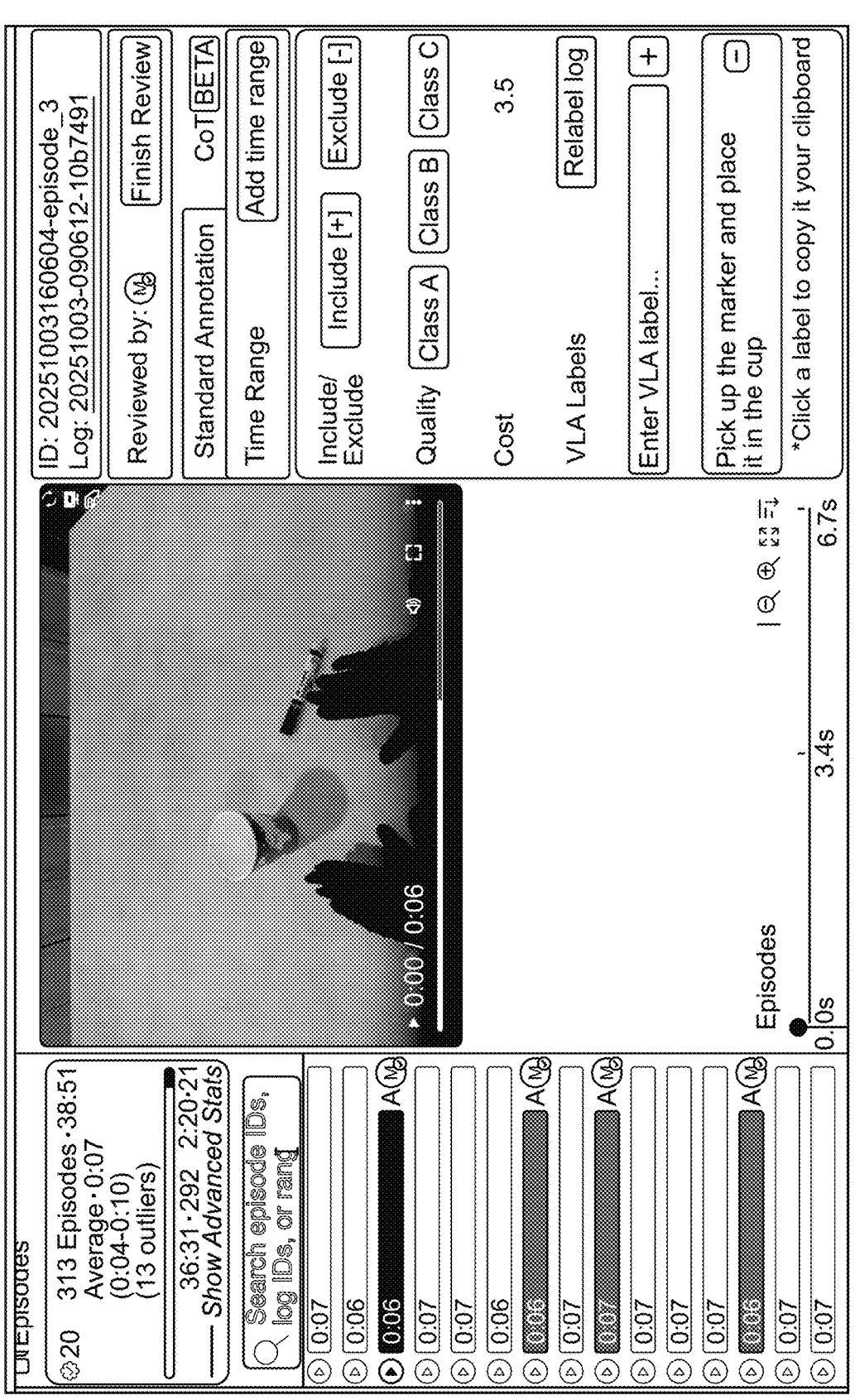
Figure 17C:
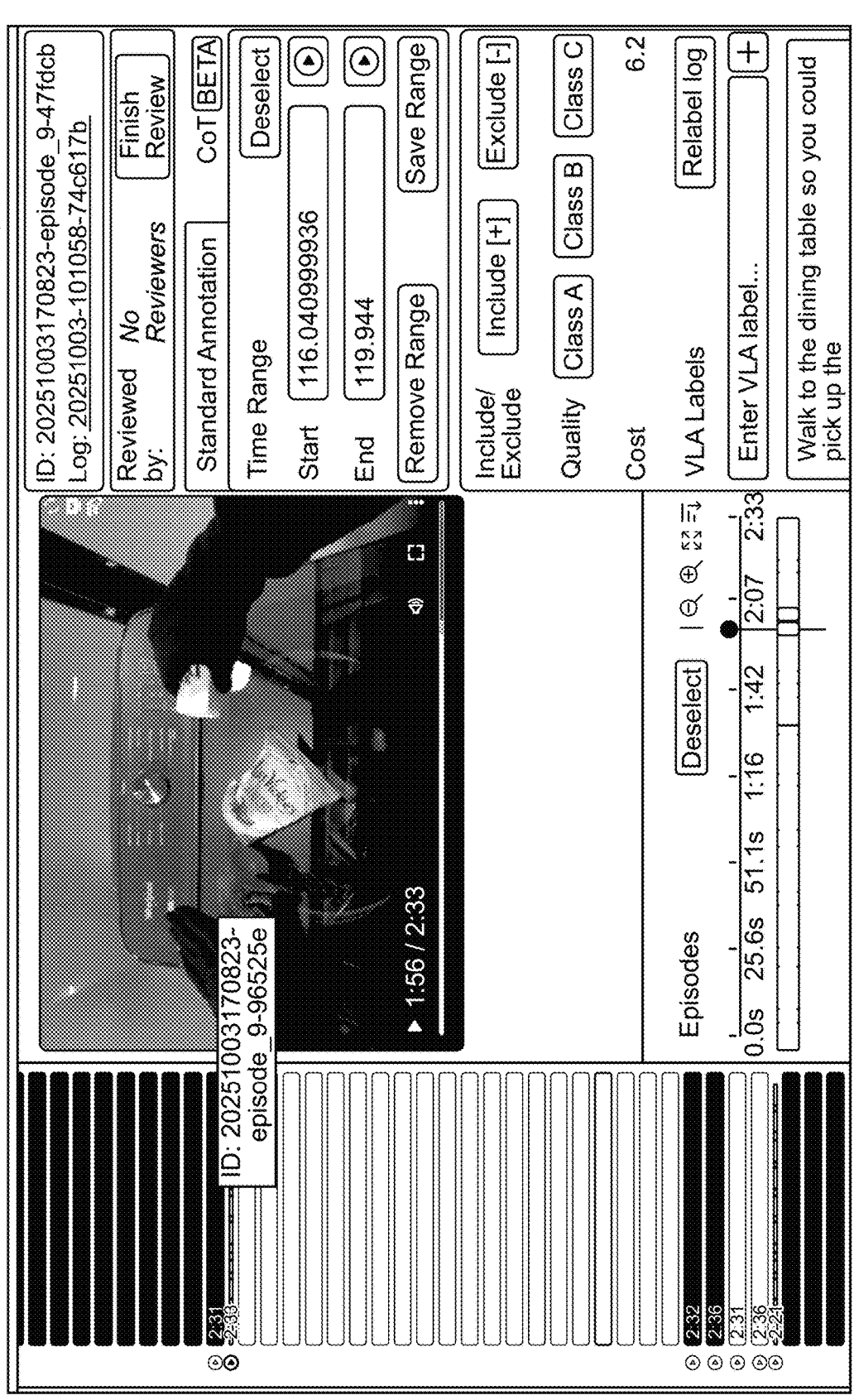

To facilitate the training of the CoBAM, a specialized data collection and annotation platform can be utilized, as depicted in the user interface screenshots shown in FIG. 17A-17C. This platform allows human reviewers to analyze video recordings of robot task executions and assign a numerical cost value to specific actions or sequences of actions. The interface provides tools to select time ranges within a task episode, label the action being performed, and input a corresponding cost. This process of manually or semi-autonomously annotating real-world robot data with cost metrics is fundamental to creating a rich dataset from which the AI cost model can learn. This enables the model to accurately predict costs for unseen tasks and thereby optimize future action plans.

The platform's application is demonstrated through several examples of cost annotation. In one instance 3408.1, the task involves the robot picking up a pump bottle from a low surface. This action is assigned a relatively high cost of 5.0, as it involves the robot executing complex and energy-intensive maneuvers such as bending its legs or crouching, which places greater strain on its joints and consumes more power. In contrast, a simpler task 3408.2, "pick up the marker and place it in the cup," is assigned a lower cost of 3.5 because it primarily involves straightforward arm and gripper movements at waist level, without significant body posture changes. A more complex, multi-step task 3408.3, which involves cleaning a washing machine top by removing multiple objects, receives an even higher cost of 6.2, reflecting the increased duration, complexity, and cumulative energy expenditure of the entire sequence. This integrated system of data capture and cost annotation ensures that the AI cost model is trained on nuanced, context-aware data, leading to more accurate and effective cost-based task planning.

iv. Model Training

FIGS. 18-20 illustrate a general process for generating the Cost-optimized Bipedal Action Model (CoBAM) through iterative optimization and validation cycles. The CoBAM is a model that receives user commands to perform certain tasks and outputs robot actions to control one or more robots, with cost optimization (e.g., lowest energy consumption or fastest completion time) as the primary goal for accomplishing the task. As discussed previously, the process may start with the selection or generation of the deployment configuration determining computational resource allocation, the architecture defining model connectivity and information flow, and the model types specifying inductive biases and learning paradigms. An example of these initial selections may include: (i) selecting a deployment configuration where a first model component (3402B) runs on a first GPU and a second model component (3402A) runs on a second GPU, both installed within the robot's torso; (ii) identifying a two-model architecture with hierarchical processing, wherein component (3402B) is connected to component (3402A) via a latent vector; and (iii) obtaining a Vision Language Model (VLM) for one component and a cross-attention transformer for the other, trained on relevant data sources such as internet data and robot teleoperation demonstrations, respectively.

Along with the selection or generation of these elements forming the model foundation, the designer processes, refines, structures, and enriches collected training data, as represented by the Training Data (3610) in FIG. 18, through comprehensive preprocessing pipelines. This preprocessing stage may involve annotation and labeling with semi-automated tools, where video data is segmented into distinct, meaningful segments using shot detection algorithms, each marked with timestamps aligned across sensors. These segments can then be assigned detailed natural language descriptions generated by vision-language models that explain the actions and interactions occurring within them, including object states, contact events, and task progress indicators. The entire task trajectory may also be labeled with its final outcome through automated evaluation, such as "success" with task completion metrics or "failure" with diagnostic information, to allow the model to learn from both positive and negative examples through contrastive learning. Other preprocessing techniques may include random sampling with stratification to create manageable training sequences from long demonstrations while preserving task diversity, and trajectory filtering using quality metrics to remove low-quality or irrelevant data, such as trajectories with significant occlusions detected through visibility analysis or noisy sensor readings identified through statistical outlier detection.

Other processing, refining, or structuring of the training data may include or exclude: (i) event-triggered slicing of multi-sensor streams (contact/fault/state-change) with precise temporal alignment, (ii) calibration handling (intrinsic/extrinsic updates with distortion correction, drift compensation through sensor fusion), (iii) quality control and curation (de-duplication using perceptual hashing, outlier removal with statistical methods, missing-data imputation through interpolation, checksum validation for data integrity), (iv) signal cleanup (denoising/smoothing with Kalman filtering, detrending removing systematic biases, artifact suppression eliminating sensor glitches), (v) event/binning at byte or packet level (burst or keyframe-grouped bins) for efficient storage, (vi) kinematic reconstruction (forward/inverse kinematics solving joint configurations, twist/wrench computation for velocity and force), (vii) derived signals (contact state from force thresholds, center-of-pressure from force distribution, occupancy/height maps from depth sensors, SDFs from point clouds, cost/reward traces from task objectives), (viii) sequence/trajectory assembly with teacher-forcing or rollout annotations for supervised learning, (ix) self-supervised target generation (masking/denoising targets for reconstruction, contrastive pairs/triplets for metric learning, next-step prediction for dynamics modeling, temporal order/reversal for sequence understanding), (x) weak/explicit labeling (heuristics from domain knowledge, simulation providing perfect labels, programmatic rules encoding priors, human annotation for ground truth), (xi) data augmentation and domain randomization (spatial/photometric/temporal/viewpoint/dynamics variations; noise injection, cutout/mixup for robustness), (xii) balancing and sampling strategies (class/scene balance addressing skew, curriculum sampling with increasing difficulty, hard-negative mining focusing on errors), (xiii) compression and quantized feature caches (e.g., NF4/FP8/INT8) for storage/throughput optimization, (xiv) privacy/security filtering (anonymization removing identifiers, PII/PHI redaction for compliance, access-control tagging for permissions), (xv) metadata/provenance attachment (sensor IDs for tracking, calibration versions for reproducibility, environment/task/policy tags for organization), (xvi) retrieval indices and memory tables for RAG-style conditioning enabling knowledge grounding, (xvii) teacher/assistant signal preparation for distillation (logits as soft targets, intermediate features for matching, attention maps for structure transfer), (xviii) dataset partitioning (train/val/test with no leakage, temporal/domain/robot splits for generalization evaluation), (xix) online/streaming ingestion with backpressure and late-bound labeling for continuous learning, (xxi) any combination thereof creating comprehensive pipelines, (xxii) any processing, refining, or structuring disclosed in a paper that is incorporated herein by reference advancing best practices, and/or (xxiii) any processing, refining, or structuring that is obvious to one of skill in the art.

Data augmentation may also be employed to enhance the dataset with temporal and sensory context. This can include creating a vision memory by providing the model with a sequence of recent video frames, rather than a single instantaneous frame, to improve its understanding of dynamic scenes. Similarly, a state history, comprising a temporal window of past robot or human tracking states, can be used to provide context for generating smoother and more reactive motions. The input observations may also be augmented by integrating force feedback data from tactile or force sensors, providing the policy with a sense of touch to better modulate its physical interactions. Furthermore, when training with mixed datasets of human and robot data, data alignment techniques may be used. This can involve removing robot-specific state information or randomly masking sensor data fields that are not present in the human data, which forces the model to learn from the shared data streams and improves its ability to generalize across different embodiments.

The core process of creating the CoBAM begins with the ingestion of the Training Data (3610). Said ingestion may focus on data modifications that alter the prepared training data into information that can be consumed in the process of training the CoBAM, wherein said data modifications include: (i) tokenization/discretization into discrete IDs (e.g., BPE/WordPiece/Unigram for text; vector-quantized codes via VQ-VAE/RVQ, product/k-means codes for images/audio/features); (ii) patchification/tiling of images or video (fixed-size patches/tubelets) and linear projection to embedding dimension; (iii) framing/windowing of time-series or audio with fixed hop sizes; (iv) padding/truncation and bucketing to normalize sequence lengths, with optional special markers (CLS/SEP/BOS/EOS); (v) feature scaling/normalization (per-channel mean-std, min-max, whitening, log scaling, clipping to valid ranges); (vi) rate conversion/resampling and time alignment/interpolation to common sampling grids; (vii) precision casting/quantization of inputs (e.g., float32→bfloat16/float16 or INT8) for compute compatibility; (viii) embedding/projection layers that map continuous inputs (pixels, forces, IMU, tabular fields) to fixed-width vectors; (ix) positional/temporal encodings (sinusoidal/learned, rotary/relative) appended or fused with inputs; (x) coordinate-frame canonicalization (e.g., transforming sensor/EE frames to a world frame; centering/orienting 3D data; unit-cube/sphere normalization); (xi) serialization to tensor layouts used by the backbone (e.g., (B,T,D), (B,C,H,W), contiguous memory; ragged/sparse tensors as needed); (xii) graph construction for GNNs (node-feature matrices, edge index/adjacency in COO/CSR; batching with graph IDs); (xiii) 3D representation building (voxel/TSDF grids, occupancy/SDF fields, ray bundles for NeRF, point-cloud subsampling/quantization, mesh→point/graph conversion, normal maps); (xiv) audio representations (STFT/mel spectrograms, MFCCs, magnitude/phase splits) normalized to model-specific ranges; (xv) label/target encoding into model-readable forms (class indices, one-hot/multi-hot, normalized boxes/segments, heatmaps/keypoints, regression tensors); (xvi) masking/corruption transforms that generate masked inputs for masked-modeling objectives (e.g., MLM/MAE span masks) while preserving model-expected shapes; (xvii) multimodal fusion prep (time-locking modalities, length-matching via padding/resampling, channel/time concatenation, or projection into a shared embedding space); (xviii) sparsity formats (structured/unstructured indices) for sparse backbones or memory-efficient loaders; (xix) value/unit harmonization (unit conversions, bias/offset removal) to match learned scaling; (xx) sample/ chunk packaging into fixed, indexed records (shards/TFRecord/WebDataset/LMDB) that present tensors and metadata in the exact shapes and types the network expects; and/or (xxi) any combination thereof, any method of ingestion that is disclosed in papers that are incorporated herein by reference, and/or any other method that is obvious to one of skill in the art based on this disclosure.

Once the training data has been ingested, a training methodology, illustrated by the overall process (3410) in FIG. 18, can be applied to generate the CoBAM. Said training methodology includes a learning method and a loss function/reward. The learning methods may include: (i) supervised learning techniques (e.g., classification, regression, behavior cloning, etc.), (ii) unsupervised learning (e.g., clustering, dimensionality reduction, anomaly detection, etc.), (iii) transfer learning (e.g., by leveraging pre-trained models), (iv) reinforcement learning (e.g., model-free methods, model-based methods), (v) semi-supervised learning (e.g., training with labeled and unlabeled data), (vi) any combination thereof, and/or (vii) any method that is disclosed in papers that are incorporated herein by reference, and/or any other method that is obvious to one of skill in the art based on this disclosure.

After a general learning method is selected, the designer can then select a loss function or develop a reward function. Examples of loss functions that may be selected can include: (i) cross-entropy (with label smoothing) and BCE-with-logits, (ii) negative log-likelihood (token-level NLL, perplexity), (iii) focal loss and Hinge/Max-margin, (iv) regression losses (MSE/L2, MAE/L1, Huber/Smooth-L1, Charbonnier, Log-cos h), (v) segmentation/detection losses (Dice, IoU/Jaccard, Tversky/Focal-Tversky, Lovász-Softmax; box L1/GIoU/DIOU/CIOU), (vi) metric/contrastive losses (Triplet, Contrastive, N-pair, Circle, Center; Cosine-similarity; ArcFace/AAM-Softmax, CosFace), (vii) self-supervised objectives (InfoNCE/NT-Xent, BYOL/Barlow Twins/DINO; masked-modeling MLM/MAE reconstruction), (viii) autoregressive maximum-likelihood (teacher-forcing NLL, sequence-level risk), (ix) VAE objectives (ELBO, $\beta$-VAE, KL annealing/free-bits), (x) GAN losses (non-saturating/logistic, Hinge, LS-GAN, WGAN-GP, Relativistic GAN), (xi) normalizing-flow likelihood (exact log-likelihood/bits-per-dim, FFJORD), (xii) diffusion/score matching ($\epsilon$-prediction MSE, v-param, $x_0$-prediction, VLB, consistency/distillation), (xiii) audio/speech losses (STFT/multi-res STFT, spectral convergence, SI-SDR/SI-SNR with PIT, CTC, RNN-T), (xiv) 3D/geometry losses (Chamfer, EMD, point-to-surface, normal consistency, Eikonal/SDF, occupancy BCE), (xv) Perceptual/quality losses (feature/VGG, LPIPS, SSIM/MS-SSIM, total variation), (xvi) token-izer/codebook losses (VQ commitment/codebook/EMA, Gumbel-Softmax straight-through), (xvii) distillation losses (temperature-scaled CE, KL to teacher, intermediate feature/attention transfer), (xviii) regularization terms (weight decay/L2, L1/Group-Lasso, dropout, spectral norm, orthogonality, gradient penalty, Jacobian/contractive, entropy/confidence penalties), (xix) RL policy losses (REINFORCE, PPO-Clip with value and entropy, TRPO, A2C/A3C), (xx) RL value/Q losses (TD error for DQN/Double-DQN, critic losses for DDPG/TD3, SAC entropy-regularized objective), (xxi) imitation learning losses (behavior cloning CE, GAIL discriminator, inverse RL), (xxii) any combination thereof, any method disclosed in papers that are incorporated herein by reference, or any method that is obvious to one of skill in the art based on this disclosure.

In a first example, the designer of a CoBAM that outputs actions in a discretized action space (e.g., discrete bins) may use a cross-entropy loss function or a negative log-likelihood (NLL) function to measure the difference between the predicted probability distribution over the action bins and the true action. In another example, the designer of the CoBAM that outputs actions in a continuous space may use a regression-based loss function such as mean absolute error (MAE or L1 loss) or mean squared error (MSE or L2 loss).

Additionally/alternatively, the following list of reward functions may be utilized: (i) task success and progress (sparse success, dense shaping, time penalties), (ii) safety and constraints (collisions and limit violations), (iii) control costs (action L2, energy/torque use, smoothness/jerk penalties), (iv) environment/resource rewards (throughput, latency, energy/battery, cost/revenue, risk/CVaR), (v) exploration and intrinsic motivation (entropy bonus, novelty counts, curiosity/prediction error, empowerment, information gain), (vi) preference-based/human-feedback rewards (pairwise preference models, rule-based shaping), (vii) imitation-derived rewards (inverse RL, GAIL/AIRL discriminator scores), (viii) metric-based rewards for perception/NLP (BLEU/ROUGE/CIDEr, WER, F1, PSNR/SSIM), (ix) multi-objective composition (weighted sums, lexicographic ordering, constrained/Lagrangian optimization), (x) any combination thereof, and/or (xi) any method that is disclosed in papers that are incorporated herein by reference, and/or any other method that is obvious to one of skill in the art based on this disclosure.

In order for the CoBAM to generate cost-optimized action plans, whether for a single robot or a collaborating team, the model must be trained to ensure that tasks are completed in the most efficient manner possible. As shown in FIG. 18, the designer can use the selected training methodology in connection with the previously obtained components of the CoBAM to generate said CoBAM. For example, the designer may utilize supervised learning to modify the internal parameters of the CoBAM components (e.g., both components 3402A and 3402B) to minimize the error between the model's predicted actions and the desired actions provided in the training data. Specifically, to train the components (3402A, 3402B) end-to-end, a batch of training data is sampled (3610), providing a Data Set (3602) (e.g., video frames, sensor data, robot state) and a Desired Action (3604). The Desired Action (3604) represents the optimal, cost-optimized outcome the CoBAM is trained to replicate. It is not merely a sequence of target actions but the specific set of assignments and/or actions that achieve a task with the lowest cost, according to metrics like energy usage or completion time. For example, if a task is to clean a room with two robots, the Desired Action (3604) in the training data would be the optimal plan, such as Robot A handling laundry while Robot B simultaneously clears a table, because this parallel approach was determined to be the fastest. For a single robot retrieving an object, the Desired Action would be the precise joint trajectory that consumes the least battery power. The CoBAM ingests the Data Set (3602) and predicts an output action, with component (3402B) providing a latent vector of features and component (3402A) using this vector to produce the final control trajectories.

The selected loss function, such as a Supervised Regression Loss (3606), can then be used to calculate the loss between the action output by component (3402A) and the Desired Action (3604) from the demonstration data. This calculated loss is backpropagated through the network. Specifically, the gradients descend from the component (3402A) output back through its network and then through the latent vector connection into component (3402B). An optimization algorithm, such as Adam, is used to update the network weights to reduce the error. This training loop continues until a convergence criterion is met, such as the training loss plateauing or after a predetermined number of epochs. The output of this process is a trained CoBAM capable of generating Output cost-optimized assignments/actions (3612) based on visual and state inputs.

In certain embodiments, the loss may combine a regression term on joint targets or task-space poses with a temporal smoothness penalty across the action chunk, and may include a consistency term that aligns outputs from component (3402A) with latent plans derived from component (3402B). The system may apply gradient clipping, weight decay, and a learning-rate schedule with warmup and cosine decay, and may use mixed precision for throughput. Convergence may be assessed on a validation split using sequence-level metrics such as horizon-integrated error, collision flags computed by a kinematic model, and satisfaction of joint and velocity limits. Batch size, horizon length, and update frequency may be selected to balance memory use and CoBAM stability on long sequences.

In addition to supervised learning, unsupervised learning techniques can be employed to further enhance the CoBAM. These techniques do not rely on actual robot actions provided in the training data but instead focus on identifying patterns and structures within the data itself. For example, the model can be trained using unsupervised methods such as clustering or self-supervised learning, where it learns to group: (i) similar human commands together, (ii) similar visual and textual features together, and (iii) predict missing parts of robot actions, images, or text. For example, teleoperation data may be collected for a subset of the waypoints for a given task or movement. The unsupervised learning techniques can then determine the missing waypoints for the given tasks or movements. This helps the model develop a deeper understanding of the underlying relationships between robot actions, visual, and textual information, making it more robust and adaptable to new, unseen data. In one approach, masked sequence modeling may be used over video tokens, state sequences, and action tokens so that the model reconstructs withheld segments, and contrastive objectives may align command text with visual clips and state descriptors. Latent dynamics models may predict future state embeddings from observations, which may improve action inference when labels are sparse.

Transfer learning is another method used to train the CoBAM. In this approach, the model is first pre-trained on a large, general-purpose dataset and then fine-tuned on a smaller, domain-specific dataset. This allows the model to leverage the knowledge it has already acquired during pre-training and apply it to more specialized tasks, significantly reducing the amount of data and computational resources for training. Reinforcement learning can also be applied to fine-tune or train the CoBAM, particularly in scenarios where the model needs to interact with its environment and receive feedback on its performance. In this method, the model is trained to make decisions based on inputs, with the goal of maximizing a reward signal. This can involve methods like Q-learning or policy gradient methods like proximal policy optimization (PPO). A hybrid approach, reinforcement learning from human feedback (RLHF), can also be used, where human preferences are used to shape the reward function. Over time, the model learns to generate robot actions that not only accurately move the robot to the desired position, but also minimize the cost (e.g., battery, avoid singularities, etc.). Finally, semi-supervised learning techniques can be utilized. In this approach, the CoBAM is trained on a combination of labeled robot actions and unlabeled input data. Additionally, it should be understood that the designer may freeze certain layers or components during training. For example, the designer may freeze component (3402B) after a predefined number of training cycles while continuing to train component (3402A), or vice versa.

Following the initial training, the CoBAM may undergo an iterative process of testing and evaluation to validate and improve its performance. The CoBAM may be deployed on a physical or simulated humanoid robot, which is then monitored as it attempts to perform a manipulation task autonomously. If the task is performed successfully, the CoBAM is considered validated for the encountered states. If the robot fails to complete the task, a process for collecting corrective demonstrations may be initiated. In this process, an operator may take control of the robot from the failure state and provide a new, expert demonstration showing the correct sequence of actions to recover and complete the task. This new corrective demonstration is then added to the original training dataset, and the model is retrained on this enriched dataset. This iterative loop of testing, collecting corrective data from failure states, and retraining allows the CoBAM to be progressively improved. The subsequent fine-tuning and testing phases are detailed in FIGS. 19 and 20.

FIG. 19 illustrates a process for finetuning the CoBAM in a simulation environment. The process begins after obtaining a trained CoBAM (block 3810). The CoBAM is run in a simulation engine (block 3812) to evaluate its performance on tasks it has seen during initial training. A determination is made as to whether the performance on these seen tasks exceeds a predefined threshold at the lowest cost (block 3814). For example, if the task is to pick up a box, the system checks if the simulated robot completes the action within a certain time limit and below an energy consumption budget. If performance is unsatisfactory, additional training data is obtained (block 3826) and the model is finetuned (block 3828). If performance is satisfactory, a new, unseen task is provided by modifying the simulation, such as by altering the environment background, changing object properties, or presenting a different task objective (block 3818). For instance, the task might change from picking up a box to picking up a cylinder, or the lighting conditions in the simulation could be altered. The CoBAM is then tested on this new task within the simulation engine (block 3820). Its performance is again evaluated against a threshold at the lowest cost (block 3822). If successful, the CoBAM is deemed ready for real-world testing and is output for that purpose (block 3824). If it fails, for example by being unable to grasp the cylinder efficiently, additional training data is obtained (block 3826), such as a new teleoperated demonstration of grasping the cylinder in the simulation. This new data is used to finetune the CoBAM (block 3828), and the simulation testing loop continues.

One effective strategy for finetuning (block 3828) is co-finetuning, where the model is trained on a mixture of its original, large-scale pretraining data and the smaller, domain-specific robotics dataset. This approach may help prevent catastrophic forgetting. For large models, parameter-efficient fine-tuning (PEFT) methods may be employed. Techniques such as low-rank adaptation (LoRA) introduce a small number of trainable parameters, allowing for efficient adaptation without updating all original model weights. Other efficiency-focused techniques include model quantization, which reduces the precision of the model's weights to decrease its memory footprint and accelerate inference speed.

FIG. 20 illustrates a process for testing the finetuned CoBAM in the real world with physical robots before full deployment. This process can be used to teach the CoBAM to generalize tasks and actions. The process begins by executing the CoBAM to control multiple physical robots performing seen tasks (block 3902), for example, instructing a fleet of robots to each pick up a cup, a task they were trained on extensively. A determination is made as to whether the robots are performing these tasks above a certain accuracy threshold (block 3904). If not, it indicates a failure to transfer from simulation to the real world, and additional training data must be obtained (block 3912) to retrain the CoBAM (block 3914). If the seen tasks are performed successfully, the CoBAM is then executed to control the robots as they perform unseen tasks (block 3906). For example, a model initially trained to pick up a cup can be commanded to pick up a diverse set of objects it has never seen before to learn a general "pick up" skill. The performance on these new tasks is evaluated against an accuracy threshold (block 3910). If the robots succeed, the CoBAM is considered robust and is output for deployment (block 3912). If they fail (e.g., they cannot securely grasp a novel object), it indicates a need for more data. Corrective demonstrations are collected from these real-world task failures to obtain additional training data (block 3912), for instance, by having an operator teleoperate a robot to show the correct way to grasp the new object. This new data is then used to retrain the CoBAM (block 3914), and the real-world testing loop repeats. Finally, the fine-tuned CoBAM can be returned, ready for deployment on a humanoid robot. The deployment artifact may include the CoBAM, configuration files, normalization statistics, safety envelopes, and interface shims for robot controllers.

c. Deployment of CoBAM and Task Assignment

FIG. 21 is a flowchart of a process 4000 for deploying the Cost-optimized Bipedal Action Model (CoBAM) to determine and assign tasks amongst multiple humanoid robots. The process 4000 can be performed by a remote artificial intelligence system, a remote computer system, or an edge device. For illustrative purposes, the process 4000 is described from the perspective of a central system managing a fleet of robots.

The process begins when the system receives data (block 4002), which serves as the sensory input for its decision-making framework. This data is bifurcated into Robot data (block 4004) and other data about a set of available robots (block 4012). The Robot data (block 4004) may consist of real-time information streamed from the robots themselves, such as image data (block 4006) from their onboard cameras providing a first-person view, prompts or commands (block 4008) received from users or operators, and other robot data (block 4010). This other data can include proprioceptive sensor readings (joint angles, velocities), IMU data, and force-torque sensor information, which collectively define the robot's physical state and its interaction with the environment.

Simultaneously, the system gathers data about the set of available robots (block 4012) to build a complete operational picture, effectively creating a real-time world model for informed coordination. This involves the number of robots (block 4014) currently online, the availability of robots (block 4016) through checking their status (e.g., active, charging, under maintenance), the positional relationship of each robot in space (block 4018) using fused data from onboard and external localization systems, and the positional relationship of each object in space (block 4020) through processing sensor data to generate and maintain a map of the environment and its contents.

The system then provides all the received and processed data as input to the CoBAM (block 4022). This information is structured into a comprehensive input tensor or data structure that represents a complete snapshot of the current state of the world—including robot states, object locations, and environmental layout—and the overarching goal. This holistic, context-rich input can enable the CoBAM to perform its optimization with a full understanding of the operational landscape.

Based on the comprehensive data received, CoBAM can determine the overall task or sub-tasks to be performed and which robots are available to contribute (block 4024). This involves a hierarchical task decomposition. For example, a high-level command like "prepare the assembly station" would be broken down into specific, actionable sub-tasks such as "Robot A: retrieve part #7 from storage," "Robot B: clear the workspace of packaging materials," and "Robot A: place part #7 into the jig." This decomposition considers not only the actions but also logical dependencies, such as the workspace being cleared before the part can be placed. The system concurrently identifies which robots are sufficiently charged, located nearby, and equipped with the end-effectors to perform these sub-tasks.

The CoBAM processes this complex set of inputs to generate a globally optimized action plan. It intelligently explores a vast solution space of possible sub-task assignments and orderings, calculating a "cost" for each potential plan using a sophisticated cost function. This cost function may weigh factors like total projected energy consumption, estimated completion time (makespan), path distances, and the potential for bottlenecks or inter-robot collisions. The function can also incorporate more nuanced variables such as robot-specific capabilities (e.g., payload capacity), predicted wear and tear on components, and adherence to priority levels for different tasks. The primary goal is to find the sequence of actions and assignments that accomplishes the overall task with the minimum possible global cost.

Finally, the system receives and returns the lowest-cost sub-tasks and/or lowest-cost sub-task assignment(s) from the CoBAM (block 4026). This output is not merely a suggestion but a concrete, executable, and synchronized plan for the fleet. For example, consider a task to assemble a product using two components (A and B) that must be fetched from different locations and placed into an assembly jig, with two robots available (Robot 1 and Robot 2). Robot 1 is closer to component A, but Robot 2 has a specialized gripper better suited for component B. The CoBAM, after evaluating multiple scenarios, might output the following lowest-cost plan. For robot 2, the assignment may include immediately traveling to and retrieving component B, as its specialized gripper minimizes handling time and risk of dropping the part; while robot 1's assignment may include waiting for 3 seconds to clear a shared narrow passage, then traveling to and retrieving component A. This coordinated plan is deemed lowest-cost because, while it introduces a brief, intentional delay for Robot 1, it prevents a potential collision or deadlock in the narrow passage and leverages Robot 2's specialization, resulting in a faster and safer overall completion time compared to a simple "closest robot gets the part" greedy algorithm. These specific controls and assignments are then transmitted to the respective robots for synchronized execution.

d. Example of Robot Scheduling/Collaboration

An example of a trained CoBAM's scheduling capabilities can be illustrated in a home environment. In a scenario where only one robot maid is available and receives the general command "do the housekeeping," the CoBAM first decomposes this high-level task into constituent sub-tasks: laundry sorting, laundry loading, dish loading, and vacuuming. The model then accesses user preferences or historical data, which indicates that laundry is the highest priority. To generate a cost-optimized plan, where the cost is defined as total time to completion, the CoBAM schedules the tasks to minimize travel and idle time. It determines the most time-efficient sequence is to first perform all tasks located in the same area. Consequently, it schedules the robot to sort the laundry, load the washing machine, and then load the dishwasher, as these are typically in close proximity. Only after completing these tasks does the robot proceed to vacuum the other rooms, thus creating an optimized workflow based on both user priority and time efficiency.

In a more complex scenario, consider two robots, Robot A and Robot B, receiving the same "housekeeping" instruction. The CoBAM again decomposes the task into sub-tasks like laundry, vacuuming, and dishwashing. Based on user preference data indicating that "kids' laundry" is the highest priority, the model devises a parallel execution plan to minimize overall completion time. The CoBAM assigns the highest-priority sub-task to one robot, creating a primary branch of operations. Thus, Robot A is assigned to first sort the children's laundry and then load the washing machine.

Simultaneously, to optimize for time, the CoBAM assigns a parallel sub-task to the second robot. Robot B is instructed to begin vacuuming the rooms at the same time Robot A is handling the laundry. The CoBAM's plan further includes contingent actions. After Robot A has loaded the laundry, its next assigned task is to load the dishes. If Robot B completes its vacuuming task while Robot A is still occupied, Robot B can either assist Robot A or begin another vacuuming zone. This dynamic assignment ensures both robots are continuously productive. Finally, the plan includes follow-up actions; once the washing machine and dishwasher cycles are complete, the CoBAM can assign whichever robot is closer and available to unload the appliances, further demonstrating its ability to dynamically schedule and assign tasks for optimal, cost-effective collaboration.

Figure 22A:
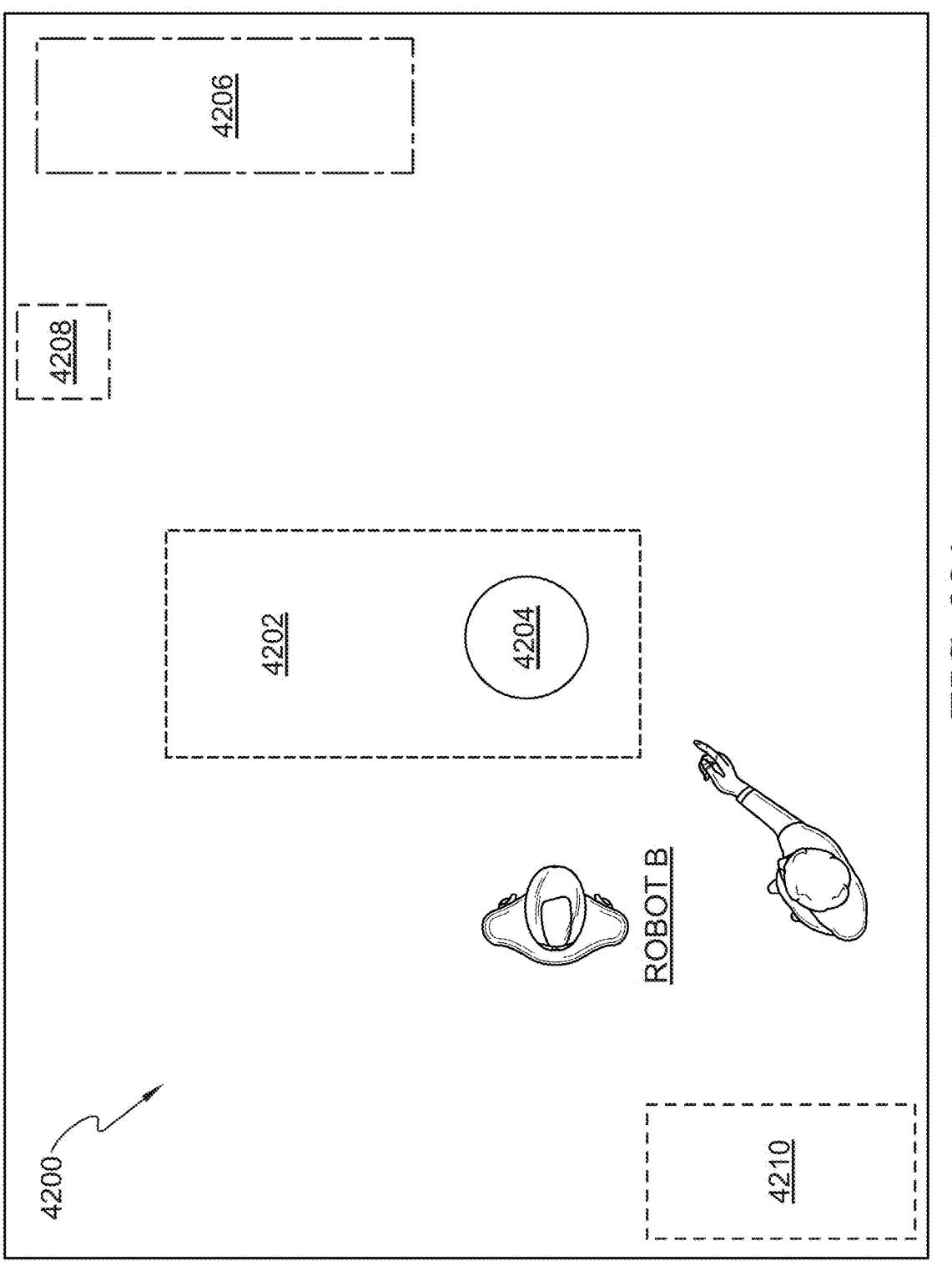
FIGS. 22A-22E provide an illustrative example of determining robot controls, using the CoBAM to complete a high-level task.
Figure 22B:
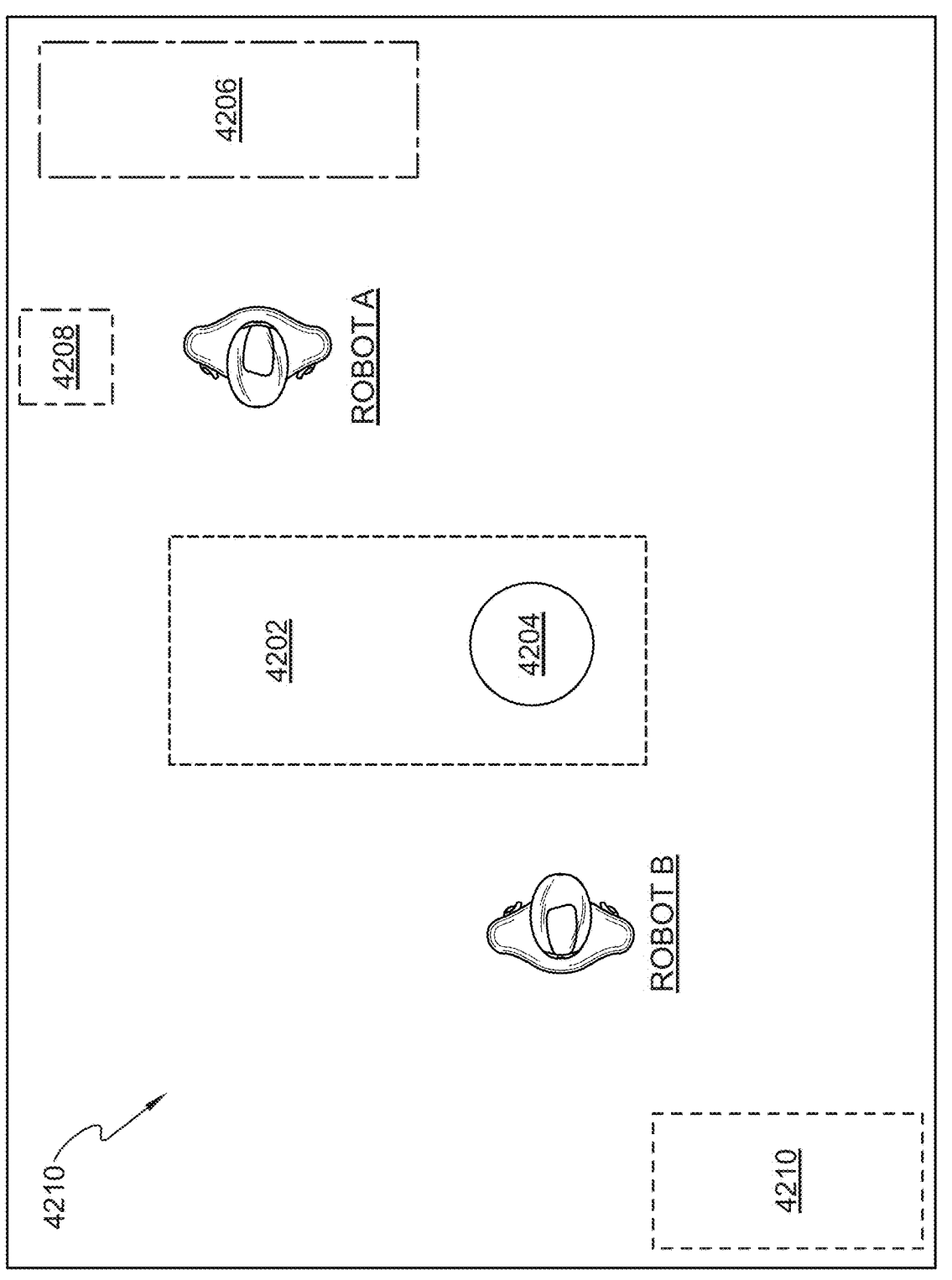

FIGS. 22A-22E provide another illustrative example (4200) of the internal workings of the CoBAM to complete a high-level task. A foundational step for any robot operating in a new environment is data collection and mapping. FIG. 22A illustrates this initiation phase, where a user actively teaches a robot the layout of a space before it can perform any autonomous tasks. In this depiction, a user guides a robot, e.g., Robot B, through a room, systematically pointing out and identifying key furniture, objects, and appliances. This includes identifying the table (4202), the dishes (4204) upon it, the storage shelf (4206), the pile of laundry (4208), and the washing machine (4210). As the user provides this information, the robot utilizes its onboard sensors (e.g., cameras, depth sensors) to build a detailed three-dimensional spatial map integrated with semantic labels for each identified item. This process can create a rich, annotated world model that captures not just the geometry of the room but also the function and location of its contents. This foundational data is then stored and can be seamlessly shared across a network with other robots, e.g., Robot A, establishing a common operational picture and enabling effective, context-aware collaboration.

Referring to FIGS. 22B-22E, the example scene is established for a collaborative task within the now-mapped environment. In this home setting, Robot A and Robot B are located in the room containing the table (4202) with dishes (4204), the laundry (4208), the shelf (4206), and the washing machine (4210). Robot A is positioned on the right side of the table (4202) and Robot B is on the left. The robots are assigned the high-level task of "clean up the room," which a central system, utilizing the CoBAM, decomposes into two primary sub-tasks: putting away the dishes (4204) on the shelf (4206) and putting the laundry (4208) in the washing machine (4210).

The high-level tasks and their optimal assignment to one or more robots can be determined by a central system executing the CoBAM, for example, running on a remote AI system 2780 or a local computing architecture 1100 of a robot. The CoBAM analyzes the current state of the environment, including the positions of robots and objects, to determine the most efficient way to accomplish the overall goal. This may involve taking input of robot data 4004 as well as other data about the set of available robots 4012 (as shown in FIG. 21), in this case, Robot A and Robot B, and returning sub-tasks and/or sub-task assignment(s) with the lowest cost.

As described previously, the CoBAM may determine a cost function associated with each of these potential action plans. For the purpose of this illustrative example, determining the cost function may involve assigning a point value to each discrete action a robot can perform and then summating these values. The set of actions with the lowest total cost is selected. The system then generates the appropriate low-level controls for Robot A and Robot B to carry out the selected, cost-optimized plan.

In this illustrative example, the system assigns simplified point values to each sub-action. For instance, 1 point is assigned for every foot of distance traveled by a robot, and 1 point is assigned for each primary hand movement (e.g., picking up or putting down an object). In a real-world application, these point values would be more complex, potentially weighted by factors like energy consumption, time, joint wear, or the difficulty of the manipulation. The CoBAM uses this cost framework to evaluate different strategies for task execution.

Figure 22C:
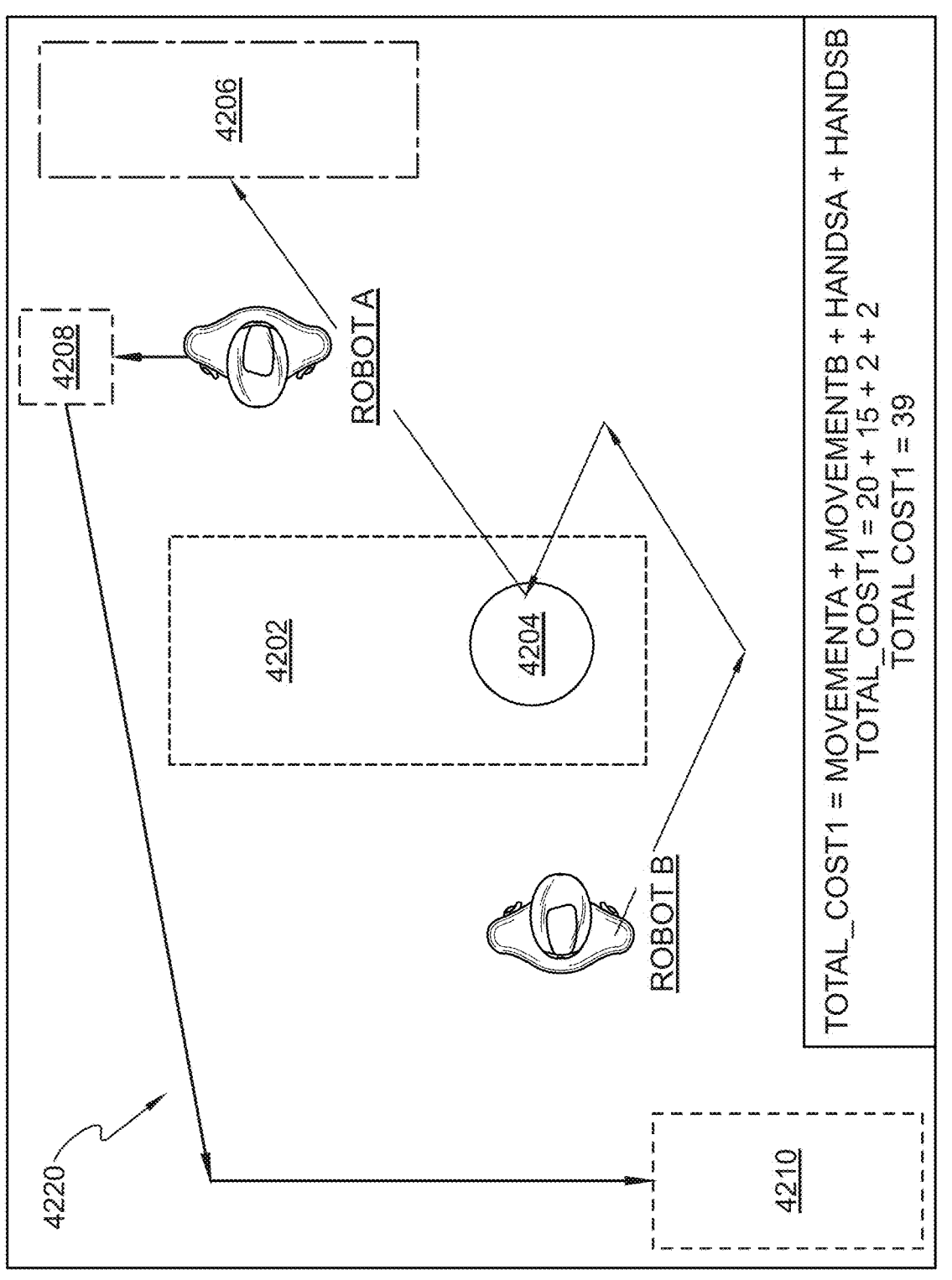

A first possible set of actions (4220), shown in FIG. 22C, involves a non-collaborative approach where each robot handles the task on the opposite side of the room. This plan includes: (i) Robot A moving to the laundry (4208), picking it up, walking around the table (4202) to the washing machine (4210), and placing the laundry inside; and (ii) Robot B moving around the table (4202), picking up the dishes (4204), bringing them to the shelf (4206), and placing them on it. To perform (i), Robot A walks 20 feet (20 points) and performs 2 hand movements (2 points). To perform (ii), Robot B walks 15 feet (15 points) and performs 2 hand movements (2 points). The total cost for this first plan (4220) is the sum of all points, which equals 39.

Figure 22D:
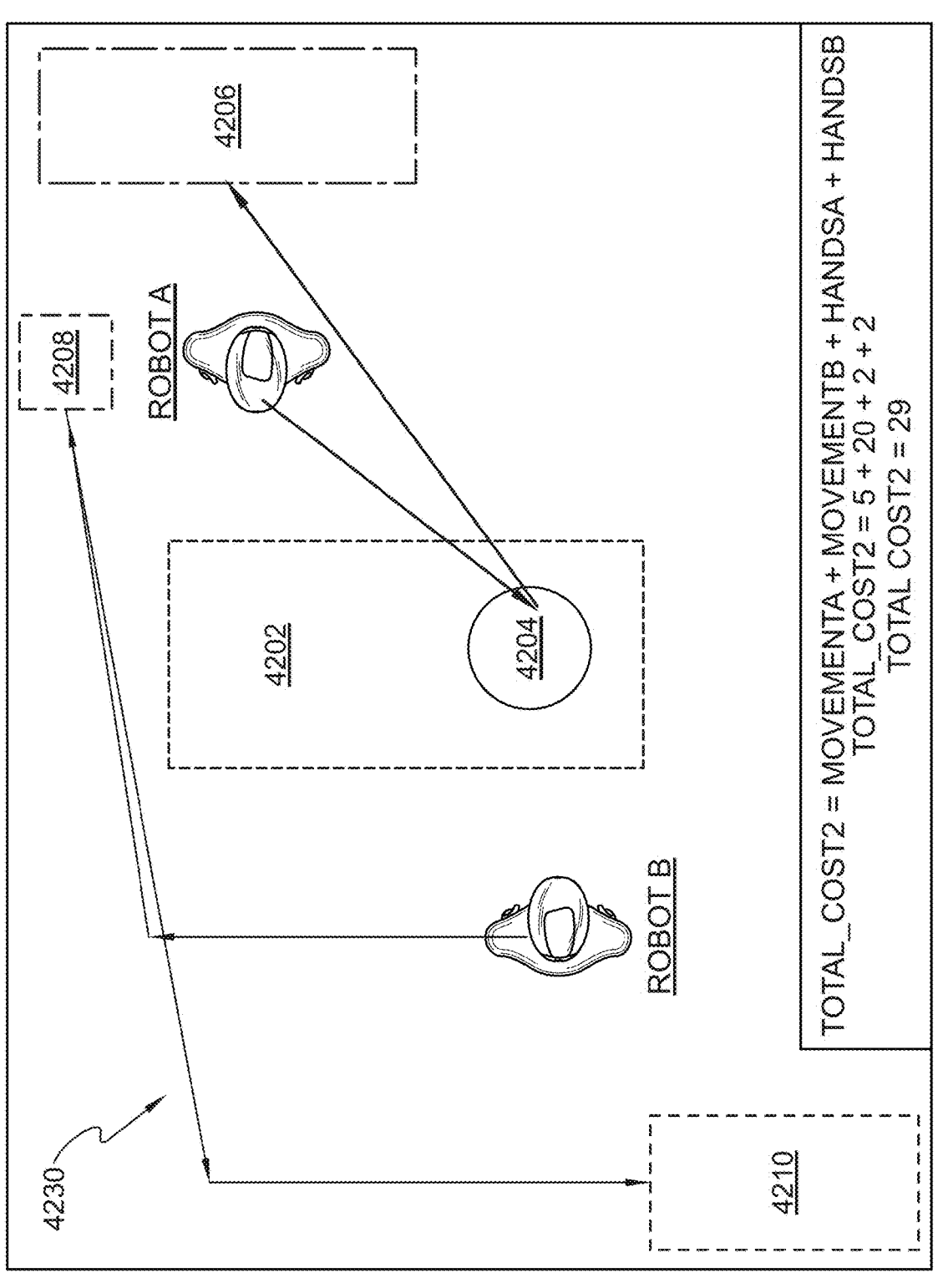

A second possible set of actions (4230), depicted in FIG. 22D, involves each robot handling the task physically closest to its starting position. This plan includes: (i) Robot A moving to the table (4202), picking up the dishes (4204), walking them to the shelf (4206), and placing them on it; and (ii) Robot B walking around the table (4202) to the laundry (4208), picking it up, and carrying it to the washing machine (4210). To perform (i), Robot A walks 5 feet (5 points) and performs 2 hand movements (2 points). To perform (ii), Robot B walks 20 feet (20 points) and performs 2 hand movements (2 points). The total cost for this second plan (4230) is 29 points.

Figure 22E:
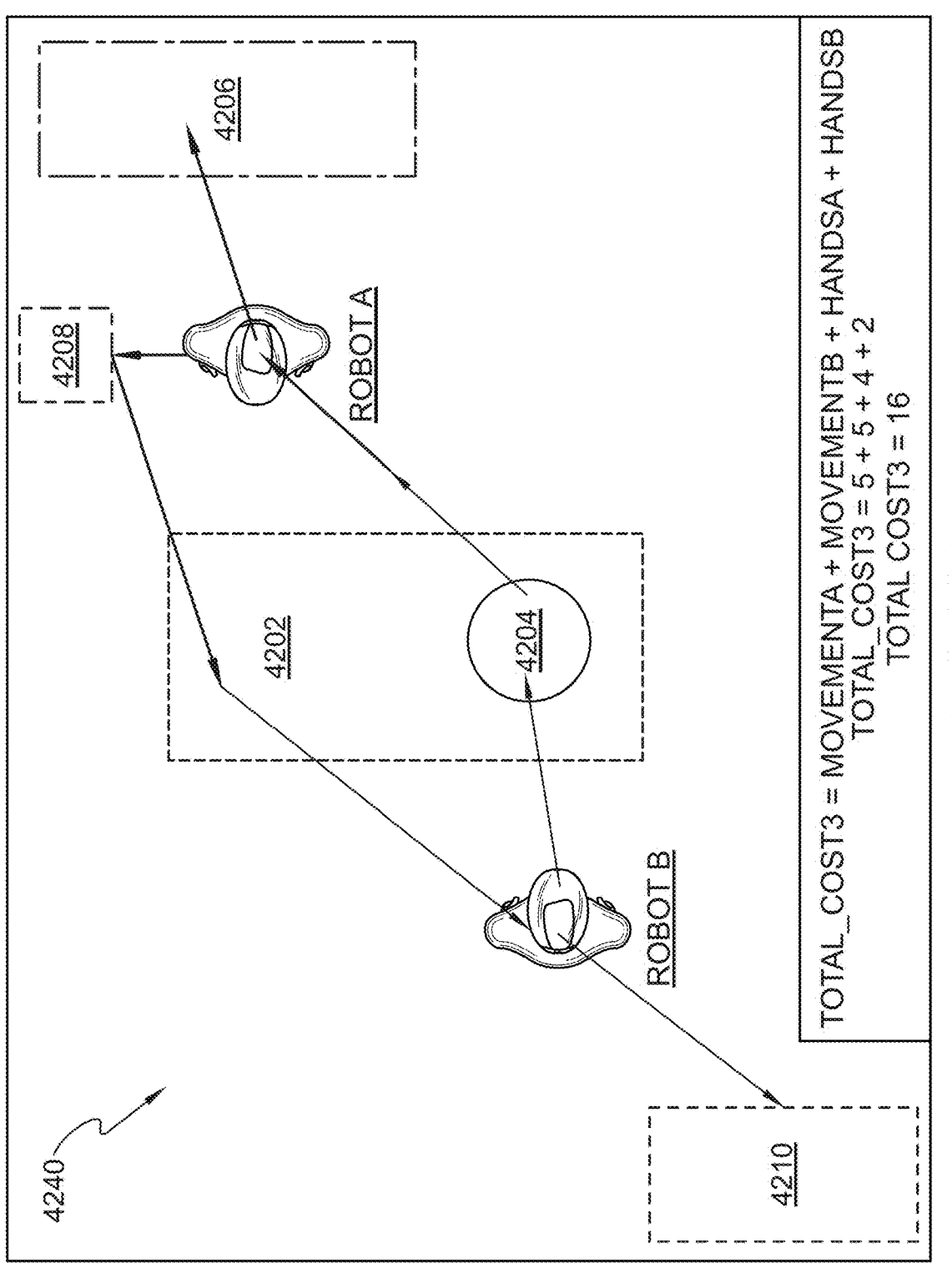

A third possible set of actions (4240), illustrated in FIG. 22E, demonstrates a more sophisticated, collaborative approach involving a hand-off to minimize total effort. This plan includes: (i) Robot A moving to the laundry (4208), picking it up, and placing it on the table (4202); (ii) Robot B then moving to the table (4202), picking up the laundry from the table, and taking it to the washing machine (4210); and (iii) Robot A subsequently picking up the dishes (4204) from the table (4202) and placing them on the shelf (4206). To perform (i) and (iii), Robot A walks a total of 5 feet (5 points) and performs 4 hand movements (4 points). To perform (ii), Robot B walks a total of 5 feet (5 points) and performs 2 hand movements (2 points). The total cost for this third, collaborative plan (4240) is only 16 points.

In a more complex scenario, the CoBAM could apply dynamic weights to any of the point values. For example, if time is a factor, a weight could be applied to the first action set (4220) that increases its cost due to the longer paths and potential for interference between the robots. Such weights can be adjusted based on historical performance, current conditions, or strategic priorities, guiding the optimization towards solutions that are not just low-cost in one metric but are holistically optimal.

The system may perform a comparison of the total cost function values and select the plan with the lowest score. In this example, the system determines that the third possible set of actions (4240) has the lowest total cost (16 points) and is therefore the most efficient solution. The analysis also reveals that the second plan (4230) is preferable to the first (4220), but neither is as optimal as the collaborative hand-off strategy. This selected optimal plan can also be used as feedback to iteratively train and improve the CoBAM, allowing it to generate more efficient solutions over time.

Once the system identifies the third action plan (4240) as the lowest-cost solution, it proceeds to determine the specific robot controls to execute it. The CoBAM translates this high-level strategic plan into a sequence of precise movements and actions for each robot, which are then transmitted to the one or more robots for synchronized execution.

i. Assignment by Remote Server

Figure 23:
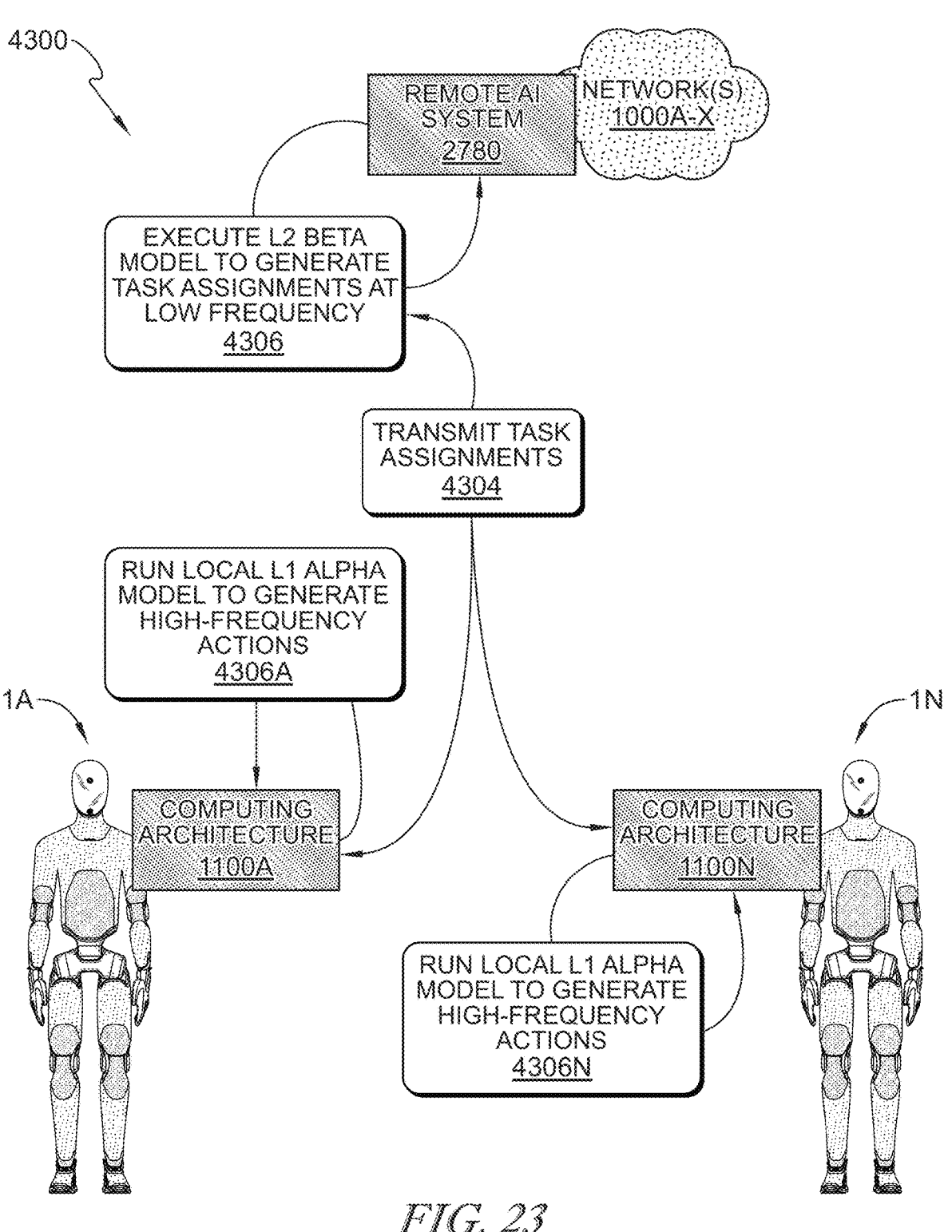
FIG. 23 is a conceptual diagram of a system for generating general robot controls in a remote system and locally generating specific robot controls onboard robots.

FIG. 23 is a conceptual diagram of a system 4300 for generating task assignments in a remote environment and locally generating specific robot actions onboard the humanoid robots 1A-1N. In the system 4300, a Remote AI System 2780 can be in communication (e.g., wireless, wired) with the robots' 1A-1N respective Computing Architectures 1100A-1N via one or more networks 1000A-X.

The system employs a hierarchical Cost-optimized Bipedal Action Model (CoBAM). The Remote AI System 2780 executes the higher-level component, an L2 Beta Model, to generate task assignments at a low frequency (block 4306). This L2 Beta Model is responsible for strategic, computationally intensive planning. It receives a high-level command and decomposes it into a series of optimized sub-tasks and assignments for the available robots, with the goal of finding the plan with the lowest overall cost (e.g., lowest time, energy, or resource expenditure). For example, given the high-level home chore command "clean the kitchen," the L2 Beta Model would analyze the positions and capabilities of Robot 1A and Robot 1N and output a lowest-cost plan, such as: "Assignment 1: Robot 1A, located near the sink, is to load the dishwasher. Assignment 2: Robot 1N, located by the counter, is to wipe down all surfaces." This strategic assignment is determined at a low frequency (e.g., 0.1 to 10 Hz) as it involves a global understanding of the task and environment.

The Remote AI System 2780 can then transmit the determined task assignments to the respective Computing Architectures 1100A-1N of the robots (block 4304).

Accordingly, each of the Computing Architectures 1100A-1N can locally execute its onboard L1 Alpha Model, a component of the CoBAM, to generate high-frequency actions for its respective robot (blocks 4306A, 4306N). The L1 Alpha model receives its specific, low-frequency task assignment (e.g., "load the dishwasher") and is responsible for the tactical execution, generating the precise, high-frequency motor commands and body motions to complete that task in real-time. An example of generated high-frequency actions can include joint outputs and positions at 1 Hz to 200 Hz. A whole body controller at the respective robots 1A-1N can also produce joint outputs and positions at approximately 100 Hz to 5 KHz.

The disclosed system 4300 can reduce network latency and improve real-time responsiveness. By generating high-level task assignments at a low frequency on the Remote AI System 2780, and then executing detailed, high-frequency actions locally, the system 4300 minimizes the need for constant communication with the remote system. This reduces latency that can occur with remote decision-making, ensuring faster, real-time responses by running time-sensitive tasks locally on the robots 1A-1N. The robots can also execute low-level controls, such as fine-tuning movements or adjusting speed, at much higher frequencies locally, which is beneficial for tasks involving fast feedback and quick decision-making, such as obstacle avoidance or fast manipulations.

The system 4300 can also reduce bandwidth usage. Sending high-frequency control commands from each robot to the Remote AI System 2780 can overwhelm network resources. Instead, by sending only high-level, infrequent task assignments from the remote system and relying on the local Computing Architectures 1100A-1N to handle detailed action generation, bandwidth usage is minimized. Only essential, lower-frequency data is transmitted, such as strategic decisions and global task goals.

The system 4300 allows for increased scalability. In a multi-robot system, it is computationally expensive to have the Remote AI System 2780 compute high-frequency actions for each of the robots 1A-1N. Offloading the responsibility for generating high-frequency actions to the edge (e.g., on the robots themselves) allows the Remote AI System 2780 to scale efficiently, supporting more robots without overloading its infrastructure. The remote system can focus on higher-level learning and coordination while each robot independently runs its own L1 Alpha model to execute specific tasks.

Additionally, the system 4300 provides for efficient processing and offloading of complex computations. This hierarchical structure means the robots 1A-1N are not under an obligation to maintain constant, high-bandwidth communication with the Remote AI System 2780. This reduces the energy and computational load on the robots' Computing Architectures 1100A-1N and the networks 1000A-X, improving battery life. Since constant communication is not used for tactical execution, the robots can continue to function with a degree of autonomy, even if the connection to the remote system is temporarily lost or weakened.

The system 4300 can also provide for efficient and accurate learning and optimization. The Remote AI System 2780 can periodically update its L2 Beta Model based on data collected from the fleet of robots, allowing for efficient model training and optimization. The robots 1A-1N can then execute tasks based on these updated strategies locally with minimal overhead, ensuring they continue to improve over time. In multi-robot implementations, the robots can execute locally while sharing insights or experiences back to the Remote AI System 2780, allowing the central L2 Beta Model to learn in parallel and be refined without affecting local operations.

ii. Master Robot Assignment

Figure 24:
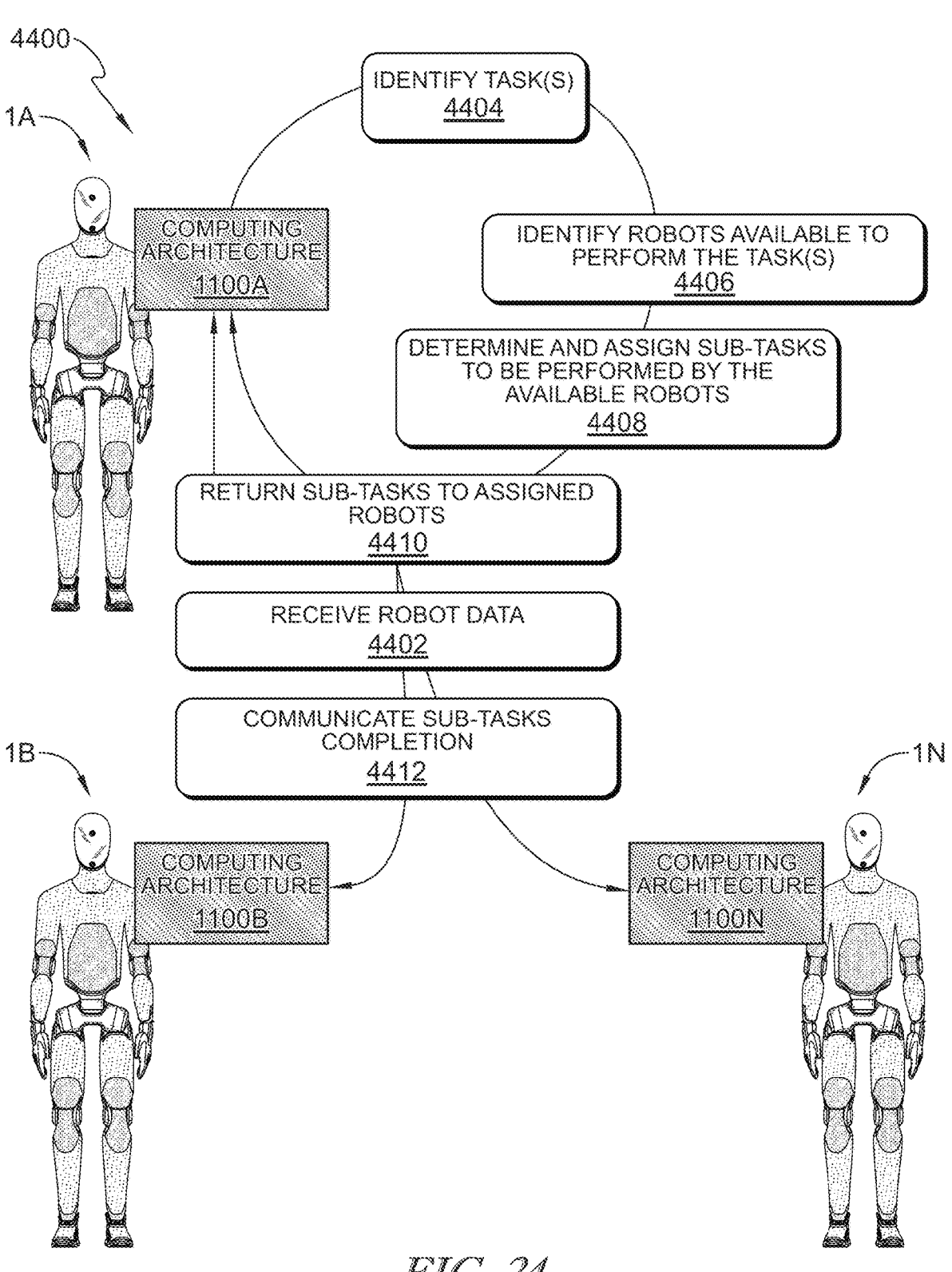
FIG. 24 is a conceptual diagram of a system having a master robot that communicates with multiple humanoid robots to determine and execute a task.

FIG. 24 is a conceptual diagram of a system 4400 where task determination and assignment are managed by a designated master robot 1A within a group of humanoid robots 1A-1N. This decentralized, on-the-edge approach leverages the compute resources of the robots themselves to provide real-time task division and execution, minimizing latency and optimizing performance within the operating environment.

In this system, any robot in the network can be designated as the master. The selection of the master robot can be dynamic, determined through an election process where robots broadcast their current status, including available computational power, battery level, and proximity to the task area. The robot best suited to manage the computational load of planning and coordination is then elected as the master. For instance, in the system 4400, Robot 1A is designated as the master and is responsible for running the primary decision-making model.

The master robot 1A runs a hierarchical Cost-optimized Bipedal Action Model (CoBAM) locally on its Computing Architecture 1100A. The higher-level component, an L2 Beta Model, is responsible for strategic planning. The process begins when the master robot 1A receives robot data (block 4402), which could be a verbal command from a user, sensor data, or a scheduled task. Based on this data, the master robot 1A identifies the high-level task(s) to be performed (block 4404). For a home chores example, the task might be "tidy up the living room."

Next, the master robot 1A identifies the robots available to perform the task (block 4406). It polls the network to determine which robots (e.g., 1A, 1B, 1N) are operational, not currently engaged in higher-priority tasks, and within a feasible range to assist.

Using its L2 Beta model, the master robot 1A then determines and assigns sub-tasks to the available robots to accomplish the overall goal with the lowest cost (block 4408). For the "tidy up the living room" task, the L2 Beta model would decompose it into sub-tasks like "collect toys from the floor," "stack books on the shelf," and "wipe the coffee table." The model calculates the optimal assignment by evaluating factors such as each robot's current location, capabilities, and the energy to complete each sub-task. It might assign the toy collection to Robot 1B, which is closest to the toy basket, and the book stacking to Robot 1N, while assigning itself (Robot 1A) the task of wiping the table.

Once the optimal plan is determined, the master robot 1A returns the specific sub-task assignments to the designated robots, including itself (block 4410). Each robot, including the master, then uses its onboard L1 Alpha model (the lower-level component of the CoBAM) to generate the high-frequency actions and movements to execute its assigned sub-task.

Throughout the execution, the robots 1A-1N can communicate sub-task completion and status updates to each other and to the master robot (block 4412). This inter-robot communication allows for dynamic replanning if an obstacle is encountered or if a sub-task is completed ahead of schedule, ensuring the collaborative effort remains efficient and synchronized.

iii. Consensus-Based Task Assignment

Figure 25A:
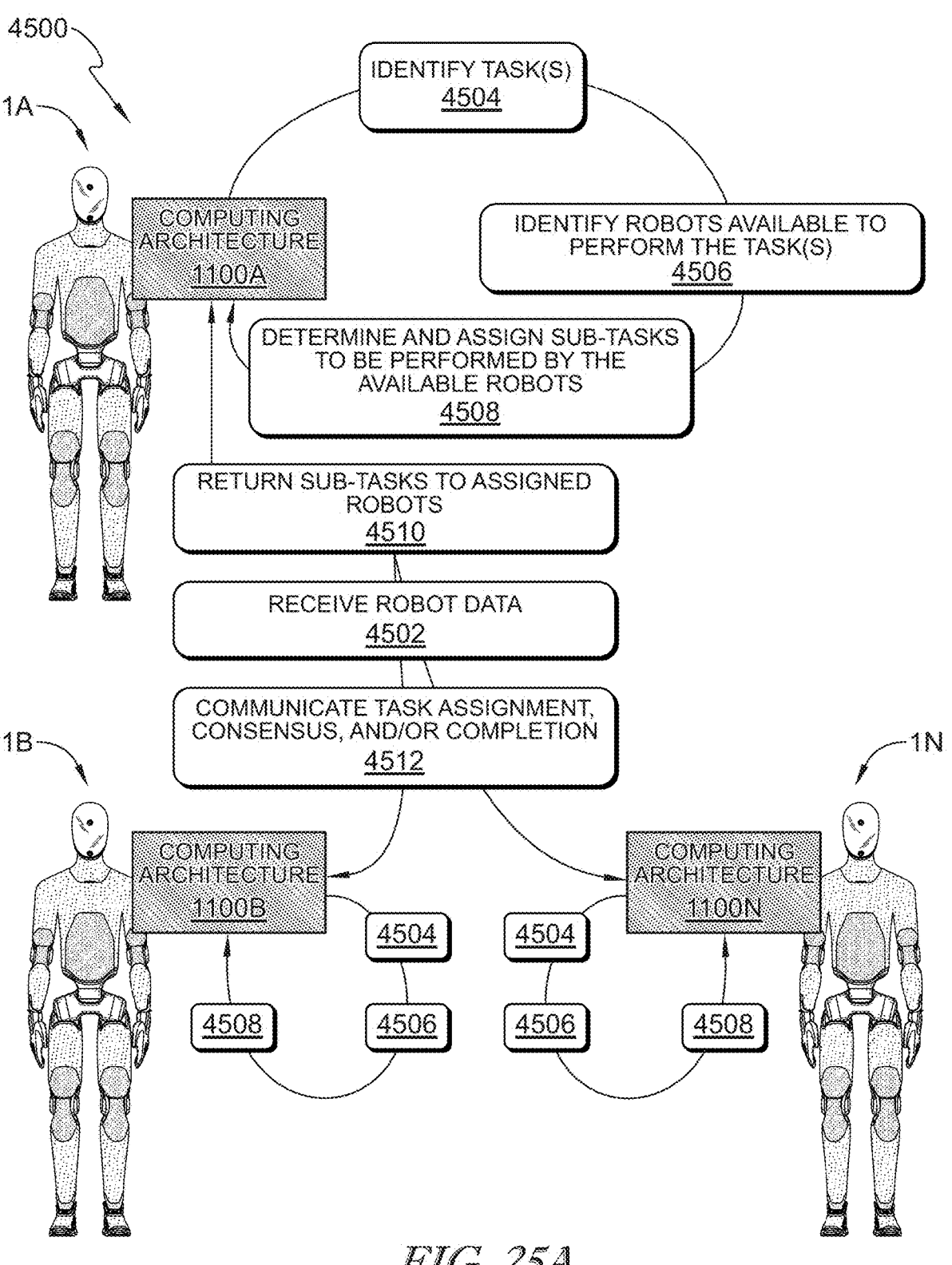
FIG. 25A is a conceptual diagram of a system having multiple humanoid robots in communication with each other that each determine and assign sub-tasks to complete a task.
Figure 25B:
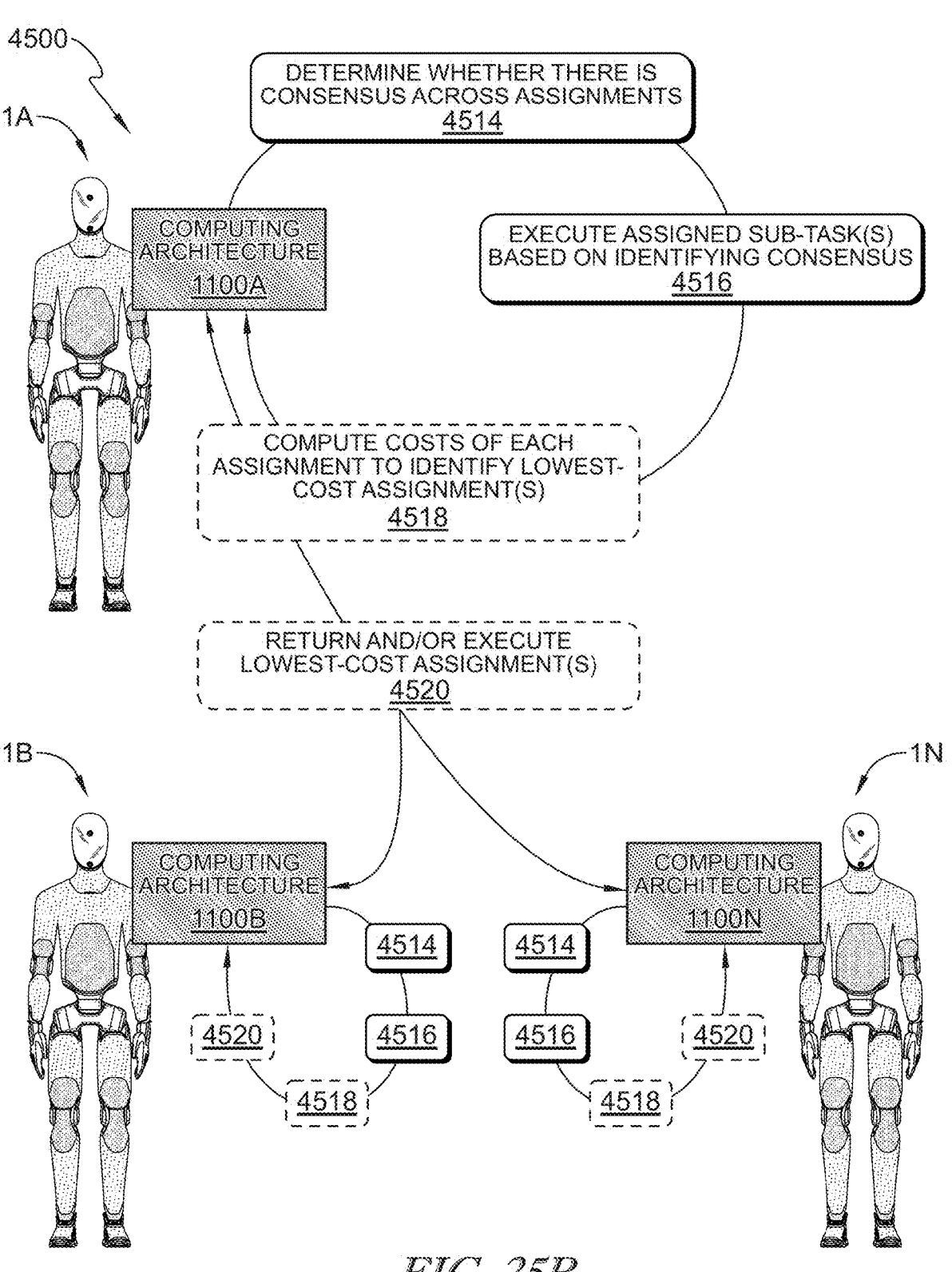
FIG. 25B is a conceptual diagram of the system of FIG. 25A in which the multiple humanoid robots communicate with each other to determine a consensus for sub-task assignment and execution.

FIGS. 25A and 25B are conceptual diagrams of a system 4500 where multiple humanoid robots 1A-1N communicate to reach a consensus on task assignments. In this decentralized architecture, each robot runs its own instance of the CoBAM on its local computing architecture 1100A-N. This approach allows the robots to operate autonomously and adapt their collaborative strategy on the fly, reducing computational overhead and minimizing reliance on a central server. The robots 1A-1N can communicate over secure, encrypted network channels, enhancing the security and robustness of the multi-robot system.

In the system 4500 shown in FIG. 25A, each of the robots 1A-1N can individually perform one or more of blocks 4502-4512. In block 4502, each of the robots 1A-N can receive data. The data can be received from one or more of the other robots 1A-N, a cloud-based system, or another computing device. In block 4504, each of the robots 1A-N can identify one or more tasks based on the received data. In block 4506, each of the robots 1A-N can identify the robots available to perform the task(s). The available robots can be identified based on the received data. The robots 1A-N can also communicate with each other to determine which robots are available and which are not. In block 4508, each of the robots 1A-N can determine and assign sub-tasks to be performed by the available robots. As described herein, each robot 1A-N can execute its own CoBAM to determine the sub-tasks and how they should be assigned. In block 4510, each of the robots 1A-N can return the sub-tasks to the assigned robots. In block 4512, each of the robots 1A-N can communicate its determined task assignment with each of the other robots 1A-N.

For example, a user may issue a high-level command like "clean the kitchen." Each robot's CoBAM would independently decompose this into sub-tasks such as loading the dishwasher, wiping counters, and taking out the trash. Based on the current locations and statuses of all available robots, each robot would generate what it calculates to be the most efficient assignment plan. Robot 1A might propose that it loads the dishwasher while Robot 1B wipes the counters, and Robot 1N takes out the trash. It then communicates this comprehensive plan to the other robots to begin the consensus process.

FIG. 25B illustrates the consensus-reaching phase of the system 4500. In block 4514, each of the robots 1A-N can determine whether there is consensus across the assignments made by the other robots 1A-N. The robots 1A-N can use one or more consensus protocols to establish agreement. If consensus is reached, the robots 1A-N can execute the assigned sub-task(s) in block 4516. For example, a consensus can be reached if at least a majority of the robots 1A-N make the same assignments.

If there is no immediate consensus, the system can employ more sophisticated mechanisms to resolve disagreements. For example, the robots may enter a bidding or auction process, where each robot calculates the cost (e.g., in terms of time or energy) for it to perform each sub-task and bids for the ones it can complete most efficiently. The lowest bid for each sub-task wins the assignment. Alternatively, a designated arbitrator robot could be selected to evaluate the conflicting plans and choose the one with the lowest overall cost for the system. In another approach, the robots can compute the costs of each proposed assignment to identify the lowest-cost option in block 4518.

Once the lowest-cost assignment is identified through one of these mechanisms, the robots 1A-N can return and/or execute the lowest-cost assignment(s) in block 4520. For example, if both Robot 1A and Robot 1B propose to load the dishwasher, they can each calculate their respective costs for that sub-task. If Robot 1A is closer to the dishwasher and has a higher battery level, its CoBAM would calculate a lower cost, and it would win the assignment in the final agreed-upon plan. This decentralized, consensus-based approach allows the robot team to dynamically and efficiently coordinate their actions to complete complex tasks.

Sometimes, once consensus is reached or the robots 1A-N move forward with executing particular assignments, the robots 1A-N can further train on the executed assignments. In other words, the robots 1A-N can learn which types of assignments are preferred to achieve the lowest costs possible for the overall system 4500. Such an iterative learning and feedback loop can improve the ability of the robots 1A-N to efficiently identify optimal or preferred sub-task identifications and assignments. As a result, the robots 1A-N can reach consensus quicker, thereby reducing the need to spend more compute resources and processing power to re-compute costs and/or adjust the assignments in real-time.

F. Alternative Embodiments

In some embodiments, the visuomotor subsystems may utilize alternative sensor and processing hardware. The perception system 1420 may comprise event-based or neuromorphic vision sensors that asynchronously report pixel-level brightness changes, which can be processed with lower latency and reduced data bandwidth. Further, the bipedal action model (BAM) may be executed on neuromorphic processing units (NPUs), which are optimized for sparse, asynchronous data, or Field-Programmable Gate Arrays (FPGAs) to create a custom, deterministic hardware pipeline for lower-latency inference. Additionally, the robot's 1 reliance on visual data may be supplemented or replaced by non-visual ranging sensors, such as LiDAR, sonar, or radar systems, to provide direct geometric information that is robust to challenging environmental conditions like poor lighting or occlusions from smoke.

The architecture defining the interaction between cognitive and reactive subsystems may also be modified. An alternative embodiment may feature a bi-directional communication link, allowing the L2 beta model 3402B to transmit a feedback signal (e.g., indicating high prediction error) to the L1 alpha model 3402A, thereby enabling event-driven replanning. The information channel between the L1 alpha model 3402A and the L2 beta model 3402B may be varied; for instance, instead of a single latent vector, a structured vector with disentangled components for task goal, waypoints, and motion style could be used. In another alternative, the L1 alpha model 3402A could output a sub-goal as a natural language text string (e.g., "grasp the red box") to be used as a direct conditioning prompt for the L2 beta model 3402B, or a declarative set of constraints to be solved by a downstream motion planner acting as the L2 beta model 3402B.

The hierarchical structure may be varied. For example, a "Council of Experts" architecture may employ multiple specialized models (e.g., for locomotion, manipulation, balancing) that operate in parallel, with a gating network to weigh and fuse their outputs. Another embodiment may extend the hierarchy to an alpha-beta-gamma structure, where a third-level gamma model handles high-frequency, reflexive actions.

The methods for training and deploying the BAM may be altered. An alternative embodiment may employ evolutionary algorithms or genetic programming for gradient-free optimization of the BAM. Another variation concerns runtime execution, where an event-driven cognitive process allows the L1 alpha model 3402A to remain dormant until triggered by a specific event, thereby conserving computational resources. For a fleet of robots, the retraining process may be implemented using federated learning, where anonymized model updates are computed locally on each robot and aggregated on a central server to improve a global BAM, enhancing data privacy and reducing network bandwidth.

Further embodiments may integrate the BAM with other technologies. A deployed BAM may be integrated with a real-time digital twin of the robot and its environment, allowing the BAM to simulate and validate candidate action chunks before physical execution. In another configuration, the BAM may be architected to use a predictive world model, simultaneously outputting a motor action and a prediction of the next sensory state, using the prediction error as a high-speed feedback mechanism for real-time correction. Safety may be enhanced by a hardware-based "reflex chip," a hard-real-time coprocessor programmed with a fixed set of high-priority safety reflexes that operate independently of the main BAM stack.

The training paradigm may also be varied. Generative Adversarial Imitation Learning (GAIL) can be used, wherein the BAM (a generator) learns to produce trajectories that are indistinguishable from expert demonstrations to a discriminator network. Alternatively, the BAM can be trained using adversarial self-play in simulation against a "saboteur" agent to develop policies that are more robust to unforeseen disturbances. Meta-learning frameworks, such as Model-Agnostic Meta-Learning (MAML), may be used to train the BAM not for a single task, but to be efficient at learning new skills from a very small number of demonstrations.

G. Industrial Application

The disclosed inventions are implemented as concrete, machine-focused systems that materially improve how humanoid robots sense, plan, and move in the physical world by solving specific technological problems in conventional controllers. In contrast to conventional systems, the disclosed cost-optimized bipedal action model (Co-BAM) provides direct, continuous whole-body control over a humanoid platform with up to sixty-two degrees of freedom, executing actuator-level commands that cannot be practically performed by a human mind and that yield measurable improvements in robotic capability and efficiency.

The system architecture is particular and machine-tethered. A high-level cognitive beta model operates at low frequency to decompose user tasks into sub-tasks and generate task-conditioning latent vectors using fused multi-sensor state (RGB/depth/event cameras, IMU, foot/hand force-torque sensors, joint encoders, tactile arrays, and microphones). A low-level reactive alpha model runs at real-time control rates (e.g., 100-10,000 Hz) on an onboard compute stack (CPU/GPU/NPU) under a real-time operating system with deterministic scheduling. The alpha model outputs continuous whole-body control signals—joint torques, velocities, and target positions—that a whole-body controller (WBC), model predictive controller (MPC), or an RL based controller can use to map into motor currents for a plurality of actuators through motor drivers with known latency budgets. This hierarchical split separates computationally intensive planning from high-frequency motor control so the robot maintains immediate responsiveness for safe, fluid interaction. The architecture also implements "action chunking," predicting short horizons of future motor commands to maintain temporal consistency across steps, reduce command jitter, and avoid the discontinuities inherent to binned pose systems.

The disclosed systems improve machine functionality in ways that are concrete and testable on hardware. Full-body coordination enables dynamic balance, postural adjustment, compliant manipulation, extended reach using torso and legs, footstep and base motion for obstacle negotiation, and simultaneous bi-manual tasks without violating joint, torque, and contact constraints. The control stack integrates impedance and force control at contact points to regulate interaction forces in Newtons, uses online estimation of ground friction and center-of-pressure to prevent slips, and enforces thermal and current limits per actuator in real time. Latency-aware buffering and phase-locked sensor/actuator timing (e.g., IMU at kilohertz rates aligned to motor servo cycles) ensure stable closed-loop behavior, while watchdogs, joint-space and Cartesian-space safety envelopes, and reflex fall-arrest behaviors provide fail-safe operation tied to physical thresholds.

Optimization is physically grounded and machine-internal. The runtime cost function minimizes concrete, measurable quantities such as energy consumption (derived from bus voltage/current telemetry), time to completion (from synchronized clocks), predicted mechanical wear (weighted by joint travel, torque, and temperature), distance traversed, and battery state-of-charge. The system continuously re-evaluates these costs from live telemetry and re-plans trajectories and contact schedules accordingly, yielding smoother paths, reduced drift over long horizons, lower energy per task, and extended component life. Because these costs originate from hardware sensors and constraints and drive actuator-level outputs, the optimization constitutes a technical process for improving machine efficiency, not an abstract data manipulation.

The training and deployment pipelines are likewise technical and hardware-constrained. The beta/alpha models are co-trained end-to-end on layered datasets that include synchronized teleoperation traces with ground-truth torque/position logs, physics-engine simulations calibrated to the robot's actual mass/inertia parameters, and perception datasets captured by the same sensor suite used at inference. Training labels include physically meaningful cost targets (e.g., energy/time/wear) and contact events, which align model outputs with controllable motor commands rather than abstract classifications. The deployed models are compiled and quantized for the onboard NPU/GPU with fixed-point or mixed-precision kernels validated against hardware-in-the-loop tests to satisfy cycle-time and jitter requirements. These constraints and validations are specific to the disclosed machines and ensure that inference directly produces safe, stable actuator signals under real-time deadlines.

For multi-robot scenarios, the system provides a concrete method for controlling a fleet of physical machines. A networked coordinator (or decentralized consensus) receives a high-level goal and decomposes it into sub-tasks based on each robot's live physical state (location from VIO/SLAM, remaining battery, payload capacity, end-effector/tooling availability, current thermal margins). The assignment algorithm outputs machine-addressable sub-tasks with start/goal poses and time windows, which each robot's local beta/ alpha stack converts into continuous actuator commands. Robots exchange state and hand off tasks when constraints change (e.g., low battery or blocked paths), and the same physically grounded cost metrics are used to converge to fleet-level low-cost plans while maintaining local safety and real-time control. This results in measurable gains such as reduced idle time, shorter inter-robot travel, and higher successful completion rates in unstructured environments.

Across these embodiments, the inventions are inseparably tied to specific hardware (sensors, actuators, motor drivers, power systems, and real-time compute), operate at real-time control rates with deterministic latencies, and output motor-level commands that physically move machines in closed loop with environment feedback. The disclosed improvements—continuous whole-body control, elimination of dis-cretization artifacts, long-horizon temporal consistency, physically grounded cost optimization, safe interaction through force/impedance regulation, and coordinated multi-robot execution—are concrete enhancements to the functioning of robotic control systems themselves and to the operation of humanoid robots as machines. These are fac-tual, technical characteristics of the claimed systems and methods that demonstrate they are directed to specific improvements in computer-implemented control of physical robots, rather than to generalized mental processes or abstract ideas.

While the present disclosure shows several illustrative embodiments of a robot (in particular, a humanoid robot), it should be understood that these embodiments are designed to be examples of the principles of the disclosed assemblies, methods, and systems. They are not intended to limit the broad aspects of the disclosed concepts solely to the specific embodiments that have been illustrated. As will be realized by one skilled in the art, the disclosed robot, and its associated functionality and methods of operation, are capable of other and different configurations. Furthermore, several of its details are capable of being modified in various respects, all without departing from the fundamental scope of the disclosed methods and systems. For example, one or more of the disclosed embodiments, either in part or in whole, may be combined with another disclosed assembly, method, and system to create hybrid implementations. As such, one or more steps from the diagrams or components in the Figures may be selectively omitted or combined in a manner that is consistent with the principles of the disclosed assemblies, methods, and systems. Additionally, the order of one or more steps from the arrangement of components may be omitted or performed in a different order than what is explicitly described. Accordingly, the drawings, diagrams, and the detailed description provided herein are to be regarded as illustrative in nature, and not as restrictive or limiting, of the said humanoid robot. It should be understood that the use of the word "or" when separating element names in connection with a single reference number indicates that the same structure can have two or more different names. For example, the phrase "end effector or hand assembly 56" indicates that the structure that is referenced by the number 56 can be referred to or claimed as either an "end effector" or a "hand assembly."

While the above-described methods and systems are primarily designed for use with a general-purpose humanoid robot, it should be understood that the disclosed assemblies, components, learning capabilities, or kinematic capabilities may be adapted for use with other types of robots. Examples of other such robots include, but are not limited to: an articulated robot (e.g., an arm having two, six, or ten degrees of freedom, etc.), a cartesian robot (e.g., rectilinear or gantry robots, robots having three prismatic joints, etc.), a Selective Compliance Assembly Robot Arm (SCARA) robot (e.g., a robot with a donut-shaped work envelope, with two parallel joints that provide compliance in one selected plane, with rotary shafts positioned vertically, with an end effector attached to an arm, etc.), a delta robot (e.g., a parallel link robot with parallel joint linkages connected with a common base, having direct control of each joint over the end effector, which may be used for pick-and-place or product transfer applications, etc.), a polar robot (e.g., a robot with a twisting joint connecting the arm with the base and a combination of two rotary joints and one linear joint con-necting the links, having a centrally pivoting shaft and an extendable rotating arm, a spherical robot, etc.), a cylindrical robot (e.g., a robot with at least one rotary joint at the base and at least one prismatic joint connecting the links, with a pivoting shaft and an extendable arm that moves vertically and by sliding, with a cylindrical configuration that offers vertical and horizontal linear movement along with rotary movement about the vertical axis, etc.), a wheeled robot with a torso and arms, a self-driving car, a kitchen appliance, construction equipment, or a variety of other types of robot systems. The robot system may include one or more sensors (e.g., cameras, temperature sensors, pressure sensors, force sensors, inductive or capacitive touch sensors), motors (e.g., servo motors and stepper motors), actuators, biasing mem-bers, encoders, a housing, or any other component that is known in the art and is used in connection with robot systems. Likewise, the robot system may omit one or more of the aforementioned sensors (e.g., cameras, temperature sensors, pressure sensors, force sensors, inductive or capaci-tive touch sensors), motors (e.g., servo motors and stepper motors), actuators, biasing members, encoders, a housing, or any other component that is known in the art to be used in connection with robot systems. In other embodiments, other configurations or components may be utilized.

As is well known in the data processing and communi-cations arts, a general-purpose computer typically comprises a central processor or other processing device, an internal communication bus, various types of memory or storage media (e.g., RAM, ROM, EEPROM, cache memory, disk drives, etc.) for code and data storage, and one or more network interface cards or ports for communication pur-poses. The software functionalities that are described herein involve programming, which includes executable code as well as associated stored data. This software code is execut-able by the general-purpose computer. In operation, the code is stored within the memory of the general-purpose com-puter platform. At other times, however, the software may be stored at other locations or transported for loading into the appropriate general-purpose computer system.

A server, for example, typically includes a data commu-nication interface for engaging in packet data communica-tion over a network. The server also includes a central processing unit (CPU), which may be in the form of one or more processors, for executing the program instructions. The server platform typically includes an internal commu-nication bus, program storage, and data storage for the various data files that are to be processed or communicated by the server, although the server often receives its pro-gramming and data via network communications. The hard-ware elements, operating systems, and programming lan-guages of such servers are conventional in nature, and it is presumed that those who are skilled in the art are adequately familiar therewith. The server functions may be implemented in a distributed fashion on a number of similar platforms to distribute the processing load.

Hence, aspects of the disclosed methods and systems that are outlined above may be embodied in the form of computer programming. Program aspects of the technology may be thought of as "products" or "articles of manufacture," which are typically in the form of executable code or associated data that is carried on or embodied in a type of machine-readable medium. "Storage" type media includes any or all of the tangible memory of the computers, processors, or the like, or any associated modules thereof. This may include various semiconductor memories, tape drives, disk drives, and the like, which may provide non-transitory storage at any time for the software programming. All or portions of the software may at times be communicated through the Internet or various other telecommunication networks. Thus, another type of media that may bear the software elements includes optical, electrical, and electromagnetic waves, such as those that are used across physical interfaces between local devices, through wired and optical landline networks, and over various air-links. The physical elements that carry such waves, such as wired or wireless links, optical links, or the like, also may be considered as media that bear the software. As used herein, unless specifically restricted to non-transitory, tangible "storage" media, terms such as computer or machine "readable medium" refer to any medium that participates in the process of providing instructions to a processor for execution.

A machine-readable medium may take many forms, including but not limited to, a tangible storage medium, a carrier wave medium, or a physical transmission medium. Non-volatile storage media include, for example, optical or magnetic disks, such as any of the storage devices in any computer or computers or the like, such as may be used to implement the disclosed methods and systems. Volatile storage media include dynamic memory, such as the main memory of such a computer platform. Tangible transmission media include components such as coaxial cables, copper wire, and fiber optics, including the wires that comprise a bus within a computer system. Carrier-wave transmission media can take the form of electric or electromagnetic signals, or acoustic or light waves, such as those that are generated during radio frequency (RF) and infrared (IR) data communications. Common forms of computer-readable media therefore include, for example: a floppy disk, a flexible disk, a hard disk, magnetic tape, any other magnetic medium, a CD-ROM, a DVD or DVD-ROM, any other optical medium, punch cards, paper tape, any other physical storage medium with patterns of holes, a RAM, a PROM and EPROM, a FLASH-EPROM, any other memory chip or cartridge, a carrier wave that is transporting data or instructions, cables or links that are transporting such a carrier wave, or any other medium from which a computer can read programming code or data. Many of these forms of computer-readable media may be involved in carrying one or more sequences of one or more instructions to a processor for execution.

It is to be understood that the invention is not limited to the exact details of construction, operation, exact materials, or specific embodiments shown and described herein, as obvious modifications and equivalents will be apparent to one who is skilled in the art. While the specific embodiments have been illustrated and described in detail, numerous modifications may come to mind without significantly departing from the spirit of the invention, and the scope of protection is only limited by the scope of the accompanying Claims. In the drawings, some structural or method features may be shown in specific arrangements or orderings. However, it should be appreciated that such specific arrangements or orderings may not be required. Rather, in some embodiments, such features may be arranged in a different manner or order than shown in the illustrative figures. Additionally, the inclusion of a structural or method feature in a particular figure is not meant to imply that such a feature is required in all embodiments and, in some embodiments, may not be included or may be combined with other features.

It should also be understood that the term "substantially" as utilized herein means a deviation of less than 15% and preferably less than 5%. It should also be understood that the term "near" means within 10 cm, the term "proximate" means within 5 cm, and the term "adjacent" means within 1 cm. It should also be understood that other configurations or arrangements of the above-described components are contemplated by this Application. Moreover, the description provided in the background section should not be assumed to be prior art merely because it is mentioned in or associated with the background section. The background section may include information that describes one or more aspects of the subject of the technology. Finally, the mere fact that something is described as conventional does not mean that the Applicant admits it is prior art.

The following applications are hereby incorporated by reference for any purpose: (i) PCT Application Nos. PCT/US25/10425, PCT/US25/11450, PCT/US25/12544, PCT/US25/16930, PCT/US25/19793, PCT/US25/23064, PCT/US25/23325, PCT/US25/24817, and PCT/US25/25005; (ii) U.S. patent application Ser. Nos. 18/919,263, 18/919,274, 18/922,334, 19/000,626, 19/006,191, 19/033,973, 19/038,657, 19/064,596, 19/066,122, 19/180,106, 19/223,945, 19/224,252, 19/249,517, 19/286,240, 19/319,712, 19/324,392, 19/323,751, 19/325,486, 19/325,415, 19/324,342, 19/329,008, 19/329,474, 19/329,485, 19/329,559, 19/337,845, 19/337,852, 19/337,899, 19/347,690, 19/321,022, 19/321,159, 19/347,994, and 19/351,294; and (iii) U.S. Design patents application Ser. Nos. 29/889,764, 29/928,748, 29/935,680, 29/954,572, 29/967,462, 29/993,115, 29/998,761, 30/024,341, 30/024,351, 30/024,102, 30/024,341, 30/026,493, 30/026,579, 30/026,737, 30/026,738, 30/026,746, 30/026,750, and 30/026,978, 30/026,981; (iv) U.S. Provisional Patent Application Nos. 63/556,102, 63/557,874, 63/558,373, 63/561,307, 63/561,311, 63/561,313, 63/561,315, 63/561,317, 63/561,318, 63/564,741, 63/565,077, 63/573,226, 63/573,528, 63/573,543, 63/574,349, 63/614,499, 63/615,766, 63/617,762, 63/620,633, 63/625,362, 63/625,370, 63/625,381, 63/625,384, 63/625,389, 63/625,405, 63/625,423, 63/625,431, 63/626,028, 63/626,030, 63/626,034, 63/626,035, 63/626,037, 63/626,039, 63/626,040, 63/626,105, 63/632,630, 63/632,683, 63/633,113, 63/633,405, 63/633,920, 63/633,931, 63/633,941, 63/634,042, 63/634,599, 63/634,697, 63/635,152, 63/677,087, 63/685,856, 63/690,334, 63/692,747, 63/692,765, 63/694,253, 63/694,304, 63/696,507, 63/696,533, 63/697,793, 63/697,816, 63/700,749, 63/702,185, 63/705,715, 63/706,768, 63/707,547, 63/707,897, 63/707,949, 63/708,003, 63/715,117, 63/715,270, 63/720,222, 63/722,057, 63/753,670, 63/757,440, 63/759,665, 63/760,617, 63/763,209, 63/766,911, 63/770,620, 63/770,654, 63/772,440, 63/773,078, 63/776,429, 63/792,520, 63/819,533, 63/837,511, 63/837,536, 63/839,386, 63/839,517, 63/839,612, 63/839,880, 63/839,918, and 63/841,314, each of which is expressly incorporated by reference herein in its entirety.

In this Application, to the extent any U.S. patents, U.S. patent applications, or other materials (e.g., articles) have been incorporated by reference, the text of such materials is only incorporated by reference to the extent that it does not conflict with the materials, statements, and drawings set forth herein. In the event of such a conflict, the text of the present document controls, and terms in this document should not be given a narrower reading in virtue of the way in which those terms are used in other materials incorporated by reference. It should also be understood that structures or features not directly associated with a robot cannot be adopted or implemented into the disclosed humanoid robot without careful analysis and verification of the complex realities of designing, testing, manufacturing, and certifying a robot for the completion of usable work nearby or around humans. Theoretical designs that attempt to implement such modifications from non-robotic structures or features are insufficient, and in some instances, woefully insufficient, because they amount to mere design exercises that are not tethered to the complex realities of successfully designing, manufacturing, and testing a robot.

The invention claimed is:

1. A method for coordinating task execution among multiple humanoid robots, comprising:
   receiving a high-level task command;
   decomposing the high-level task command into a plurality of sub-tasks;
   determining a cost-optimized assignment of the plurality of sub-tasks to at least one humanoid robot of the multiple humanoid robots based on a cost function that considers at least one of energy consumption, or time to completion; and
   transmitting the cost-optimized assignment to the at least one humanoid robot for execution; and
   using a bipedal action model to generate output continuous joint torques based in part on the cost-optimized assignment.

2. The method of claim 1, wherein the cost function further considers at least one of battery levels of the available humanoid robots, physical distances between robot locations or sub-task locations, or mechanical wear factors associated with specific joint movements required for each sub-task.

3. The method of claim 1, wherein the cost-optimized assignment is determined using a cost-optimized bipedal action model, and said cost-optimized bipedal action model includes: (i) a beta model is configured to operate at a frequency between 1-25 Hz and (ii) an alpha model is configured to operate at a frequency between 100-10,000 Hz.

4. The method of claim 3, wherein the beta model is deployed on a remote AI system and the alpha model is deployed locally on each humanoid robot of the multiple humanoid robots.

5. The method of claim 1, wherein the cost-optimized assignment is determined using a cost-optimized bipedal action model, and said cost-optimized bipedal action model is trained by:
   collecting training data that includes human data;
   annotating the training data with cost metrics associated with robot actions, the cost metrics include at least one of energy consumption or time to completion; and
   training a hierarchical model architecture that includes a beta model and an alpha model using the annotated training data.

6. The method of claim 5, wherein the beta model and the alpha model are co-trained end-to-end using a supervised learning technique.

7. The method of claim 5, further comprising the step of: splicing the collected training data into segments; and using a transformer-based model to generate written text that describes at least one object or action associated with the segment.

8. The method of claim 5, wherein the cost metrics associated with robot actions are determined by a separate machine learning model.

9. The method of claim 1, wherein the continuous joint torques are provided as input to a reinforcement learning (RL)-based controller, and wherein said RL-based controller is configured to control at least one actuator contained in said at least one humanoid robot.

* * * * *